US009277127B2

(12) United States Patent
Nonaka et al.

(10) Patent No.: US 9,277,127 B2
(45) Date of Patent: *Mar. 1, 2016

(54) WATERPROOF CAMERA HAVING A SEMI-UNDERWATER PHOTOGRAPHING MODE

(71) Applicant: OLYMPUS IMAGING CORP., Shibuya-ku, Tokyo (JP)

(72) Inventors: Osamu Nonaka, Sagamihara (JP); Kazuya Nakabe, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,966

(22) Filed: Feb. 4, 2015

(65) Prior Publication Data

US 2015/0145984 A1    May 28, 2015

Related U.S. Application Data

(60) Continuation of application No. 13/727,438, filed on Dec. 26, 2012, now Pat. No. 8,970,771, which is a division of application No. 12/868,864, filed on Aug. 26, 2010, now Pat. No. 8,379,112.

(30) Foreign Application Priority Data

Sep. 9, 2009   (JP) ................................ 2009-207739
Sep. 18, 2009  (JP) ................................ 2009-217669
Nov. 13, 2009  (JP) ................................ 2009-260245

(51) Int. Cl.
  *H04N 5/232*   (2006.01)
  *G03B 13/00*   (2006.01)

(52) U.S. Cl.
  CPC ............ *H04N 5/23245* (2013.01); *G03B 13/00* (2013.01); *H04N 5/232* (2013.01); *H04N 5/23209* (2013.01); *H04N 5/23212* (2013.01); *H04N 5/23293* (2013.01)

(58) Field of Classification Search
  CPC .......... H04N 5/23245; H04N 5/23293; H04N 5/23209; H04N 5/232; H04N 5/23212; G03B 13/00
  USPC ................................................ 348/81; 396/25
  See application file for complete search history.

(56) References Cited

U.S. PATENT DOCUMENTS 4,634,253 A *  1/1987  Tamamura ...................... 396/25
4,724,448 A    2/1988  Maeda et al.
(Continued)

FOREIGN PATENT DOCUMENTS

JP   08043173 A   2/1996
JP   3635500 B2   4/2005
(Continued)

OTHER PUBLICATIONS

Over-unders and split-shots (Online Material, retrieved from wayback machine (http://archive.org/web/) a shapshot of archived webpage of May, 23, 2009 having absolute link of http://web.archive.org/web/20090523173050/http://www.uwphotographyguide.com/over-under-split-photography; hereinafter UOSS).*

(Continued)

*Primary Examiner* — Shahbaz Nazrul
(74) *Attorney, Agent, or Firm* — Holtz, Holtz & Volek PC

(57) ABSTRACT

A waterproof camera includes an image pickup section, a display section that displays image data, a mode setting section that sets a semi-underwater mode in which both objects under water and above water are simultaneously photographed, and a display control section that limits a display range of the display section when the semi-underwater mode is set, wherein the mode setting section controls the position of a photographing lens or the like to adjust a focus balance of at least one of under water and above water, and the display control section displays both object images under water and above water within a limited display range of the display section.

11 Claims, 58 Drawing Sheets

(56) References Cited

U.S. PATENT DOCUMENTS

| | | |
|---|---|---|
| 5,826,113 A | 10/1998 | Nonaka |
| 2007/0071423 A1 | 3/2007 | Fantone et al. |
| 2008/0231696 A1 | 9/2008 | Kodama et al. |
| 2009/0109286 A1 | 4/2009 | Ennis |
| 2011/0074945 A1 | 3/2011 | Watanabe et al. |
| 2012/0098833 A1 | 4/2012 | Katano |

FOREIGN PATENT DOCUMENTS

| | | |
|---|---|---|
| JP | 2005215684 A | 8/2005 |
| JP | 2005328226 A | 11/2005 |
| JP | 2007324888 A | 12/2007 |

OTHER PUBLICATIONS

Digital camera Nicon D2x; http://www.nikonusa.com/en/Nikon-Products/Product-Archive/dslr-cameras/D2X.html.*

Japanese Office Action dated Sep. 8, 2015, issued in counterpart Japanese Application No. 2014-024492.

* cited by examiner

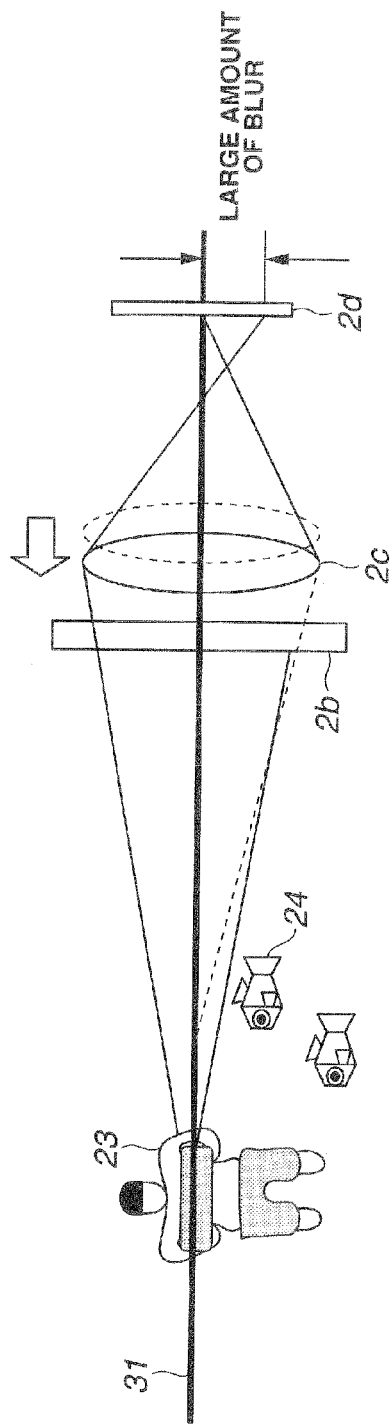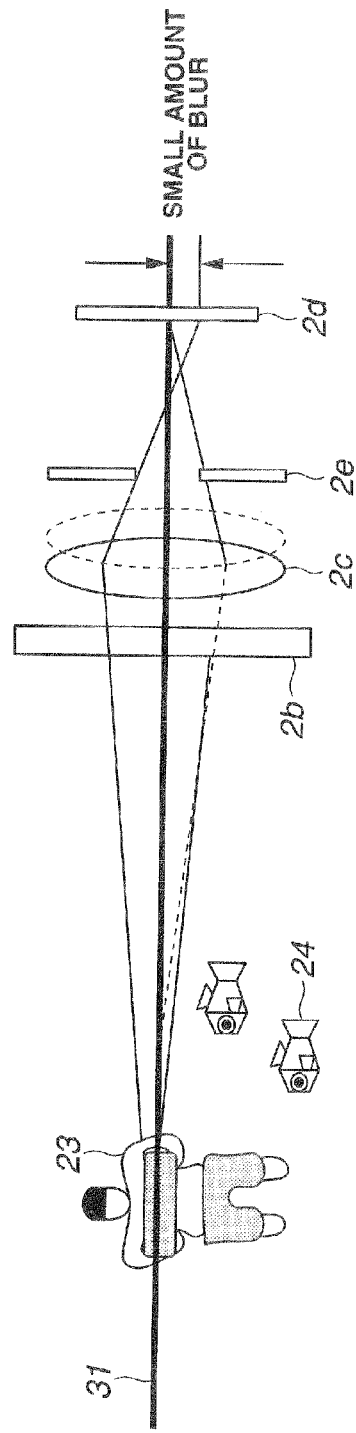

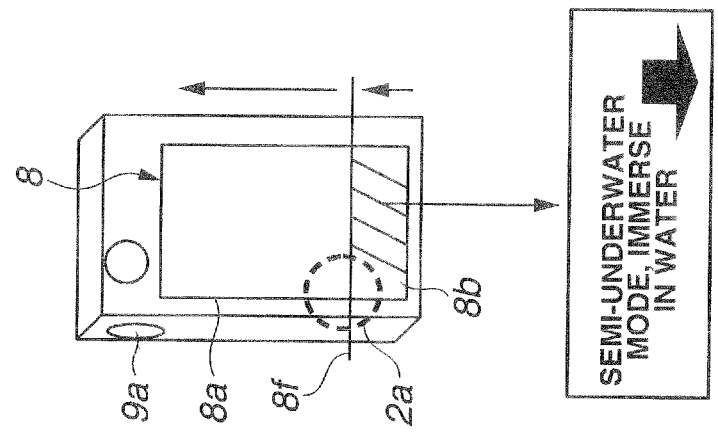
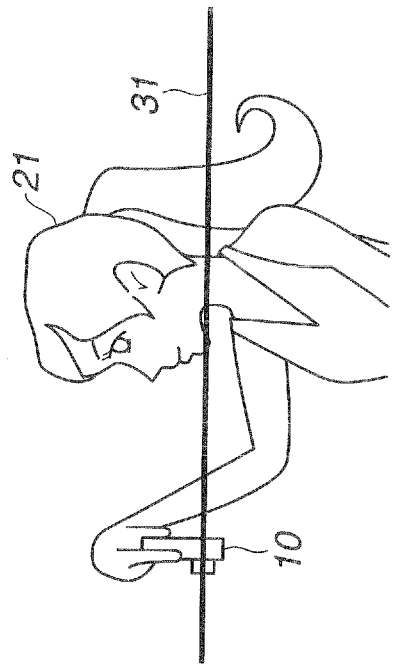
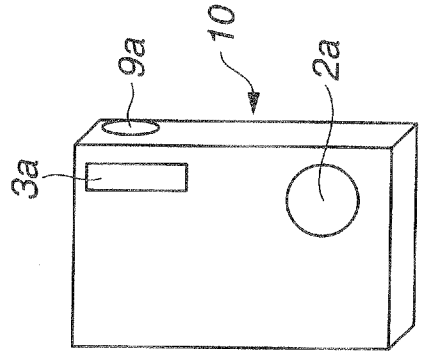

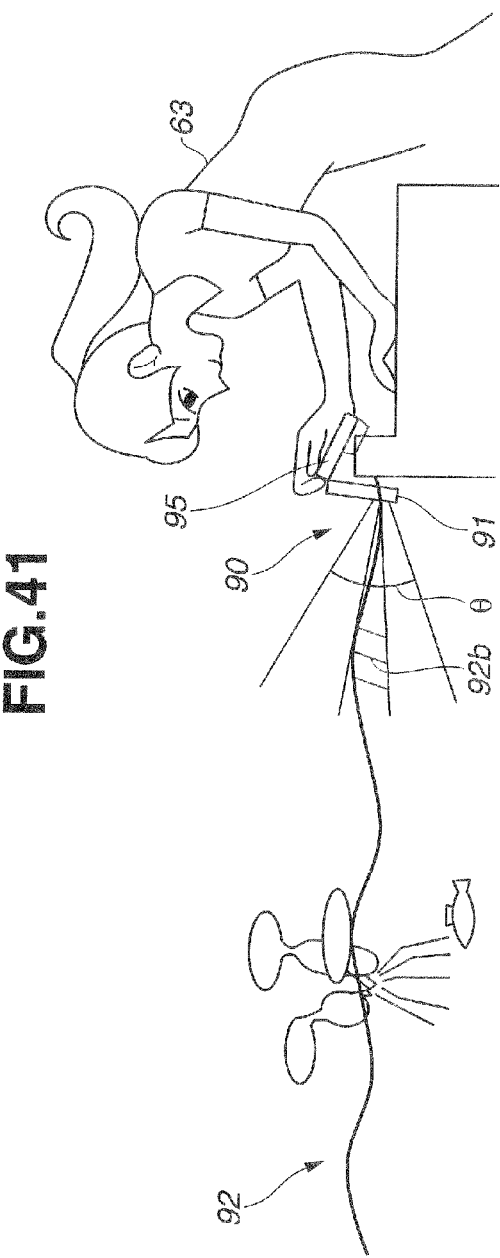
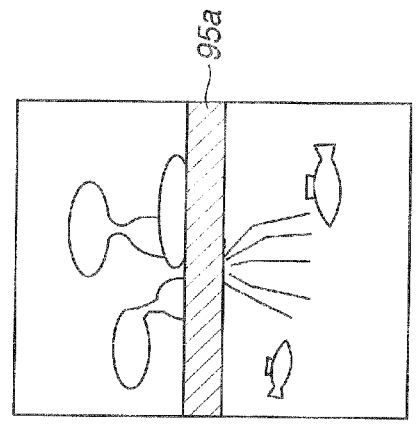

WATERPROOF CAMERA HAVING A SEMI-UNDERWATER PHOTOGRAPHING MODE

CROSS REFERENCE TO RELATED APPLICATION

This application is a Continuation application of U.S. application Ser. No. 13/727,438, filed on Dec. 26, 2012, which is a Divisional application of U.S. application Ser. No. 12/868,864, filed on Aug. 26, 2010. U.S. application Ser. No. 12/868,864 was issued as U.S. Pat. No. 8,379,112 on Feb. 19, 2013. U.S. application Ser. No. 12/868,864 claims benefit of Japanese Application Nos. 2009-207739 filed in Japan on Sep. 9, 2009, 2009-217669 filed in Japan on Sep. 18, 2009 and 2009-260245 filed in Japan on Nov. 13, 2009. The contents of all of the above-identified applications are incorporated by this reference.

BACKGROUND OF THE INVENTION

1. Field of the Invention

The present invention relates to a waterproof camera and a display method, and more particularly, to a waterproof camera and a display method using the waterproof camera capable of photographing under water.

2. Description of the Related Art

Portable devices such as cameras in recent years have improved waterproof functions and many cameras which can operate even when dropped into water are provided, and furthermore there are an increasing number of cameras that can be used under water. Photographing under water allows photographs that cannot be observed on land to be taken and the number of users who enjoy underwater photography is also increasing.

However, when photographs are taken by a waterfront, a greater variety of photographing will be made possible if it is possible to photograph both under water and above water simultaneously in addition to photographing under water alone. However, current underwater cameras are not appropriate for simultaneously photographing both under water and above water and liquid crystal monitors or the like used during framing on digital cameras have quite poor viewability from above water.

Conventionally, many kinds of methods are proposed for improving viewability of a display section such as a liquid crystal monitor. For example, according to a display control method disclosed in Japanese Patent Application Laid-Open Publication No. 2007-324888, a display section detects an amount of external light and highlights a predominant color component of a main object when the amount of external light is large, and thereby improves viewability of the monitor even under high brightness conditions.

Furthermore, Japanese Patent Application Laid-Open Publication No. 2005-328226 discloses a camera that stores color information corresponding to a depth of water, changes display color information according to the depth of water, and can thereby visually recognize a focus position and various kinds of information displayed on a monitor screen satisfactorily even during underwater photographing.

SUMMARY OF THE INVENTION

A waterproof camera according to an embodiment of the present invention includes: an image pickup section that converts an object image that has passed through a photographing lens to image data; a display section disposed on a back side of the waterproof camera body for displaying the image data converted by the image pickup section; a mode setting section that sets a semi-underwater mode in which both an object under water and an object above water are photographed simultaneously; and a display control section that controls, when the semi-underwater mode is set, the display section and limits a display range in the display section, wherein the mode setting section controls a position of a photographing lens or the image pickup section and adjusts at least one focus balance of under water and above water, and the display control section displays, when photography is performed when the display section is disposed on an above water and under water border, both the object image under water and the object image above water within a limited display range of the display section.

A waterproof camera according to another embodiment of the present invention includes: an image pickup section that converts an object image to image data and outputs the image data; a display section that displays the object image based on the image data; and a display limiting section that limits, when an object under water and an object in air are simultaneously photographed, a display range to a portion where the display section is exposed above water.

A waterproof camera according to a further embodiment of the present invention includes: an image pickup section that converts an object image to image data and outputs the image data; a display section that displays the object image based on the image data; a determining section that determines whether or not a semi-underwater mode is set in which both an object under water and an object above water are photographed simultaneously within a photographing screen of the object image; and an indicator section that causes the display section to display the determination result when the semi-underwater mode is set.

A display method according to an embodiment of the present invention includes: converting an object image to image data and outputting the image data, determining whether or not a semi-underwater mode is set in which an object under water and an object in air are simultaneously photographed within a photographing screen of the object image, and limiting a display range in the display section when the semi-underwater mode is set.

A waterproof camera according to a still further embodiment of the present invention includes: an image pickup section having a photographing lens and an image pickup device; a focusing section that achieves focus on an object image formed on an image pickup plane of the image pickup device by moving the photographing lens or the image pickup device in an optical axis direction of the photographing lens; a semi-underwater photographing mode setting section for setting a semi-underwater photographing mode in which photographing is performed by simultaneously accommodating an object image above water which is an above water side and an object image under water which is an underwater side on the image pickup plane; and a focus control section that controls focusing by the focusing section when the semi-underwater photographing mode is set so as to obtain a focus position corresponding to a distance from the image pickup section to the object in consideration of a refractive index under water with respect to the above water.

A waterproof camera according to a still further embodiment of the present invention includes: an image pickup section having a photographing lens and an image pickup device; a focusing section that achieves focus on an object image formed on an image pickup plane of the image pickup device by moving the photographing lens or the image pickup device in the optical axis direction of the photographing lens; a semi-underwater photographing mode setting section for setting a semi-underwater photographing mode in which photographing is performed by simultaneously accommodating an object image above water which is an above water side and an object image under water which is an underwater side on the image pickup plane; a focus control section that controls focusing by the focusing section when the semi-underwater photographing mode is set so as to obtain a focus position corresponding to a distance from the image pickup section to the object in consideration of a refractive index under water with respect to the above water; and an identification section that identifies between the object image above water and the object image under water on the image pickup plane.

A waterproof camera according to a still further embodiment of the present invention includes: an image pickup section that converts an object image that has passed through a photographing lens to image data; a display section provided on a back side of a camera body to display an image of the image data converted by the image pickup section; a mode setting section that controls a position of the photographing lens or the image pickup section, adjusts a focus balance of at least one of under water and above water and sets a semi-underwater mode in which both an object under water and an object above water are simultaneously photographed; a detection section that detects, when the semi-underwater mode is set, whether or not a low contrast region having low contrast exists; a recording section that records, when the detection section detects that the low contrast region exists, first and second images in which the low contrast region exists respectively; and an image synthesis section that synthesizes the first image and the second image recorded in the recording section, wherein the image synthesis section synthesizes the low contrast region in the first image with an image obtained by removing the low contrast region in the second image from the second image and generates a synthesized image.

BRIEF DESCRIPTION OF THE DRAWINGS

FIG. 6A and FIG. 6B are diagrams illustrating focus adjustment in the camera according to the first embodiment of the present invention; a cross-sectional view illustrating how the photographing lens is let out from a focus position of an object above water and a cross-sectional view illustrating how the focus is further narrowed down from FIG. 6A;

FIG. 11A to FIG. 11D are diagrams illustrating a display in a semi-underwater mode using the camera according to the third embodiment of the present invention; an outline perspective view of the camera viewed form the front side, a diagram illustrating a photographing state, a diagram illustrating a display state in the display section and a diagram illustrating an instruction in a non-display region of an object image;

FIG. 25B is performed;

FIG. 41 is a diagram illustrating an example of use with a cellular phone in a modification example of the seventh embodiment;

FIG. 42 is a diagram illustrating an example of image displayed on the display section when the semi-underwater photographing mode is set in the case of FIG. 41;

DETAILED DESCRIPTION OF THE PREFERRED EMBODIMENTS

Hereinafter, preferred embodiments of the present invention will be described using a digital camera to which the present invention is applied according to the accompanying drawings.

A waterproof camera (hereinafter simply abbreviated as "camera") according to a preferred embodiment of the present invention is provided with a waterproof mechanism and a camera function thereof operates even when immersed in water without the camera body being impregnated with water.

Furthermore, the camera is provided with an image pickup section, and the image pickup section converts an object image to image data and displays a live view of the object image on a display section disposed on the back side of the body based on the converted image data. A photographer determines a composition and a shutter chance by observing a live view display. During a release operation, image data such as still images and moving images are recorded in a recording medium and information such as a photographing date and time, photographing mode is also recorded together at this moment. Furthermore, a photographed image recorded in the recording medium can be reproduced and displayed on the display section when a reproducing mode is selected.

First Embodiment

Figure 1:
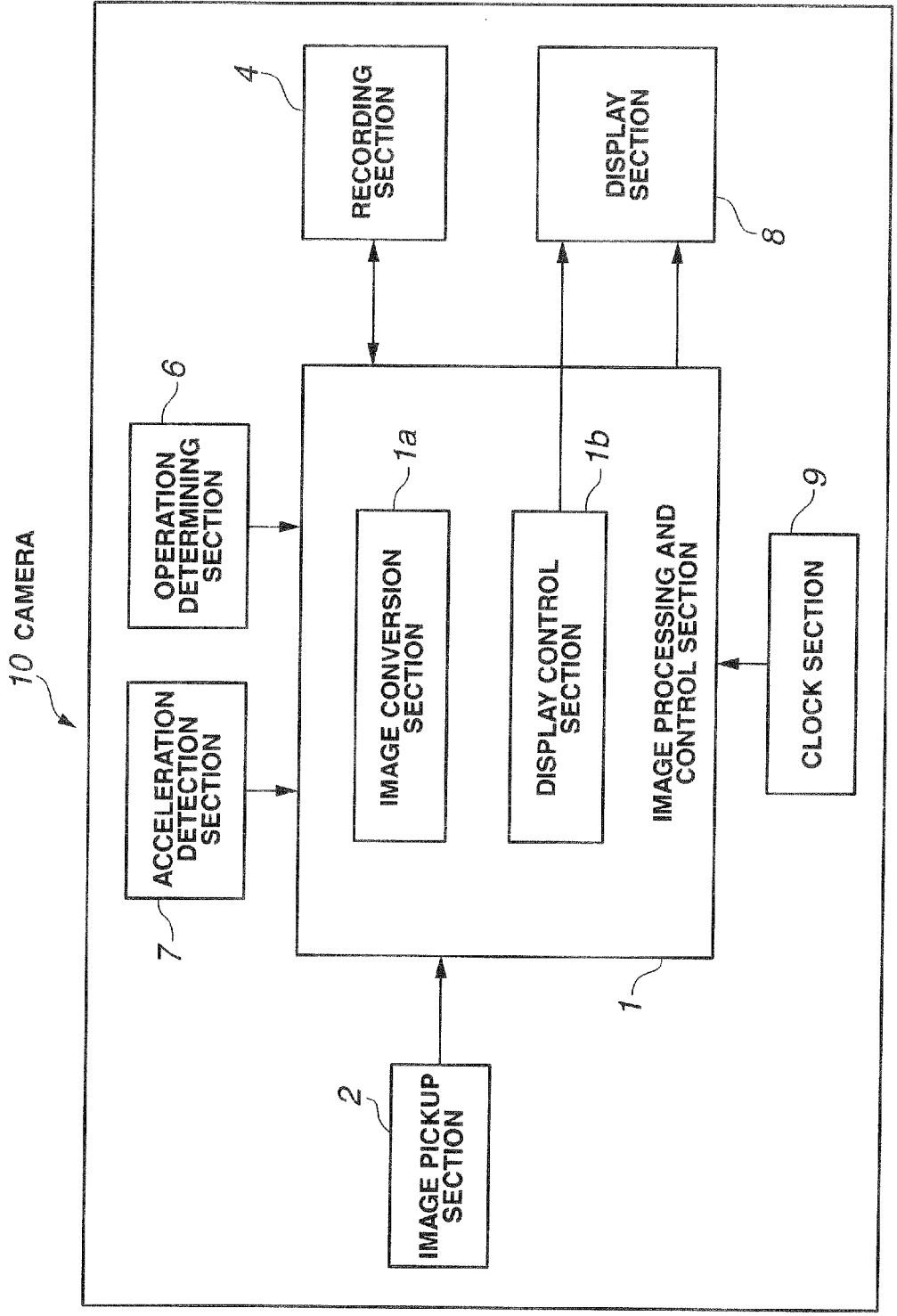
FIG. 1 is a block diagram illustrating an electrical configuration of a camera according to a first embodiment of the present invention.

FIG. 1 is a block diagram illustrating an electric circuit of a camera 10 according to a first embodiment of the present invention. The camera 10 is a digital camera and made up of a control section 1, an image pickup section 2, a recording section 4, an operation determining section 6, an acceleration detection section 7, a display section 8 and a clock section 9 or the like. The image pickup section 2 includes a photographing lens (zoom lens) having a zoom function, an exposure control section such as a shutter/diaphragm, an image pickup device, driving and successive output circuits for the image pickup device or the like, converts the object image formed by the photographing lens to image data through the image pickup device and outputs the image data. Furthermore, the image pickup section 2 is also provided with a focusing mechanism for the photographing lens and performs automatic focusing based on a control signal from the image processing and control section 1.

The control section 1 controls an entire sequence of the camera 10 according to a program stored in a storage section (not shown). The image processing and control section 1 is provided with an image conversion section 1a and a display control section 1b. The image conversion section 1a performs image processing such as converting the image data outputted from the image pickup section 2 to image data of a reduced image or changing a vertical/horizontal ratio of an image, that is, an aspect ratio. Furthermore, the display control section 1b controls a display range when displaying an image on the display section 8 based on the image data. In the present embodiment, when a semi-underwater mode is set as will be described later, the display range is limited to the upper half portion of the display screen of the display section 8 and no image is displayed on the lower half portion thereof, but the display control section 1b performs display control in this case as well.

In addition, the image processing and control section 1 incorporates the image data outputted from the image pickup section 2, performs various types of image processing such as thinning processing, resize processing, cut-out processing, edge enhancement, color correction, image compression, and performs image processing for recording still images and moving images in the recording section 4 and for reproducing/displaying still images and moving images. Furthermore, the image processing and control section 1 extracts a high frequency component of image data inputted from the image pickup section 2 and performs automatic focusing by adjusting the position of the photographing lens of the image pickup section 2 so that the high frequency component reaches a peak value.

The operation determining section 6 determines the states of operation by the user of operation members such as a power supply button, a release button, a reproducing button, a mode button and outputs the determination result to the image processing and control section 1. The aforementioned image processing and control section 1 controls photographing and reproduction in a predetermined sequence according to operation states of the operation members. A semi-underwater mode can be set using the mode button. The semi-underwater mode is a mode in which when the camera 10 is on the border between above water and under water, both parts of the object under water and above water are simultaneously photographed.

The acceleration detection section 7 has a 6-axis sensor or the like, detects three axial directions and acceleration around three axes or the like of the camera 10, detects a gravity direction, and thereby also detects a posture of the camera 10. Camera shake or the like is corrected based on a detection output of the acceleration detection section 7. When a photographing instruction is given by the release button, the recording section 4 records still images and image data acquired by the image pickup section 2 and subjected to compression processing by the image processing and control section 1. The clock section 9 performs a timing operation and outputs photographing date and time information. The photographing date and time information is recorded together when image data of still images and moving images is recorded in the recording section 6.

The display section 8 has a display section such as a liquid crystal panel disposed on the back side of the camera 10 and displays a live view prior to photographing, performs normal reproduction/display of recorded images or displays camera information or the like. The photographer can observe the live view display and determine a composition and timing. When the semi-underwater mode is selected, the portion of the display screen of the display section 8 corresponding to the part under water is hard to be seen from above water due to the control of the display control section 1b, and therefore nothing is displayed in this portion.

A photographing lens 2a (see FIG. 3A) of the camera 10 according to the present embodiment is disposed on the front of the camera body and at substantially the center with respect to the center of gravity direction and the display screen of the display section 8 is disposed on substantially an entire back side.

Figure 2B:
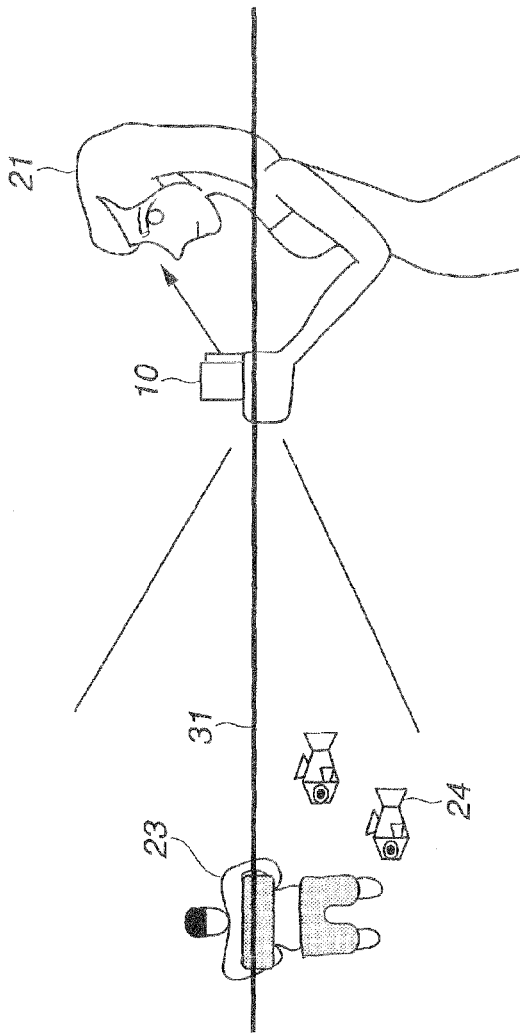
FIG. 2A and FIG. 2B are diagrams illustrating a photographed image in a semi-underwater mode using the camera according to the first embodiment of the present invention and a diagram illustrating a situation in which a photographer observes the object on the display section when photographing is performed in a semi-underwater mode.
Figure 2A:
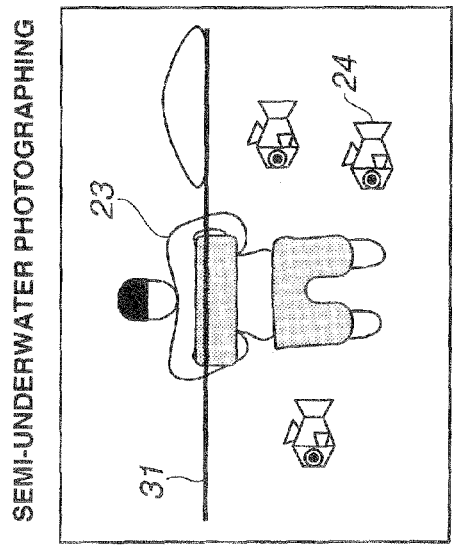

Next, photographing in a semi-underwater mode of the present embodiment will be described using FIG. 2A to FIG. 3D. FIG. 2B illustrates a situation in which semi-underwater photographing is being performed and FIG. 2A illustrates an image obtained at this moment. In this image, scenery such as a face of an object 23, a ring buoy and a ship is observed above water and creatures such as fish 24 and turtles and water plants are observed under water. The present specification refers to photographing such scenery including both objects above water and under water as "semi-underwater photographing."

When performing semi-underwater photographing, a photographer 21 generally desires to take a photograph while keeping his/her face out of water into air as shown in FIG. 2B. This is because when one takes a photograph with his/her face submerged in water, one cannot hold his/her breath for a long time nor concentrate on photographing or when one takes a photograph carrying an oxygen bomb, one cannot readily enjoy photographing.

In order to simultaneously photograph both objects under water and above water, the photographer (user) 21 needs to submerge the lower half portion of the photographing lens of the camera 10 below a water surface 31 and half of the display screen of the display section 8 is also submerged in water. To avoid this, the display section 8 may be turned up or a special adapter may be fitted thereto, but an accessory used for such a purpose is not strong enough and it is hard to maintain robustness.

Figure 3B:
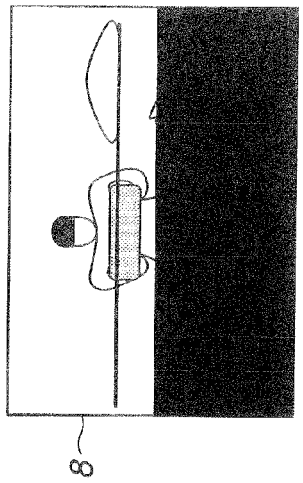
FIG. 3A to FIG. 3D are diagrams illustrating how an object looks on the display section in a case of semi-underwater photography using the camera according to the first embodiment of the present invention; a diagram illustrating how a light beam travels from the display section to the photographer, a diagram illustrating how the display section looks when no particular measures are taken, a diagram illustrating how the display section according to the present embodiment looks; and a diagram illustrating how the display section in a modification example of the present embodiment looks.
Figure 3C:
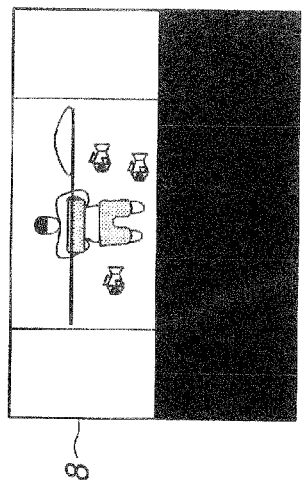
Figure 3D:
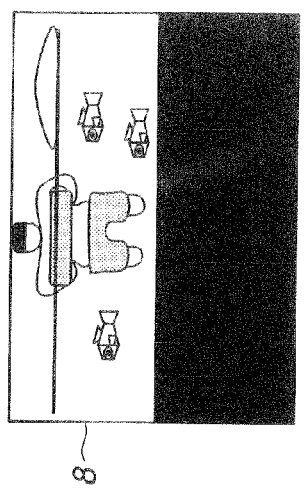
Figure 3A:
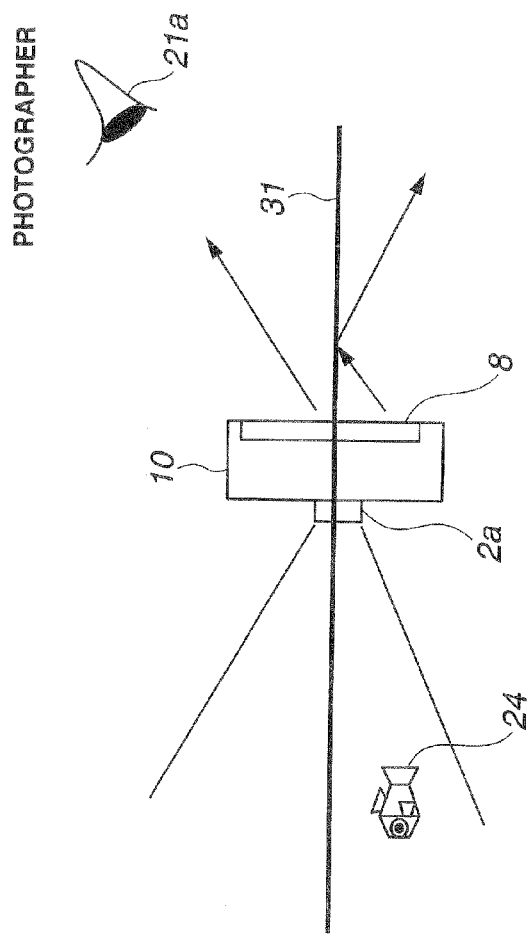

As a result, photographing is performed with about half of the screen of the display section 8 of the camera 10 submerged in water as shown in FIG. 3A. That is, the lower half of the body of the camera 10 is below the water surface 31 and the upper half is above the water surface 31. In this case, the lower half of the photographing lens 2a of the image pickup section 2 is also below the water surface 31 and the upper half thereof is above the water surface 31. Moreover, the lower half of the display screen of the display section 8 is below the water surface 31 and the upper half thereof is above the water surface 31.

During semi-underwater photographing, when the photographer 21 looks at the display screen of the display section 8, since the upper half of the screen is above the water surface 31, light from the display screen directly enters eyes 21a of the photographer 21. However, light from the lower half portion of the display screen is reflected by the water surface 31 due to a difference in refractive index between water and air and never enters the eyes 21a of the photographer 21.

Therefore, when attempting to perform semi-underwater photographing using a camera in the relationship shown in FIG. 3A, that is, a camera in which the display screen of the display section 8 is on the opposite surface of the photographing lens 2a and the center of the optical axis of the photographing lens 2a substantially matches the center of the area of the screen of the display section 8, if the photographer 21 looks at the display screen of the display section 8, the lower portion looks black as shown in FIG. 3B and the lower portion of the object image cannot be observed.

Thus, the present embodiment does not display any object image on the screen portion of the display section 8 below the water surface 31, that is, the portion of the display screen submerged in water, but displays the entire object image on the display screen above the water surface 31 as shown in FIG. 3C. In other words, the present embodiment limits the display range of the display section 8 to the portion above water when a semi-underwater mode is set.

In the example shown in FIG. 3C, the object image is displayed in reduced size while maintaining its aspect ratio, but the present embodiment is not limited to this, and the object image may also be displayed on the screen above the water surface 31 by only reducing the vertical size as shown in FIG. 3D. The present embodiment does not directly detect up to which position on the display screen corresponds to the portion under water, and therefore the present embodiment limits the display range to the portion substantially above the optical axis of the photographing lens.

Next, the operation of the present embodiment will be described using a flowchart shown in FIG. 4. This flow is executed by the image processing and control section 1 based on a program stored beforehand. In an entire camera control flow, when a display switching flow starts, the image processing and control section 1 first determines whether or not a semi-underwater mode is set based on the determination result by the operation determining section 6 (S1). In the processing in step S1, the operation determining section 6 determines whether or not the semi-underwater mode is set.

When the determination result in step S1 shows that the semi-underwater mode is not set, the display section 8 performs normal display (S10). In the processing in step S10, the display control section 1b performs control so that the object image is displayed on the full screen of the display section 8 based on the image data outputted from the image pickup section 2.

On the other hand, when the determination result in step S1 shows that the semi-underwater mode is set, the display control section 1b performs control so that the object image is displayed in reduced size on the upper half portion of the display screen of the display section 8 (S2). Here, the image conversion section 1a generates the reduced image shown in FIG. 3C or FIG. 3D and the display control section 1b performs control so that the reduced image generated is displayed on the upper half portion of the display screen of the display section 8.

After performing the reduced display in step S2 or normal display in step S10, the process returns to an original flow.

Next, automatic focusing in the present embodiment will be described using FIG. 5 to FIG. 6B. When a comparison is made between portions above water and under water, the photographer cannot continue to hold his/her breath under water. Furthermore, the position of the camera 10 is not stable due to buoyancy, and moreover since fish or the like move actively, a degree of freedom with respect to automatic focusing is higher above water. Thus, it is preferable to perform such autofocus that focusing is preferentially performed on objects above water and focus on objects under water is also achieved as much as possible.

Figure 5:
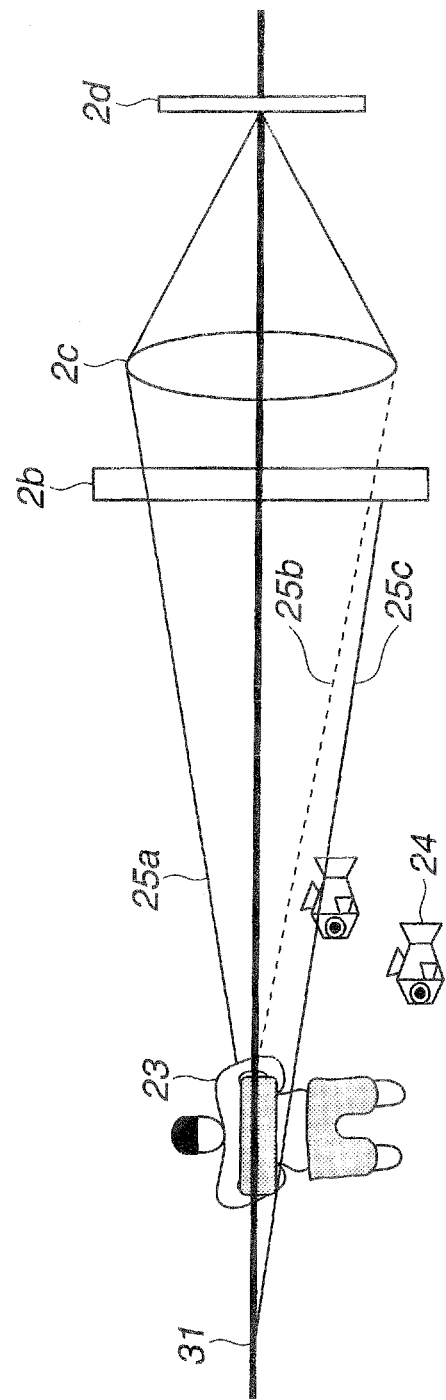
FIG. 5 is a diagram illustrating a relationship between focus positions when simultaneously photographing above water and under water portions using the camera according to the first embodiment of the present invention.

FIG. 5 illustrates a relationship between focus positions when objects above water and under water are simultaneously photographed. A cover glass 2b, a photographing lens 2c and an image pickup device 2d constitute the image pickup section 2 of the camera 10. Now, suppose a case where an optical axis of the photographing lens 2c matches the water surface 31. A light beam 25a is emitted from the object 23, passes above water, passes through the cover glass 2b, the photographing lens 2c and forms an image on the image pickup device 2d.

When the photographing lens 2c is located at a position where focus is achieved on the light beam 25a that has passed above water, a light beam 25c traveling from a place farther than the object 23 through under water forms an image on the image pickup device 2d, whereas a light beam 25b emitted from the object 23 does not form an image on the image pickup device 2d. This is because there is a difference in refractive index between air (above water) and water (under water).

Therefore, when the photographing lens 2c is simply focused on the object 23 above water (focus balance), the object 23 under water looks frontward due to the refractive index of water, and therefore an object under water comes into focus behind the figure object 23. This is not convenient because the fish 24 in front of the figure object 23 tend not to come into focus. Moreover, a distant object under water is hardly photographed because of transparency of water and is not convenient in that sense either.

Thus, according to the present embodiment, in the case of semi-underwater photographing, priority is given to focusing results above water, but the focusing results are not used as they are and the photographing lens 2c is designed to move so as to achieve focus at a distance shorter than the focusing result above water as shown in FIG. 6A. This makes it possible to achieve focus balance between above water and under water.

In normal automatic focusing, as described above, the image processing and control section 1 extracts a high frequency component of image data and adjusts the position of the photographing lens of the image pickup section 2 so that the high frequency component reaches a peak value.

When the semi-underwater mode is set, the image processing and control section 1 detects the position corresponding to the peak value of the high frequency component using a luminous flux of the object that has passed above water, but since this position is a focus position corresponding to the object above water, control is performed such that a position to which the lens is moved by a predetermined value from the focus position is designated as the focusing position.

Furthermore, when the semi-underwater mode is set, a diaphragm 2e may be further narrowed down to reduce an amount of blur as shown in FIG. 6B. Light quantity decreases by narrowing down the diaphragm, but since the amount of blur decreases, it is possible to make a difference in the focus position under water and above water less obtrusive.

As described above, when the semi-underwater mode is set, the first embodiment of the present invention does not display the object image on the lower half portion of the display screen of the display section 8 but displays the entire object image on the upper half portion of the display screen. For this reason, the entire object image can be recognized even in the case where the positions of the photographer's eyes are above water.

In the present embodiment, the photographing lenses 2a and 2c are located on the front of the camera body and at substantially the center in a longitudinal direction. Furthermore, since the display screen of the display section 8 indicates substantially the entire region of the back side of the camera body, when the semi-underwater mode is set, if the optical axis of the photographing lenses 2a and 2c is made to match the water surface 31, substantially the center of the display screen corresponds to the water surface. However, there is also a case where the position of the photographing lens is not located at substantially the center, and in such a case, a limitation may be imposed on the display according to the position of the photographing lens and the display range may be determined.

Second Embodiment

Next, a second embodiment of the present invention will be described using FIG. 7A to FIG. 8. The first embodiment displays the entire object image in reduced size at a portion above the water surface 31 of the display screen of the display section 8. By contrast, the second embodiment divides an object image on a portion corresponding to a position above the water surface 31 or displays the object image under the water surface without reducing the size of the object.

Figure 7A:
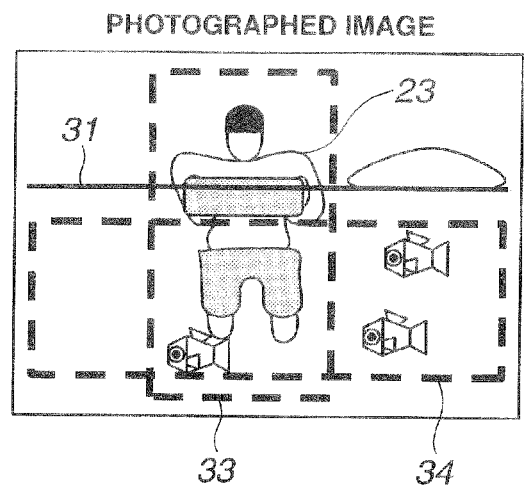
FIG. 7A to FIG. 7C are diagrams illustrating how an object looks on the display section in the case of semi-underwater photography using a camera according to a second embodiment of the present invention; a diagram illustrating a photographed image, a diagram illustrating how the display section looks and a diagram illustrating a modification example showing how the display section looks.
Figure 7B:
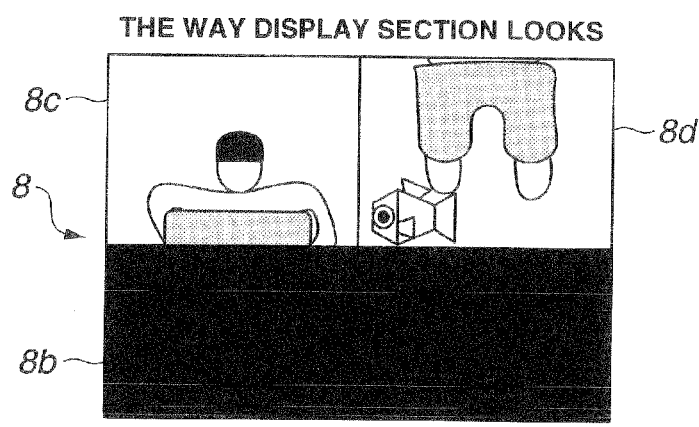
Figure 8:
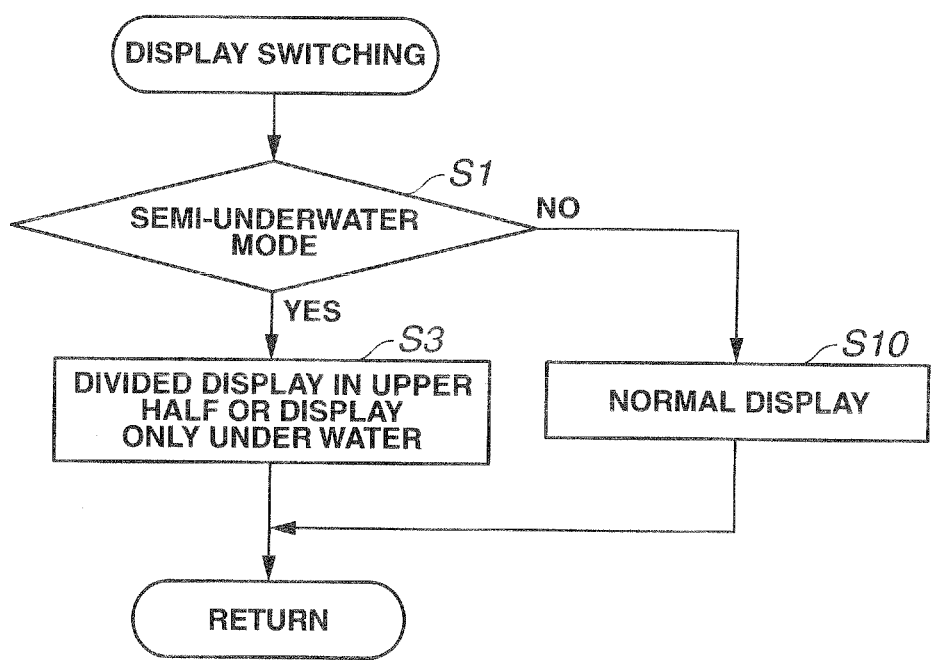
FIG. 8 illustrates a flowchart illustrating a display switching operation of the camera according to the second embodiment of the present invention.

Like FIG. 2B, FIG. 7A illustrates an image obtained when the photographer sets the photographing lens so that the optical axis thereof substantially matches the water surface. As in the case of FIG. 2A, a photographed image is obtained in which the object 23 is located above and below the water surface 31 and the fish 24 are swimming under water. When the semi-underwater mode is set, the second embodiment displays an image shown in FIG. 7B on the display screen of the display section 8.

That is, because the portion is not visible from the photographer due to the refractive index of water, no object image is displayed in a lower display screen 8b which is the lower half portion of the display screen. Furthermore, a partial image 33 in FIG. 7A is divided into upper and lower portions, the upper half portion is displayed on an upper portion display screen 8c which corresponds to a left side of the upper half portion and the lower half portion of the partial image 33 is displayed on an upper portion display screen 8d which corresponds to a right side of the upper half portion. Therefore, when the photographer observes the display screen of the display section 8, the object 23 above the water surface and the object 23 below the water surface are displayed side by side on the left and on the right respectively.

Furthermore, there is also a way of thinking that the entire photographed image need not always be shown. That is, while the photographer can easily recognize an object image above the water surface by a naked eye, the photographer cannot recognize an object image below the water surface by the naked eye, and therefore there is a way of thinking that only the object image below the water surface may be displayed on the display screen of the display section 8.

Figure 7C:
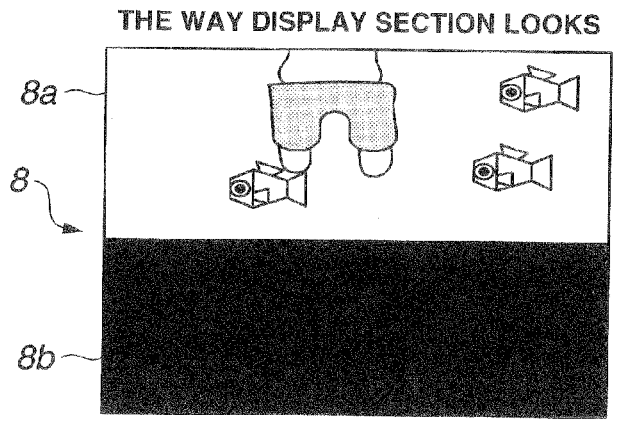

The display shown in FIG. 7C is along the lines of this way of thinking. That is, an underwater object image 34 below the water surface 31 in FIG. 7A is displayed on an upper display screen 8a as is. In this case, since the object image above the water surface 31 is not displayed on the display screen of the display section 8, the object image above the water surface 31 may be obtained by analogy with the underwater image and roughly estimated by a direct visual check.

Since such a configuration of the present embodiment is substantially the same as the block diagram in FIG. 1 described in the first embodiment, detailed descriptions thereof will be omitted. The image conversion section 1a can divide the image based on the image data from the image pickup section 2 as shown in FIG. 7B and extract only the image of the underwater portion as shown in FIG. 7C. The display switching operation according to the present embodiment will be described using a flowchart shown in FIG. 8. This flow is executed by the image processing and control section 1 based on a program stored beforehand.

In the entire camera control flow, when the display switching flow starts, it is first determined whether or not a semi-underwater mode is set as in the case of the first embodiment (S1). In the processing in step S1, the operation determining section 6 determines whether or not the semi-underwater mode is set.

When the determination result in step S1 shows that the semi-underwater mode is not set, the display section 8 performs a normal display as in the case of the first embodiment (S10). In the processing in step S10, the object image is displayed on the full screen of the display section 8 through the control of the display control section 1b based on the image data outputted from the image pickup section 2. On the other hand, when the determination result in step S1 shows that the semi-underwater mode is set, the display control section 1b performs control such that a divided display or only an underwater display is performed on the upper half portion of the screen (S3).

In the processing in this step S3, as described in FIG. 7B, the display section 8 displays the divided partial object image 33 on the upper display screen 8a or displays the underwater object image 34 which only exists below the water surface on the upper display screen 8a as described in FIG. 7C. After performing a normal display in step S10 or after performing a divided display or only an underwater display in step S3, the process returns to the original flow.

Thus, when the semi-underwater mode is set, the second embodiment of the present invention displays no object image on the lower display screen 8b of the lower half portion of the display section 8, displays a partial image obtained by dividing a whole object image or only the object image below the water surface on the upper display screen 8a of the upper half portion of the display screen. Thus, it is possible to recognize the object image without reducing the size of the object image.

Third Embodiment

Next, a third embodiment of the present invention will be described using FIG. 9A to FIG. 12. In the first and second embodiments of the present invention, the photographing lenses 2a and 2c are disposed substantially at the center of the front of the camera body and the position corresponding to the water surface on the display screen of the display section 8 is substantially at the center of the screen. In a third embodiment, the position of photographing lenses 2a is deviated from substantially the center on the front of the camera body. The present embodiment is designed to provide an optimum display for the camera.

Figure 9A:
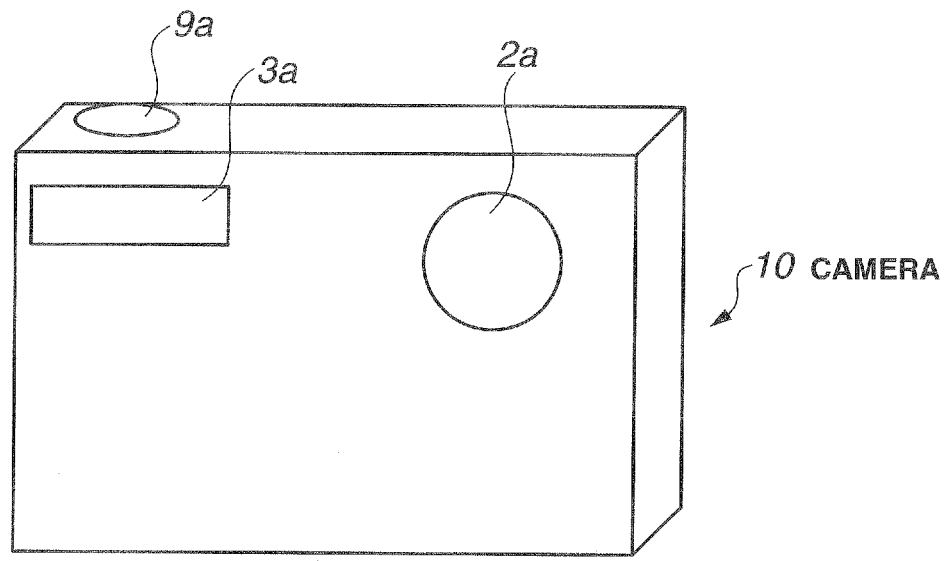
FIG. 9A and FIG. 9B are diagrams illustrating an appearance and a photographing state of a camera according to a third embodiment of the present invention; an outline perspective view viewed from a front side and an outline perspective view viewed from a back side.
Figure 9B:
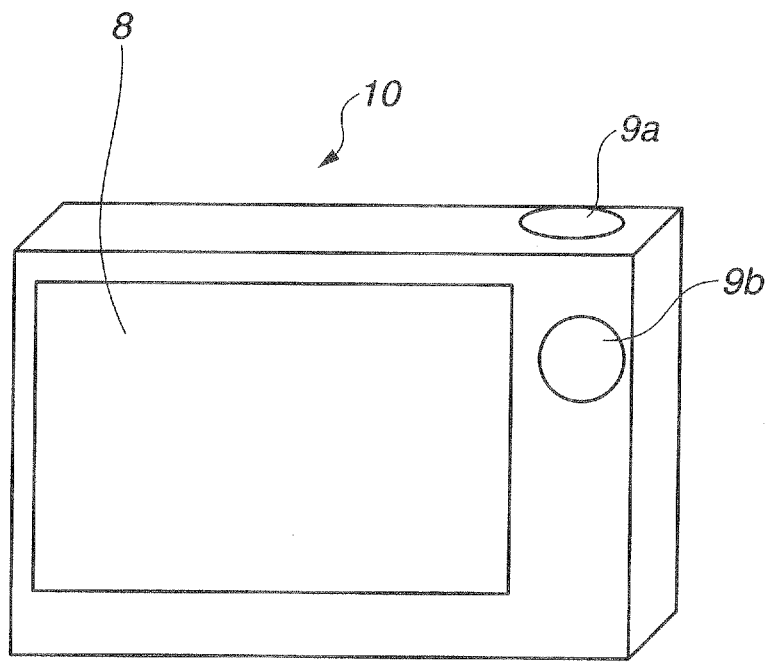

FIG. 9A is an outline perspective view of the camera 10 according to the present embodiment viewed from the front side and FIG. 9B is an outline perspective view viewed from the back side. A release button 9a which is one of operation members is disposed on the top surface of the body of the camera 10. Furthermore, a photographing lens 2a is disposed on a relatively top right side on the front of the body. Furthermore, a strobe 3a is disposed on a relatively top left side on the front of the body. The photographing lens 2a is a zoom lens and the optical path of the zoom lens is folded and accommodated in the camera body.

Furthermore, the display screen of the display section 8 occupies most of the back side of the camera 10 as shown in FIG. 9B. A mode setting switch 9b is disposed on the back side and on one side of the display screen of the display section 8.

Figure 10A:
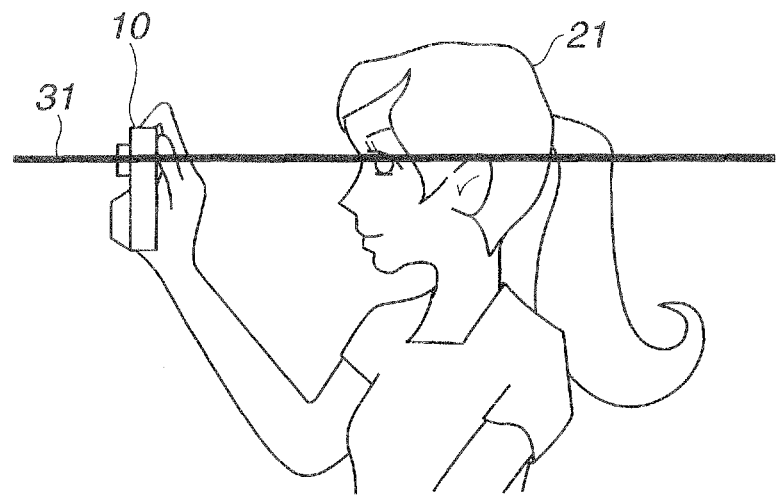
FIG. 10A and FIG. 10B are diagrams illustrating a photographing situation using the camera according to the third embodiment of the present invention; a diagram illustrating a situation in which a photographer goes into water to perform photographing in a semi-underwater mode and a diagram illustrating a situation in which the photographer is photographing in the semi-underwater mode from land.
Figure 10B:
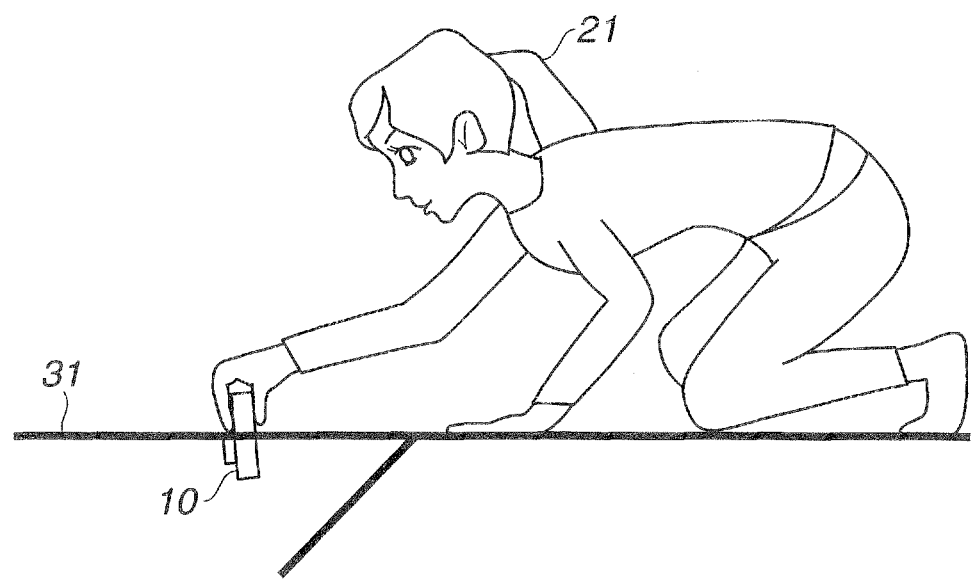

When performing semi-underwater photographing using the camera 10 according to the present embodiment, the photographer goes into water as shown in FIG. 10A and performs photographing in such a way that the optical axis of the photographing lens 2a substantially matches the water surface 31. Furthermore, instead of the photographer going into water, the photographer may put only the camera 10 into water in such a way that the optical axis of the photographing lens substantially matches the water surface 31 as shown in FIG. 10B.

When using the camera 10 located as shown in FIG. 9A and FIG. 9B, the camera 10 is placed in the longitudinal position as shown in FIG. 11A and substantially half of the photographing lens 2a is submerged in water so that photographing is possible with much of the display section 8 exposed above water. In this case, photographing can be performed only in the longitudinal composition, but when the photographer wants to photograph objects in a deep part under water, such an arrangement is preferable.

When the longitudinal position is adopted, much of the display screen of the display section 8 can be used, and therefore non-use regions are determined with reference to the position of the photographing lens 2a. That is, as shown in FIG. 11C, a water surface guideline 8f is displayed on the display screen of the display section 8 in correspondence with the position of the photographing lens 2a. Suppose an upper display screen 8a above the water surface guideline 8f is a usable region and a lower display screen 8b below the water surface guideline 8f is a non-use region. The moving direction of the camera 10 is displayed in this non-use region as shown in FIG. 11D to facilitate photographing in the semi-underwater mode. In the example shown in FIG. 11D, the mode is displayed as "semi-underwater mode" together with a display "immerse in water" and the direction is indicated by a downward arrow.

Displaying the water surface guideline 8f and displaying the mode and direction on the display screen of the display section 8 allows even a user unfamiliar with the method of use of the semi-underwater mode to easily perform photographing in the semi-underwater mode.

Such a circuit configuration of the present embodiment is substantially the same as that in the block diagram in FIG. 1 described in the first embodiment, and therefore detailed descriptions thereof will be omitted. In the first embodiment, the display control section 1b sets the limitation range within which the object image is displayed in a position above the center when the camera is placed in the lateral position, but in the present embodiment, the display control section 1b sets the limitation range in a position above the position of the photographing lens 2a when the camera is placed in the longitudinal position.

Figure 12:
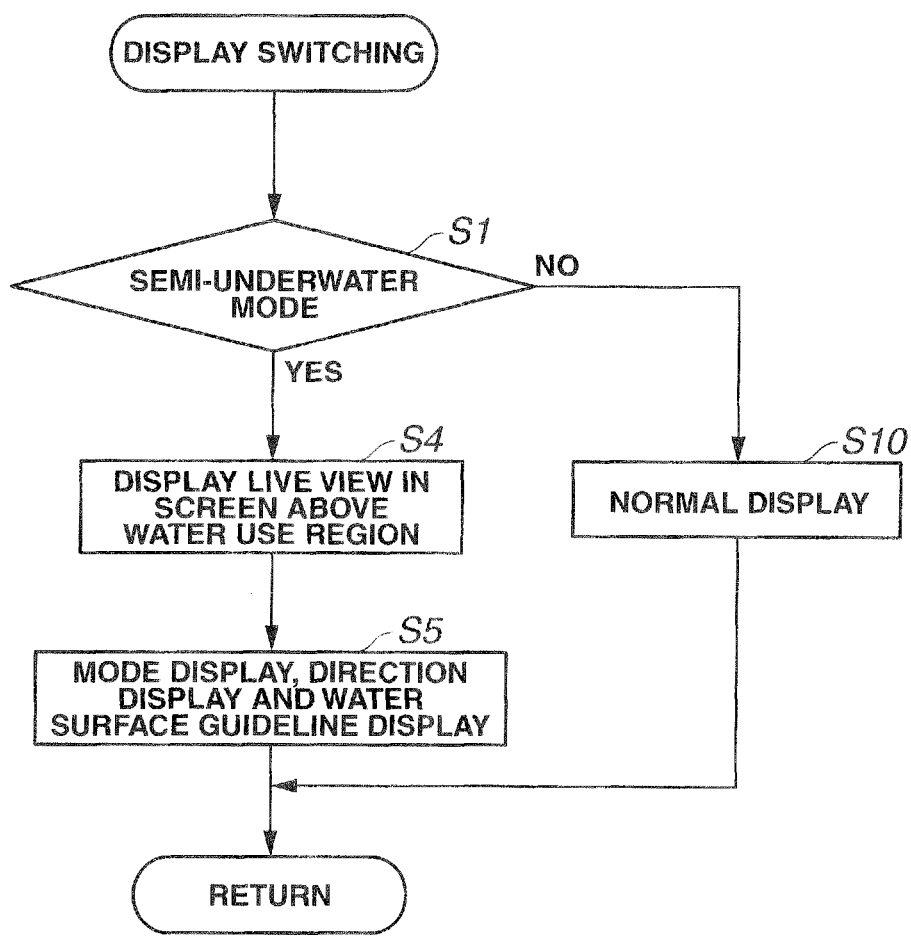
FIG. 12 illustrates a flowchart illustrating a display switching operation of the camera according to the third embodiment of the present invention.

The display switching operation according to the present embodiment will be described using a flowchart shown in FIG. 12. This flow is executed by the image processing and control section 1 based on a program stored beforehand as in the case of the first and second embodiments. In the entire camera control flow, when the display switching flow starts, it is first determined whether or not a semi-underwater mode is set as in the case of the first embodiment (S1). In the processing in step S1, the operation determining section 6 determines whether or not a semi-underwater mode is set.

When the determination result in step S1 shows that the semi-underwater mode is not set, the display section 8 performs a normal display as in the case of the first embodiment (S10). In the processing in step S10, the display control section 1b performs control so that an object image is displayed on the full screen of the display section 8 based on image data outputted from the image pickup section 2. On the other hand, when the determination result in step S1 shows that the semi-underwater mode is set, the display section 8 displays a live view in an above-water use region of the screen (S4).

In the processing in this step S4, as described using FIG. 11C, a live view is displayed in a region of the upper display screen 8a, that is, a use region based on the image data from the image pickup section 2. Next, the display section 8 displays a mode, a direction and a water surface guideline in the non-use region under the control of the display control section 1b (S5). In this step S5, as described using FIG. 11C, a mode display "semi-underwater mode" and a direction display using an arrow and "immerse in water" are shown in the region of the lower display screen 8b, that is, the non-use region and the display section 8 displays the water surface guideline 8f. After performing a normal display in step S10 or after performing a display in step S5, the process returns to the original flow.

Thus, according to the third embodiment of the present invention, when the photographing lens 2a is not disposed substantially at the center of the camera body, the display screen exposed above water can be effectively used. Furthermore, displaying the water surface guideline 8f makes it possible to efficiently position the camera 10 and speedily perform photographing in a semi-underwater mode.

Fourth Embodiment

Next, a fourth embodiment of the present invention will be described using FIG. 13A to FIG. 14. The third embodiment uses the display screen in the longitudinal position, whereas the fourth embodiment uses the display screen in the lateral position. Furthermore, the first to third embodiments manually set the semi-underwater mode, but the present embodiment automatically sets the semi-underwater mode.

Figure 13A:
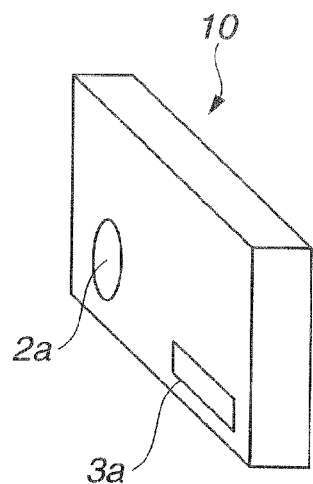
FIG. 13A to FIG. 13E are diagrams illustrating a display in a semi-underwater mode of a camera according to a fourth embodiment of the present invention; an outline perspective view of the camera held upside down and viewed from an upper front angle, a diagram illustrating a photographing state, a diagram illustrating a display state in the display section, a diagram illustrating a display example of water surface guideline in the display section and a diagram illustrating another display example of water surface guideline in the display section.

An outline view of the camera 10 according to the present embodiment is similar to that in FIG. 9, but when performing semi-underwater photographing, the camera 10 is used upside down as shown in FIG. 13A. FIG. 13A is an outline perspective view of the camera 10 when the camera 10 is held upside down and viewed from the front angle and FIG. 13C is an outline perspective view of the camera viewed from the back side.

When the photographer puts the camera 10 upside down, the photographing lens 2a is positioned on the relatively lower left side of the front of the body and a strobe 3a is positioned on the relatively lower right side of the front of the body. The light-emitting position of the strobe 3a is lower than the photographing lens 2a. Setting such a light-emitting position causes most of strobe light to be projected into water and can thereby give sufficient illumination to an object under water.

Figure 13B:
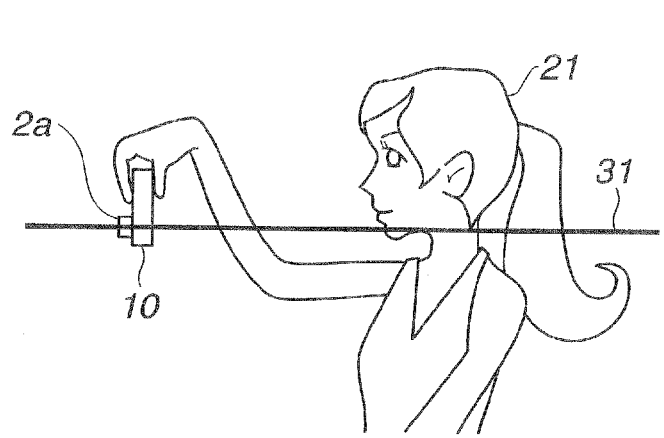
Figure 13C:
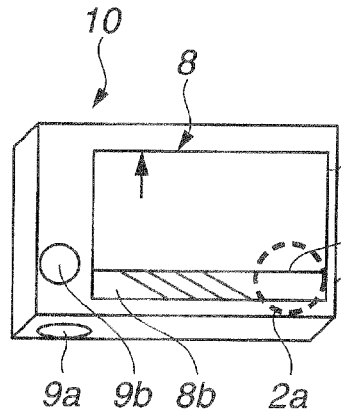
Figure 13D:
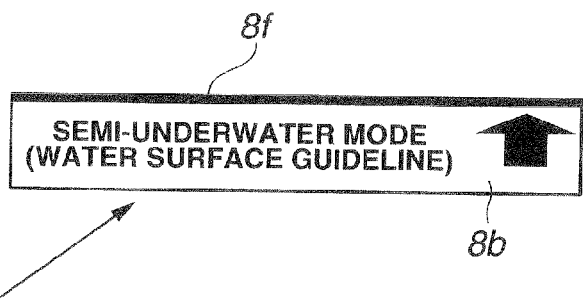
Figure 14:
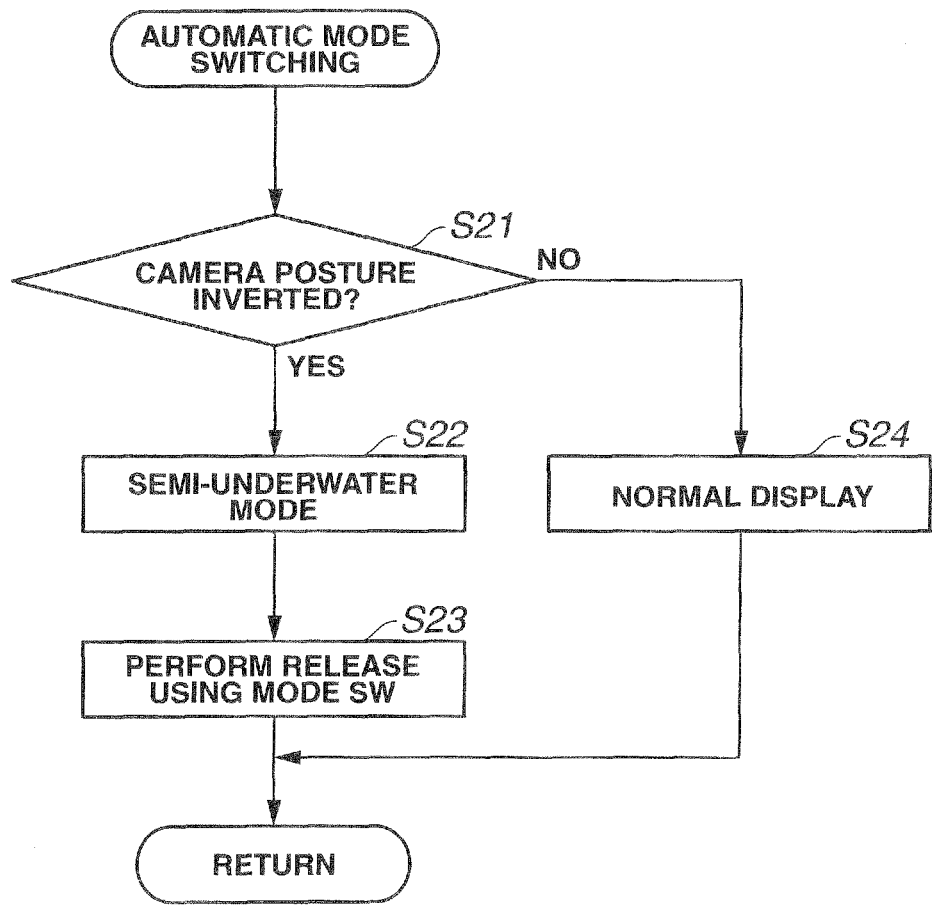
FIG. 14 is a flowchart illustrating an automatic mode switching operation of the camera according to the fourth embodiment of the present invention.

Furthermore, the display screen of the display section 8 occupies most of the back side of the camera 10 as shown in FIG. 13C. A mode setting switch 9b is disposed on one side of the display screen of the display section 8 on the back side.

When semi-underwater photographing is performed using such a camera 10 of the present embodiment, the photographer goes into water as shown in FIG. 13B and sets the camera so that the optical axis of the photographing lens 2a substantially matches the water surface 31. It goes without saying that instead of the photographer going into water, the photographer may put only the camera 10 into water and set the camera so that the water surface 31 substantially matches the optical axis of the photographing lens as shown in FIG. 10B.

When the camera 10 in such an arrangement is used, the camera 10 is placed in the lateral position as shown in FIG. 13B, substantially half the photographing lens 2a is submerged in water and it is thereby possible to perform photographing with much of the display section 8 exposed above water. Here, however, only upside-down composition can be photographed in this case, but there is a merit of being able to use a wide area of the screen above water as shown in FIG. 13C. Furthermore, since the release button 9a is on the opposite side, the release operation is not easy. To solve this problem, when the semi-underwater mode is set, the setting may be changed so that another switch such as the mode setting switch 9b can be used as the release button.

Setting the camera in the lateral position allows the wide area of the display screen of the display section 8 to be used, and therefore a non-use region is determined with reference to the position of the photographing lens 2a as in the case of the third embodiment. That is, as shown in FIG. 13C, the display control section 1b displays a water surface guideline 8f on the display screen of the display section 8 in correspondence with the position of the photographing lens 2a. An upper display screen 8a above the water surface guideline 8f is set as a usable region and a lower display screen 8b below the water surface guideline 8f is set as a non-use region.

Figure 13E:
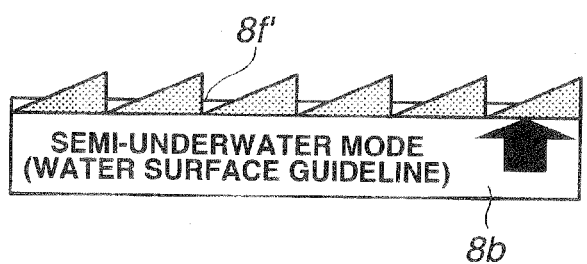

As in the case of the third embodiment, the display section 8 displays the mode (here, displayed as "semi-underwater mode") and displays the moving direction of the camera 10 using an arrow in a non-use region. In addition to the straight line shown in FIG. 13D used as the water surface guideline 8f, a waveform water surface guideline 8f may also be displayed as shown in FIG. 13E. Displaying the water surface guideline 8f with a waveform rather than a straight line helps the user intuitively identify it as the water surface.

Since such a circuit configuration of the present embodiment is substantially the same as that of the block diagram in FIG. 1 described in the first embodiment, detailed descriptions thereof will be omitted. With the camera disposed upside down, the display control section 1b limits the display range to the area above the photographing lens 2a. Unlike the first to third embodiments, in the operation of the display switching of the present embodiment, display switching is performed automatically. This automatic mode will be described using a flowchart shown in FIG. 14. As in the case of the first to third embodiments, this flow is executed by the image processing and control section 1 based on a program stored beforehand.

In the entire camera control flow, when an automatic mode flow starts, the image processing and control section 1 first determines whether or not the posture of the camera is inverted (S21). In the fourth embodiment, when semi-underwater photographing is performed, the photographer puts the camera 10 upside down as shown in FIG. 13A, and therefore in this step S21, the acceleration detection section 7 detects and determines the posture of the camera 10.

As a result of the determination in step S21, if the posture of the camera is not inverted, the display section 8 performs a normal display as in the case of the first embodiment (S24). In this step S24, the display control section 1b performs control so that an object image is displayed on the full screen of the display section 8 based on image data outputted from the image pickup section 2. On the other hand, if the posture of the camera is inverted as a result of the determination in step S21, a semi-underwater mode is set (S22). Here, a semi-underwater mode is automatically set as the photographing mode of the camera 10.

Next, the release function is switched to the mode setting switch 9b (S23). As described above, when the photographer uses the camera 10 in an upside-down position, the position of the release button 9a is inverted and it becomes difficult to use the release button 9a. Therefore, the image processing and control section 1 controls switching of the function so that the mode setting switch 9b can be used as the release button. After performing the processing in step S23 or step S24, the process returns to the original flow.

Thus, according to the fourth embodiment of the present invention, when the photographing lens 2a is not disposed substantially at the center of the camera body of the camera 10, the display screen exposed above water can be effectively used. Furthermore, by detecting the inversion of the posture of the camera 10, it is possible to automatically switch the mode to the semi-underwater mode and omit a troublesome switching operation.

The third embodiment and the fourth embodiment display the mode display, mode direction and water surface guideline in the non-use region, but all of these items need not be displayed. Furthermore, although the third embodiment and the fourth embodiment have been described as different embodiments, the basic configuration of the camera 10 is the same, and therefore it may also be possible to detect the posture of the camera by the acceleration detection section 7 and operate the camera in the semi-underwater mode corresponding to the longitudinal position or lateral position depending on the detection result.

Fifth Embodiment

Next, a fifth embodiment of the present invention will be described using FIG. 15 to FIG. 20C. The first to fourth embodiments manually set the semi-underwater mode, whereas the present embodiment automatically sets a semi-underwater mode in the case of a state appropriate to semi-underwater photographing. The method of determining whether or not the camera is in a semi-underwater state in the present embodiment will be described using FIG. 15 and FIG. 16.

Figure 15:
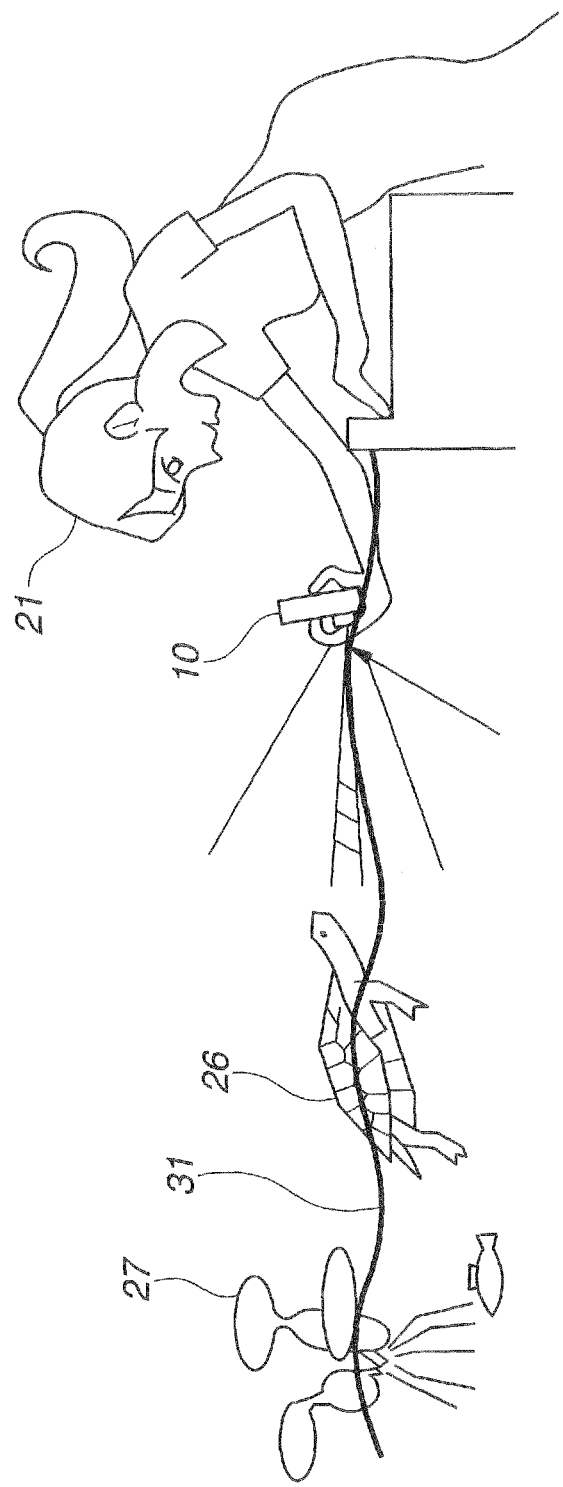
FIG. 15 is a diagram illustrating a situation in which the photographer is photographing an object in a semi-underwater state to automatically set a semi-underwater mode using a camera according to a fifth embodiment of the present invention.
Figure 16:
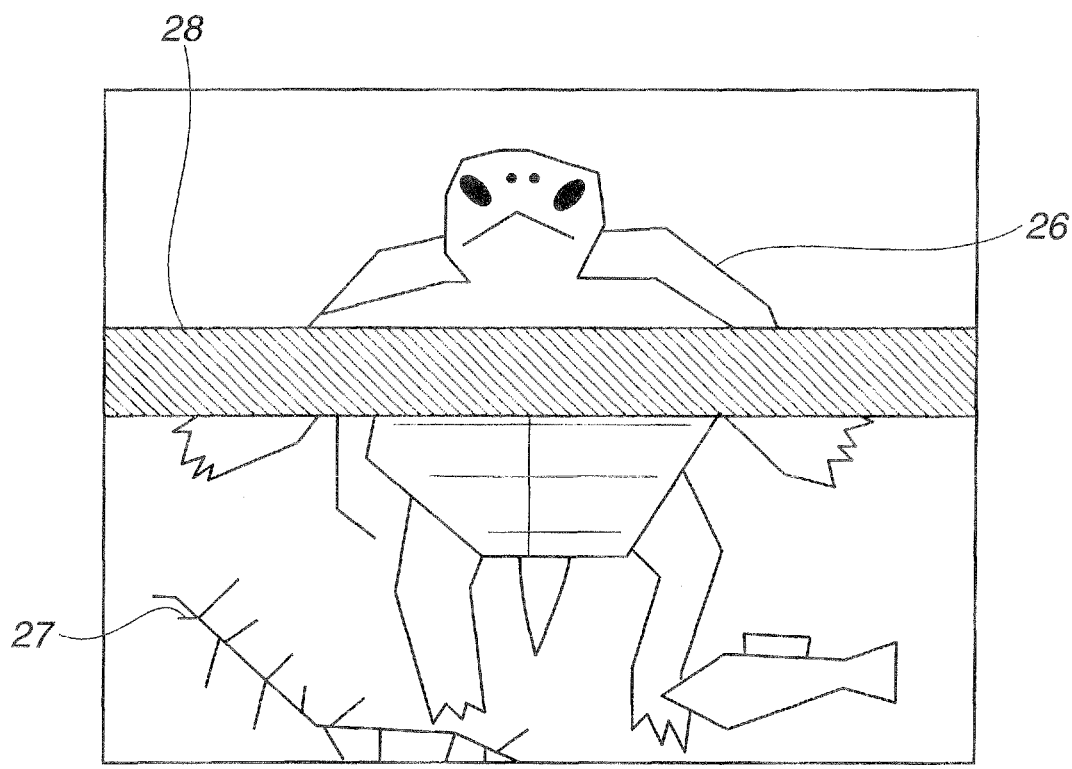
FIG. 16 is a diagram illustrating an image when taking a photograph in a semi-underwater mode using the camera according to the fifth embodiment of the present invention.

FIG. 15 shows a situation in which the photographer 21 takes a semi-underwater photograph of a turtle 26 which shows its head out of the water or a water plant 27 under water using the camera 10 and FIG. 16 is a photographed image in this case. The water surface 31 is actually swaying and the water surface portion does not form a straight line as shown in FIG. 16 and the boundary section has a band-like shape (see a boundary band 28 in FIG. 16).

Therefore, it is possible to determine the presence/absence of a semi-underwater state by detecting a low contrast portion with no image as the boundary band 28. That is, whether or not a low contrast portion extends in a band shape may be determined based on image data outputted from the image pickup section 2 of the camera 10. In this case, the acceleration detection section 7 determines whether the camera 10 is in a longitudinal position or a lateral position, and the acceleration detection section 7 determines that the camera 10 is in the semi-underwater state when the camera 10 is in the lateral position, if a band-shaped low contrast portion crosses the screen in the longitudinal direction of the photographing screen or when the camera 10 is in the longitudinal position, if a band-shaped low contrast portion crosses the screen in the direction perpendicular to the longitudinal direction of the photographing screen.

When the camera 10 is in a semi-underwater state, the present embodiment automatically sets the semi-underwater mode based on the aforementioned concept. Thus, since the circuit configuration of the present embodiment is substantially the same as that of the block diagram in FIG. 1 described in the first embodiment, detailed descriptions thereof will be omitted.

Figure 17:
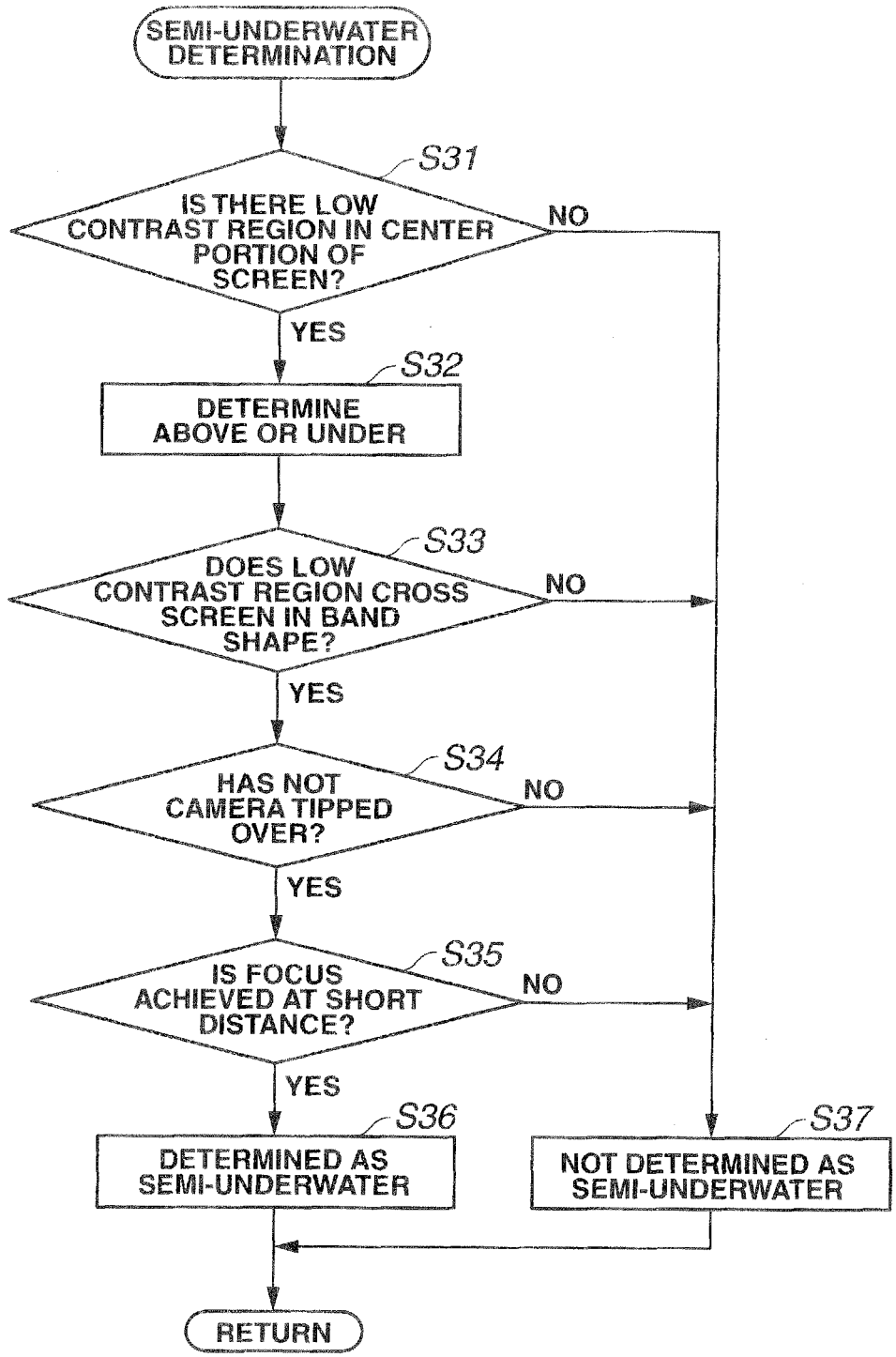
FIG. 17 is a flowchart illustrating a semi-underwater determining operation using the camera according to the fifth embodiment of the present invention.

The semi-underwater determining operation of determining whether or not a semi-underwater state is set according to the present embodiment will be described using a flowchart shown in FIG. 17. This flow is executed by the image processing and control section 1 based on a program stored beforehand as in the case of the first to fourth embodiments.

In the entire camera control flow, when a semi-underwater determining flow starts, the image processing and control section 1 first determines whether or not there is a low contrast region in the center portion of the screen (S31). Here, the image processing and control section 1 determines based on image data from the image pickup section 2 whether or not the center portion of the screen is in low contrast. Low contrast is determined by detecting whether or not there is a change between neighboring pixels and detecting that the change is small.

A case has been described where the screen width is assumed to be, for example, 10 and the ratio of occupation by under water and above water parts is assumed to be 5:5, but the present invention is not limited to this, and since photographing may be performed with other composition than 5:5, for example, a case with under water being 3 and above water being 7 or contrarily a case with under water being 7 and above water being 3, the region which is detected to be a low contrast or not may have a degree of freedom so as to support these cases.

As a result of the determination in step S31, if there is a low contrast region in the center portion of the screen, the image processing and control section 1 determines above water or under water next (S32). This processing is performed by determining whether the camera 10 is in a lateral position or in a longitudinal position based on the output of the acceleration detection section 7.

When above water or under water is determined, the image processing and control section 1 then determines whether or not the low contrast region crosses the screen in a band shape (S33). As described above, when the camera 10 is in the lateral position, the image processing and control section 1 determines whether or not the band-shaped low contrast region extends in the longitudinal direction of the screen.

Furthermore, when the camera 10 is in the longitudinal position, the image processing and control section 1 determines whether or not the band-shaped low contrast region extends in the direction orthogonal to the longitudinal direction of the screen.

Figure 20C:
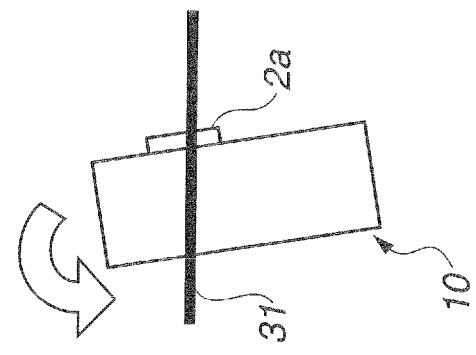
FIG. 20A to FIG. 20C are diagrams illustrating a state in which the camera according to the fifth embodiment of the present invention is used; a diagram illustrating a case where the camera is not inclined, a diagram illustrating a case where the camera is inclined forward and a diagram illustrating a case where the camera is inclined backward.
Figure 20B:
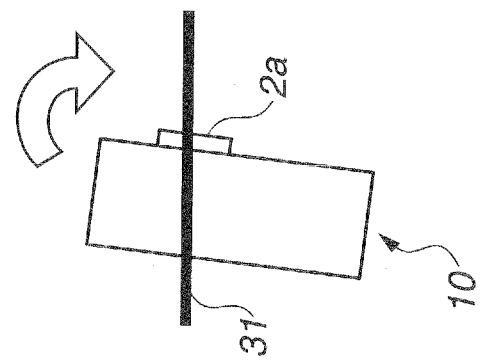
Figure 20A:
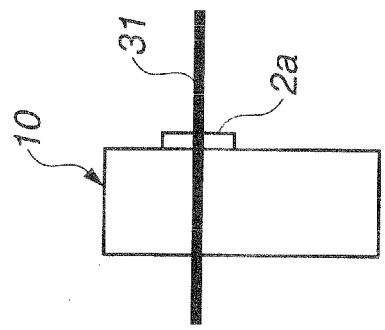

As a result of the determination in step S33, if the low contrast region crosses the screen in a band shape, the image processing and control section 1 then determines whether or not the camera 10 has tipped over (S34). When photographing is performed in a semi-underwater state, if the optical axis of the photographing lens 2*a* does not match or substantially parallel the water surface 31 as shown in FIG. 20A, the arrangement of the object under water and above water is not in a good condition. That is, if the photographing lens 2*a* is inclined downward as shown in FIG. 20B, the object under water occupies most of the screen, while if the photographing lens 2*a* is inclined upward as shown in FIG. 20C, the object above water occupies most of the screen. Thus, in step S34, the image processing and control section 1 determines whether or not the camera 10 has tipped over (inclined) based on the detection result of the acceleration detection section 7.

As a result of the determination in step S34, if the camera has not tipped over, the image processing and control section 1 then determines whether or not focus is achieved at a short distance (S35). Focusing of the photographing lens 2*a* is performed based on image data from the image pickup section 2, through so-called contrast AF.

In this step S35, the image processing and control section 1 detects the distance of the object subjected to the focusing through contrast AF and determines whether or not the distance is short, for example, close to 1 m. This is because light attenuates under water, an object located at a long distance appears dark as the object image and the semi-underwater mode is not set in the case of such a long distance.

As a result of the determination in step S35, if focus is achieved at a short distance, the image processing and control section 1 determines the camera to be semi-underwater (S36). From steps S31 to S35, there is a band-shaped low contrast region crossing the center portion of the screen, and the optical axis of the photographing lens 2*a* of the camera 10 substantially matches or parallels the water surface 31 and further focus is achieved at a short distance, and therefore the camera 10 is appropriate for semi-underwater photographing. Thus, in this step S36, the state is determined to be semi-underwater. After determining that the state is semi-underwater, the process returns to the main flow.

If the result of the determination in any one of steps S31, S33, S34 and S35 is NO, the image processing and control section 1 does not determine that the state is semi-underwater (S37). If the result of the determination in any one of steps S31, S33, S34 and S35 is NO, semi-underwater photographing is not appropriate, and therefore the image processing and control section 1 does not determine that the state is semi-underwater. After determining that the state is not semi-underwater, the process returns to the main flow.

Figure 18:
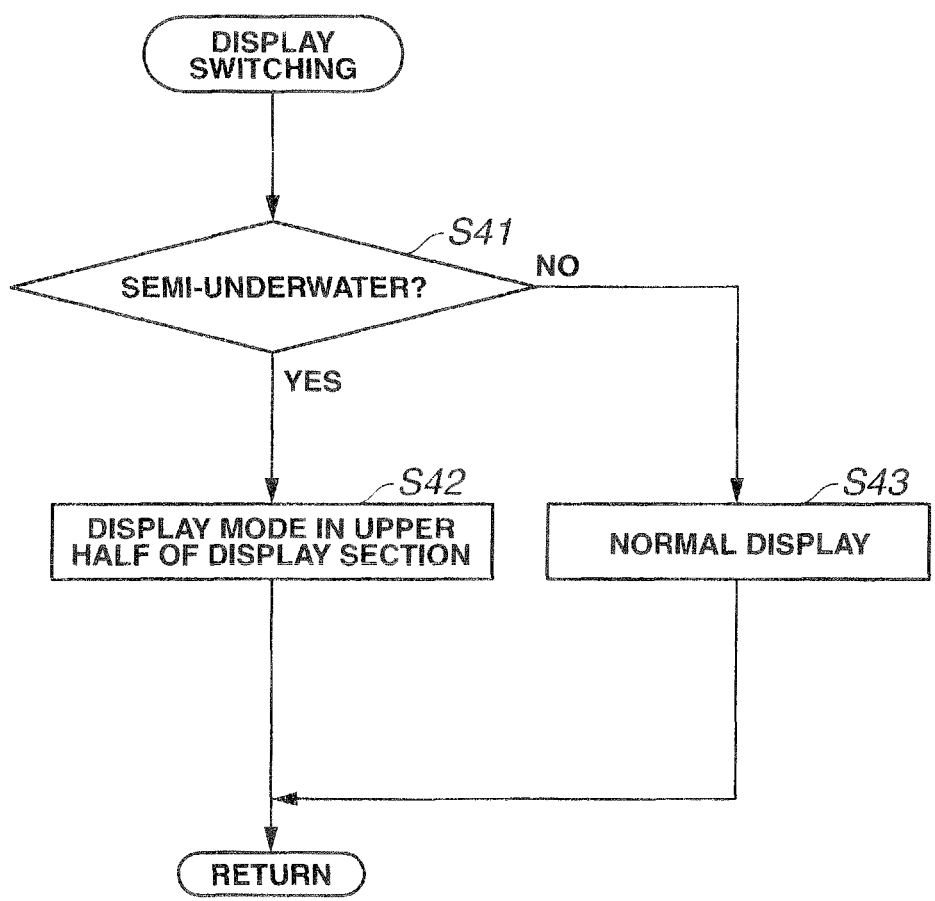
FIG. 18 is a flowchart illustrating a display switching operation using the camera according to the fifth embodiment of the present invention.

Next, the display switching operation according to the present embodiment will be described using the flowchart shown in FIG. 18. In the entire camera control flow, when the display switching flow starts, the image processing and control section 1 first determines whether or not the state is semi-underwater (S41). Since whether or not to set semi-underwater has been determined in aforementioned step S36 or S37, the determination in step S41 is made according to this determination.

As a result of the determination in step S41, if the state is semi-underwater, the display section 8 then displays the mode in the upper half portion of the display section 8 (S42).

Figure 19:
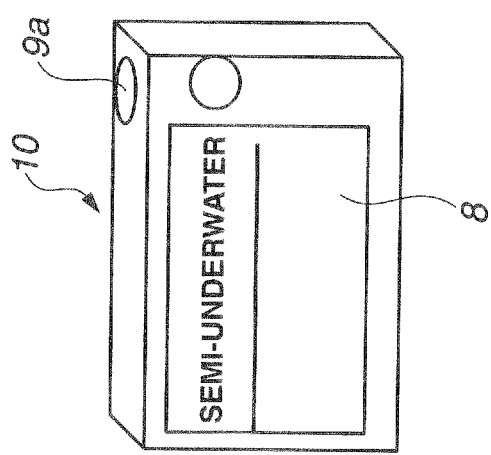
FIG. 19 is a diagram illustrating a state in which the camera according to the fifth embodiment of the present invention is used, showing a display example indicating that a semi-underwater mode is set.

Here, as shown in FIG. 19, a mode display "this is semi-underwater" is performed in the upper half portion of the display section 8 of the camera 10. Instead of this display, another expression such as "semi-underwater mode" may also be displayed or an icon or symbol may, of course, be displayed. Furthermore, after performing the mode display or while performing the mode display, the object images under water and above water are displayed in the portion exposed above water of the display section 8 as described in the first to fourth embodiments.

Figure 4:
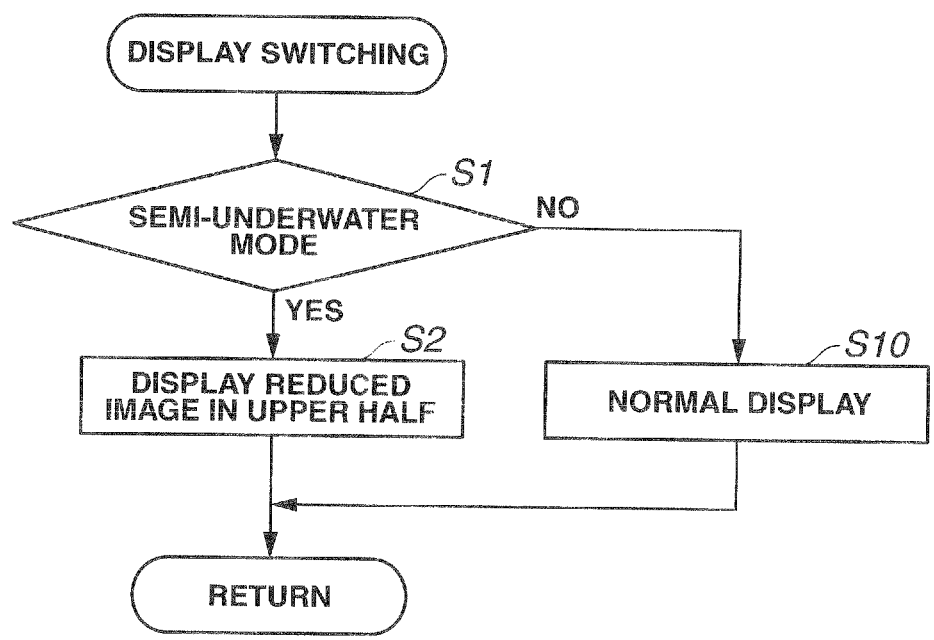
FIG. 4 is a diagram illustrating a flowchart of display switching operation of the camera according to the first embodiment of the present invention.

As a result of the determination in step S41, if the state is not semi-underwater, the display section 8 performs a normal display as in the case of step S10 in FIG. 4 (S43). In this step S43, the object image is displayed on the full screen of the display section 8 based on image data outputted from the image pickup section 2. After performing the display in step S42 or S43, the process returns to the main flow.

Thus, when a state appropriate for semi-underwater photographing is set, the fifth embodiment of the present invention automatically sets a semi-underwater mode and displays the object images under water and above water in an easy-to-see way. This feature is convenient because the mode is automatically set without bothering to set the semi-underwater mode. It is determined based on image data whether or not the state is semi-underwater and there is no need to particularly provide a sensor to determine whether or not the state is semi-underwater.

The present embodiment determines in steps S31 to S35 whether or not the state is semi-underwater, but such a determination may also be made with a time variation taken into consideration such as using information on camera shake and a positional relationship of the low contrast region or the like. When there is an angle variation of the camera due to camera shake, if a low contrast band-shaped pattern varies together with camera shake, this may be interpreted that the water surface is detected. When a scene of sky with no contrast or the like is photographed, there can be a low contrast region, but since the shape pattern such as the width of the band of the low contrast region never changes together with camera shake in this case, the low contrast region can be distinguished from the water surface.

Furthermore, the present embodiment determines whether or not the semi-underwater state is set using image data or the like. However, the present invention is not limited to this, and if a sensor or the like can be added, for example, a water detection sensor may be provided to detect whether or not the water surface 31 matches or parallels the optical axis of the photographing lens 2*a* and automatically set a semi-underwater mode based on the detection result of the sensor.

Furthermore, in the aforementioned first to fourth embodiments the semi-underwater mode is manually set. However, it may, of course, be possible to add the semi-underwater determination in the present embodiment and automatically switch to the semi-underwater mode.

As described above, when the semi-underwater mode is set, the embodiments of the present invention limit the display range on the display section, and therefore when both objects under water and above water are simultaneously displayed, objects can be observed more easily.

Although the embodiments of the present invention have described the case where the display section uses a liquid crystal monitor, the present invention is not limited to the liquid crystal monitor, but other monitor displays such as organic EL may, of course, be used.

Furthermore, although the embodiments of the present invention have described the case where a digital camera is used as an apparatus for photographing, any type of camera can be used, such as digital single-lens reflex camera, compact digital camera, camera for moving images such as video camera, movie camera or further a camera incorporated in a cellular phone, portable information terminal (PDA: Personal Digital Assist), game machine. The present invention is applicable to any photographing apparatus if such an apparatus allows underwater photographing.

The present invention is not limited to the above described embodiments as they are, but components thereof may be modified and embodied without departing from the spirit and scope of the embodiments. Moreover, various inventions may be formed by combining a plurality of components disclosed in the above described embodiments as appropriate. For example, some of all components disclosed in the embodiments may be removed. Furthermore, components of different embodiments may be combined as appropriate.

Sixth Embodiment

Figure 21:
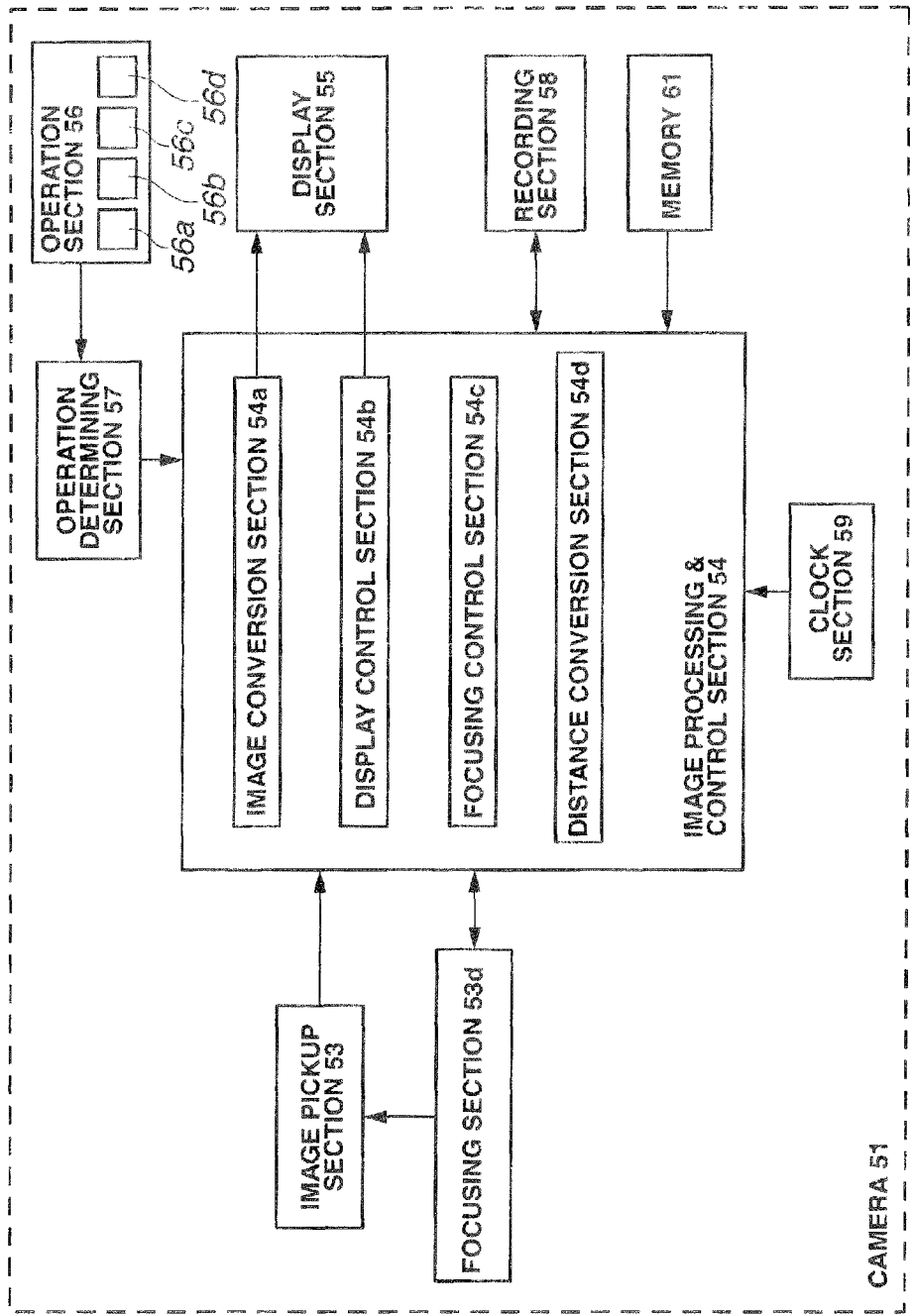
FIG. 21 is a block diagram illustrating a configuration of a camera according to a sixth embodiment of the present invention.
Figure 22A:
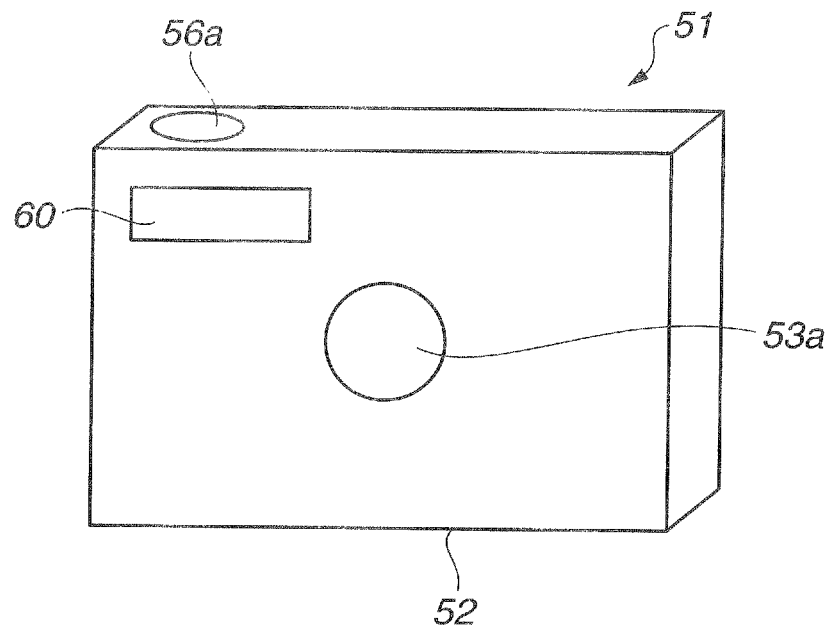
FIG. 22A is a perspective view illustrating a configuration of the front side of the camera.
Figure 22B:
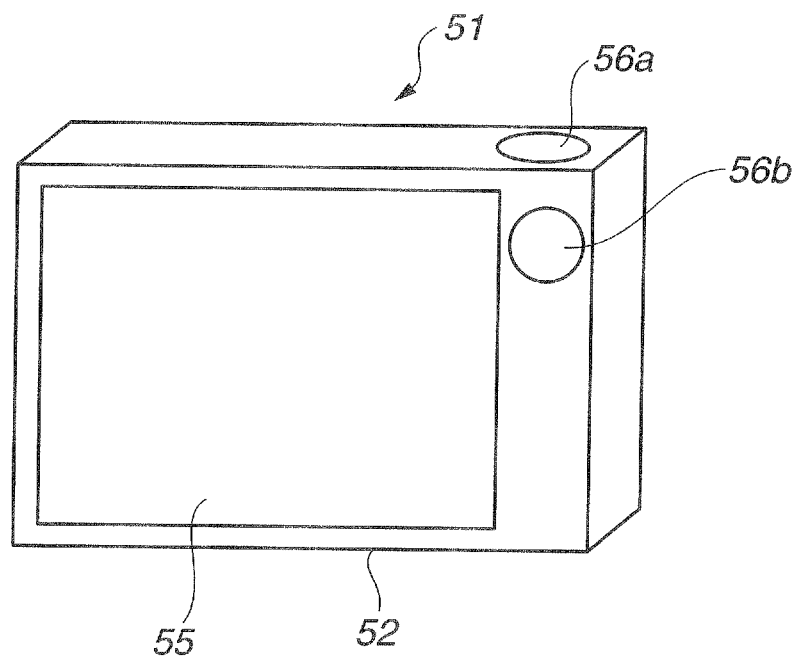
FIG. 22B is a perspective view illustrating a configuration of the back side of the camera.

A camera 51 having a waterproof structure provided with a photographing function according to a sixth embodiment of the present invention shown in FIG. 21 has a box shape as shown in FIG. 22A and FIG. 22B. A photographing lens 53a that constitutes an image pickup section 53 for picking up (photographing) an image of an object is provided near the center of the front side of a case 52 having a waterproof structure as an enclosure of this camera 51.

Figure 27:
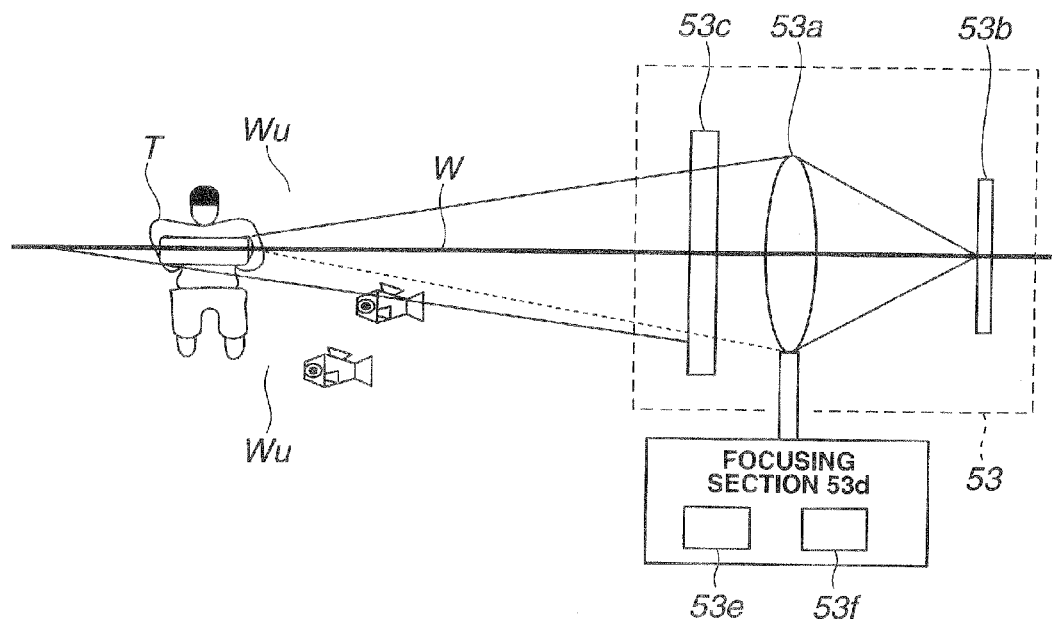
FIG. 27 illustrates focusing according to the sixth embodiment.
Figure 28A:
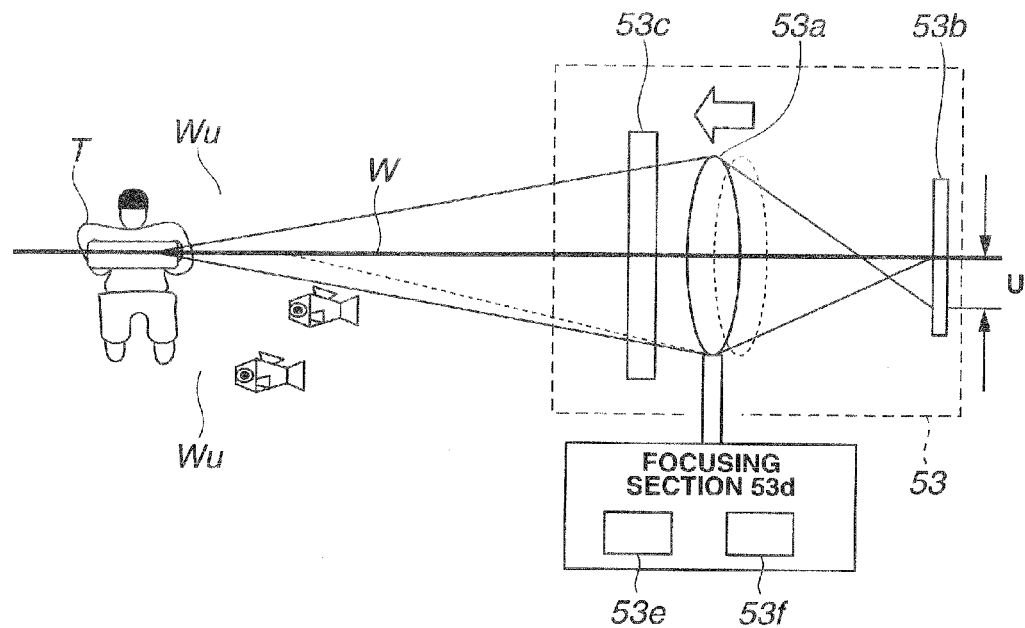
FIG. 28A is a diagram illustrating a focusing operation in a semi-underwater photographing mode according to the sixth embodiment.
Figure 28B:
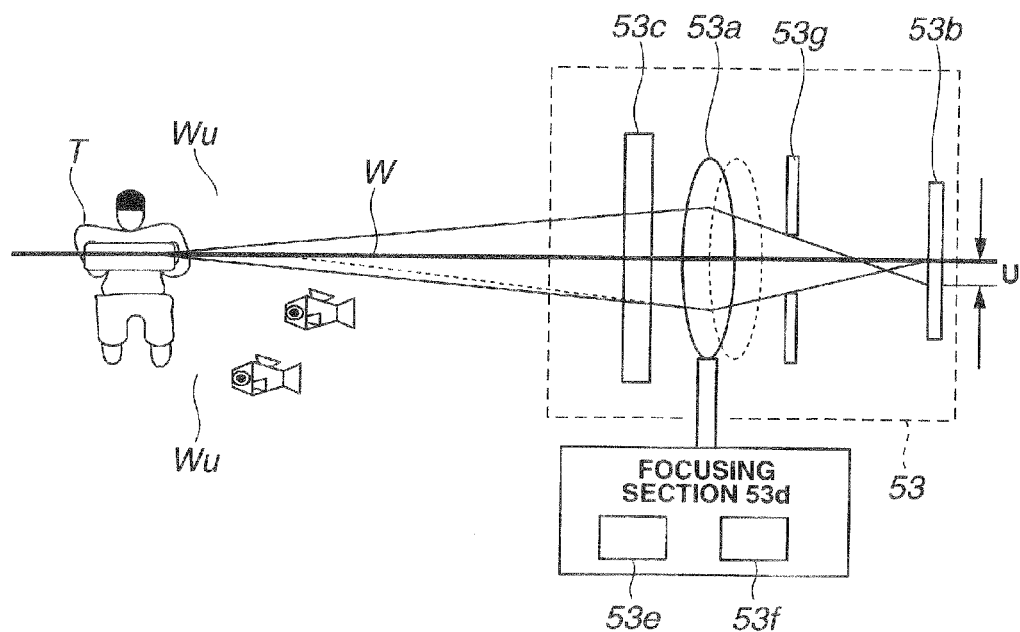
FIG. 28B is a diagram illustrating the focusing operation in FIG. 28A with the focus further narrowed down.

Actually, as shown in FIG. 27, FIG. 28A and FIG. 28B, a cover glass 53c is disposed before the photographing lens 53a, which makes it watertight and protects the photographing lens 53a. Furthermore, the cover glass 53c and the photographing lens 53a are mounted in a lens barrel (not shown). An image pickup device 53b such as CCD is disposed at an image forming position of the photographing lens 53a, and the photographing lens 53a and the image pickup device 53b form an image pickup section 53 in FIG. 21.

Furthermore, as shown in FIG. 21, the image pickup section 53 can focus an object image formed on the image pickup plane of the image pickup device 53b through a focusing section 53d. The focusing section 53d is configured using, for example, a drive section 53e (see FIG. 27) that moves the photographing lens 53a in the optical axis direction.

Instead of moving the photographing lens 53a by the drive section 53e, the image pickup device 53b may be configured to move in the optical axis direction. Furthermore, although the image pickup section 53 and the focusing section 53d are shown as independent bodies in FIG. 21 or the like, the image pickup section 53 may also be configured to include the focusing section 53d.

The image pickup device 53b of the image pickup section 53 outputs an image pickup signal, which is an object image formed on the image pickup plane and then photoelectrically converted, to an image processing & control section 54 that performs image processing and control shown in FIG. 21.

The image processing & control section 54 performs image processing on the image pickup signal, generates an image signal for display and outputs the image signal to a display section 55. The display section 55 displays an image corresponding to the inputted image signal for display on a display screen (also simply referred to as a "screen").

The image displayed on the display section 55 is an image corresponding to the object image formed on the image pickup plane of the image pickup device 53b and the user observes the image and uses the image to check whether or not to be recorded as a photographed image.

Figure 26:
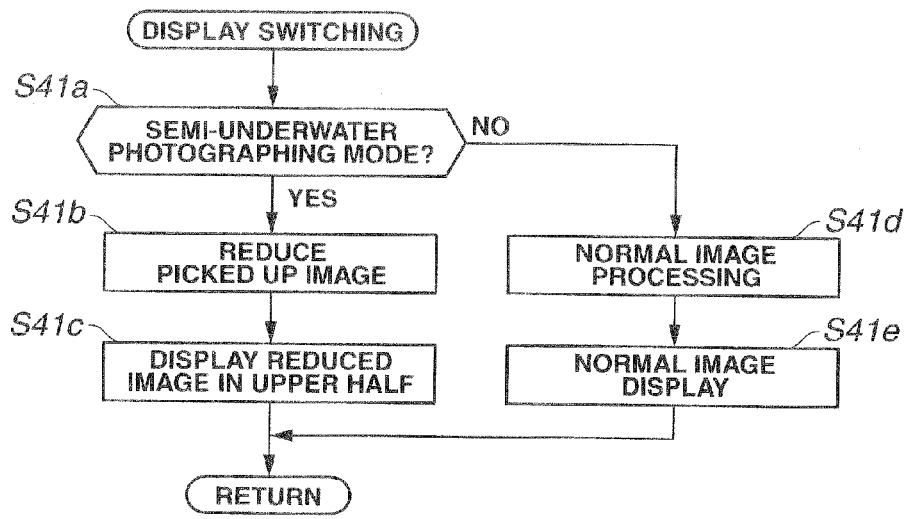
FIG. 26 is a flowchart illustrating display processing when the display in FIG. 25A

Thus, in a normal photographing mode, the image processing & control section 54 displays the object image formed on the image pickup plane of the image pickup device 53b on the screen of the display section 55 as a normal image (see FIG. 26).

On the other hand, as will be described later, in a photographing state when a semi-underwater photographing mode is set, the user cannot substantially observe part of the screen of the display section 55, and therefore the present embodiment has the function of switching the mode to a display mode which is different from the normal mode to display the image.

The display section 55 is formed on the back side of the case 52 as shown in FIG. 22B using, for example, a liquid crystal panel in a rectangular size which is slightly smaller than the whole plane.

Furthermore, as shown in FIG. 22A and FIG. 22B, a release button 56a that performs a photographing operation is provided for example on the right side position of the top surface of the case 52. When the photographer (user) operates an operation section 56 including the release button 56a as shown in FIG. 21, the operation result is determined by an operation determining section 57.

The information on the determination result of the operation determining section 57 is inputted to the image processing & control section 54. The image processing & control section 54 performs control corresponding to the determination result.

When the operation determining section 57 determines a release operation (photographing instruction operation), the image processing & control section 54 records the image picked up by the image pickup section 53 in a recording section 58 as a photographed image.

Furthermore, a mode setting switch 56b as shown in FIG. 22B is provided as the operation section 56 shown in FIG. 21.

Operating the mode setting switch 56b, the user can set a photographing mode or a reproducing mode, set a semi-underwater photographing mode, which will be described later, select focusing or a display or the like from a switch menu.

The mode setting switch 56b has the function of a semi-underwater photographing mode setting section for setting a semi-underwater photographing mode.

In addition to the mode setting switch 56b that has a plurality of setting functions, operation buttons or the like may be provided whereby the user directly performs various instruction operations. Furthermore, operation buttons may also be provided which independently perform a plurality of functions that can be selected from the mode setting switch 56b.

For example, a semi-underwater photographing mode button may be independently provided which performs an instruction operation for setting a semi-underwater photographing mode. FIG. 21 shows an example where a semi-underwater photographing mode button 56c is provided in the operation section 56, which has the function as a semi-underwater photographing mode setting section.

Furthermore, the present embodiment performs focusing control over an image of an object on the above water side when the semi-underwater photographing mode is set, but when the distance to the object on the above water side is large, the present embodiment provides a condition which gives priority to focusing on the image of the object on the underwater side in consideration of underwater transparency.

To determine whether or not this condition is met, the operation section 56 is provided with a boundary distance setting button 56d which changes/sets the value of a boundary distance Lb corresponding to a boundary in consideration of underwater transparency.

The boundary distance Lb is set to, for example, Lb=3 m as a default setting. The user can change/set the boundary distance Lb to a value corresponding to the actual underwater transparency by operating the boundary distance setting button 56d.

A clock section 59 that outputs information on a clock is connected to the image processing & control section 54 and when a photographing operation or the like is performed, the image processing & control section 54 adds information on a photographing date and time to an image recorded in the recording section 58 and records the information. Furthermore, a strobe apparatus 60 is provided on the front of the case 52 as shown in FIG. 22A.

Figure 23A:
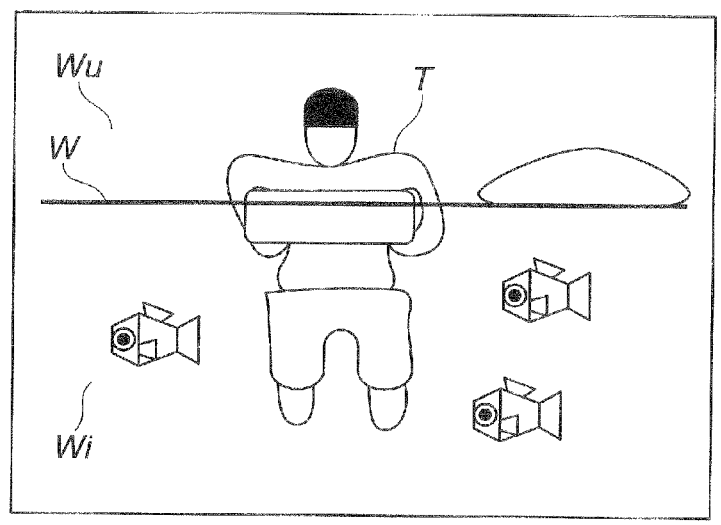
FIG. 23A is a diagram illustrating an object straddling above water and under water.

The camera 51 of the present embodiment is intended to be able to simultaneously and simply photograph objects above water such as the face of a figure, ship and landscape on the above water side and objects under water such as part of the figure, fish, turtle, and water plant on the underwater side as shown in FIG. 23A. Photographing objects above water and objects under water simultaneously is referred to as "semi-underwater photographing."

According to the present embodiment, when the user performs an instruction operation using, for example, the semi-underwater photographing mode button 56c, the image processing & control section 54 sets the camera 51 in a state in which a semi-underwater photographing mode (to perform semi-underwater photographing) is set and the camera 51 is set to an operation state in the semi-underwater photographing mode.

In FIG. 23A or the like, reference character W denotes the water surface, Wu denotes a portion on the above water side and Wi denotes a portion on the underwater side. Furthermore, reference character T denotes an object of a figure straddling above water and under water to be photographed in the semi-underwater photographing mode (for simplicity).

In the present embodiment, the image processing & control section 54 in FIG. 21 is configured to have the functions of an image conversion section 54a, a display control section 54b, a focusing control section 54c and a distance conversion section 54d as will be described so as to be able to attain the above described object.

Furthermore, the image processing & control section 54 is configured using, for example, a CPU, and a memory 61 that stores a program to execute the respective functions is connected to the image processing & control section 54. The memory 61 is made up of a non-volatile memory such as flash memory. Furthermore, the image processing & control section 54 is internally provided with a memory (not shown) such as RAM to temporarily store data or the like used in executing various functions.

Figure 23B:
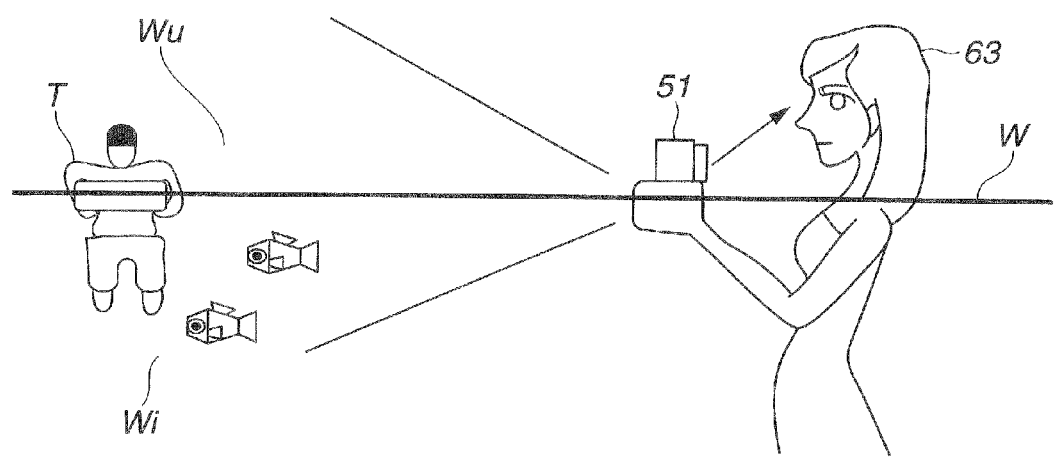
FIG. 23B is a diagram illustrating a situation in a semi-underwater photographing mode in which the user is simultaneously photographing both parts of the object straddling above water and under water shown in FIG. 23A using the camera.

When performing semi-underwater photographing as described above, a user 63 can preferably perform a photographing operation by keeping his/her face out of water in air (above water) as shown in FIG. 23B. The user 63 may also be able to perform a photographing operation while holding his/her breath under water, but the user can hardly concentrate on photographing, and therefore the user may preferably keep his/her face above water to readily enjoy photographing as described above.

In the case of FIG. 23B, nearly half of the display plane of the display section 55 on the back side of the camera 51 is submerged below the water surface (see FIG. 24). In this case, the display section 55 may be placed face up or a dedicated adapter may be used to prevent the display section 55 from being submerged in water. However, if the display section 55 is placed face up, the photographing direction of the photographing lens 53a on the front side is downward and it is difficult to perform desired semi-underwater photographing.

Furthermore, a dedicated adapter is not appropriate for applications where semi-underwater photographing is readily performed and it is difficult to guarantee robustness necessary for the camera 51 used for underwater photographing.

Figure 24:
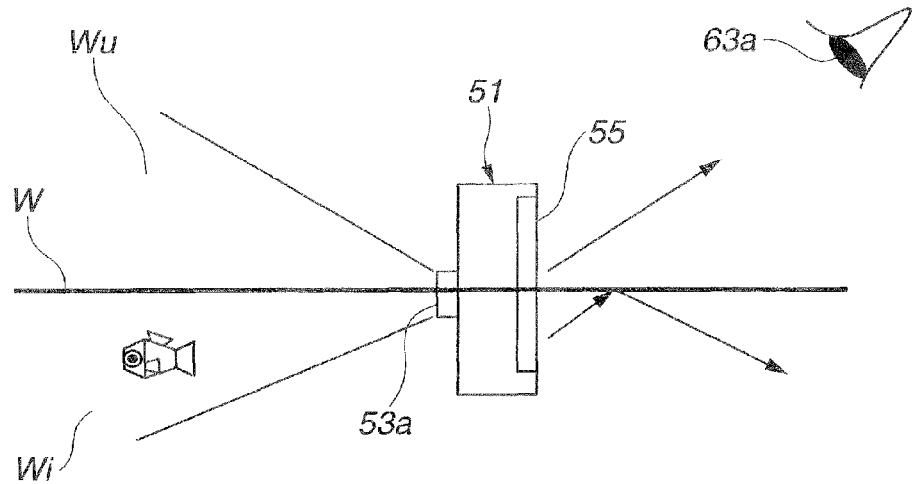
FIG. 24 is a diagram illustrating a state of the display section of the camera and the like in a semi-underwater photographing mode.

The camera 51 shown in FIG. 23B is set in a state as shown in FIG. 24. In the state of semi-underwater photographing mode set as shown in FIG. 24, about the lower half portion of the photographing lens 53a on the front side of the camera 51 is submerged in water and the lower half portion of the display section 55 is likewise submerged in water.

Since the refractive index of water nw (=1.33) is considerably greater than the refractive index of air na (=1), the user 63 cannot view the display image of the portion under water (submerged portion) in the display section 55 in such a state.

That is, most of light on the display section 55 from the underwater portion is reflected on the water surface as shown in FIG. 24 and does not reach the eyes 63a of the user or deviates from the direction of the eyes 63a (of the user 63) due to refraction (part of the object near the water surface may be observed depending on the viewing direction of the user 63 or may be seen compressed up and down depending on the angle, but is hard to be seen anyway).

Figure 25A:
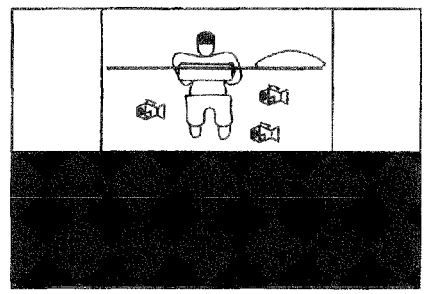
FIG. 25A is a diagram illustrating an example of how an image looks on the display section according to the sixth embodiment.
Figure 25B:
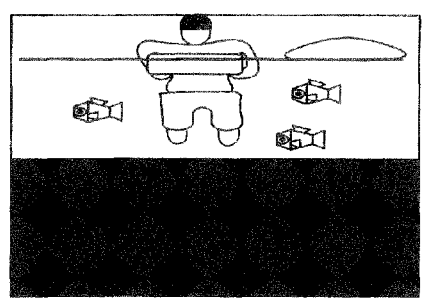
FIG. 25B is a diagram illustrating another example of how an image looks on the display section according to the sixth embodiment.
Figure 25C:
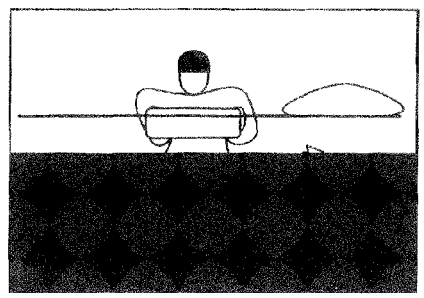
FIG. 25C is a diagram illustrating a typical example of how an image looks on the display section according to a conventional example.

Therefore, when the user views the display image displayed on the display section using a conventional camera, the image actually looks as shown in FIG. 25C. That is, as shown in FIG. 25C, only objects on the above water side and part of objects near the water surface can be observed.

Therefore, (with the conventional example camera), there is such inconvenience that the user cannot observe most of the display image below the vicinity of the surface of water, which constitutes a disadvantage that it is difficult to check the image during photographing. To solve such inconvenience, the present embodiment adopts the following configuration.

According to the present embodiment, when a semi-underwater photographing mode is set, the image processing & control section 54 (image processing section provided therein) shown in FIG. 21 has the function of the image conversion section 54a that converts the image picked up by the image pickup section 53 to an image obtained by reducing the longitudinal and lateral sizes of the picked up image or an image obtained by reducing (compressing) only the size in the longitudinal direction.

Furthermore, when a semi-underwater photographing mode is set, the image processing & control section 54 (control section provided therein) has the function of the display control section 54b of performing control so as to change the display position (display region) when the image generated by the image conversion section 54a is displayed on the display section 55.

To be more specific, when the semi-underwater photographing mode is set, the display control section 54b controls display switching so as to display the image generated by the image conversion section 54a in, for example, substantially the upper half portion of the region of the full screen of the display section 55.

FIG. 25A and FIG. 25B illustrate how an image looks when a display example on the display section 55 or image displayed on the display section 55 according to the present embodiment is actually observed when the semi-underwater photographing mode is set.

In this case, image display examples are shown where the picked up image is reduced to ½ in longitudinal and lateral sizes or reduced to ½ only in the longitudinal direction by the image conversion section 54a.

The present embodiment reduces the size of the picked up image so as to be displayed on substantially the upper half portion of the screen (region) of the full screen of the display section 55. The objects above water and under water reduced in size are accommodated within the upper half portion of the screen and displayed. In this case, nothing is displayed on the substantially lower half portion of the screen of the display section 55 submerged in water.

In this case, even if there is a region of the screen that cannot be seen even when (the image thereof is) observed because of submersion in water, the picked up image can be observed without being substantially affected by the screen region. The user 63 can then check the picked up image corresponding to the object image formed on the image pickup plane of the image pickup device 53b before photographing.

FIG. 26 illustrates a processing procedure in the present embodiment when a picked up image is displayed on the display section 55 through the control by the image processing & control section 54 when the semi-underwater photographing mode is set. When the display switching processing starts, the image processing & control section 54 determines whether or not the semi-underwater photographing mode is set in first step S41a.

When the determination result shows that the semi-underwater photographing mode is set, the image conversion section 54a performs image processing of reducing the size of the picked up image as shown in step S41b, and reduces the size to, for example, ½. Furthermore, in next step S41c, the display control section 54b displays the compressed image on the upper half portion of the screen of the display section 55 and ends this processing.

On the other hand, when the determination result in step S41a shows that the semi-underwater photographing mode is not set, the image processing & control section 54 performs normal image processing as shown in step S41d. In this case, the image processing & control section 54 generates an image for normal display without reducing the size of the picked up image.

Furthermore, in next step S41e, the image processing & control section 54 performs control so as to perform a normal image display. In this case, the display image is displayed using the full screen of the display section 55. After the processing in step S41e, the processing in FIG. 26 ends.

Figure 30:
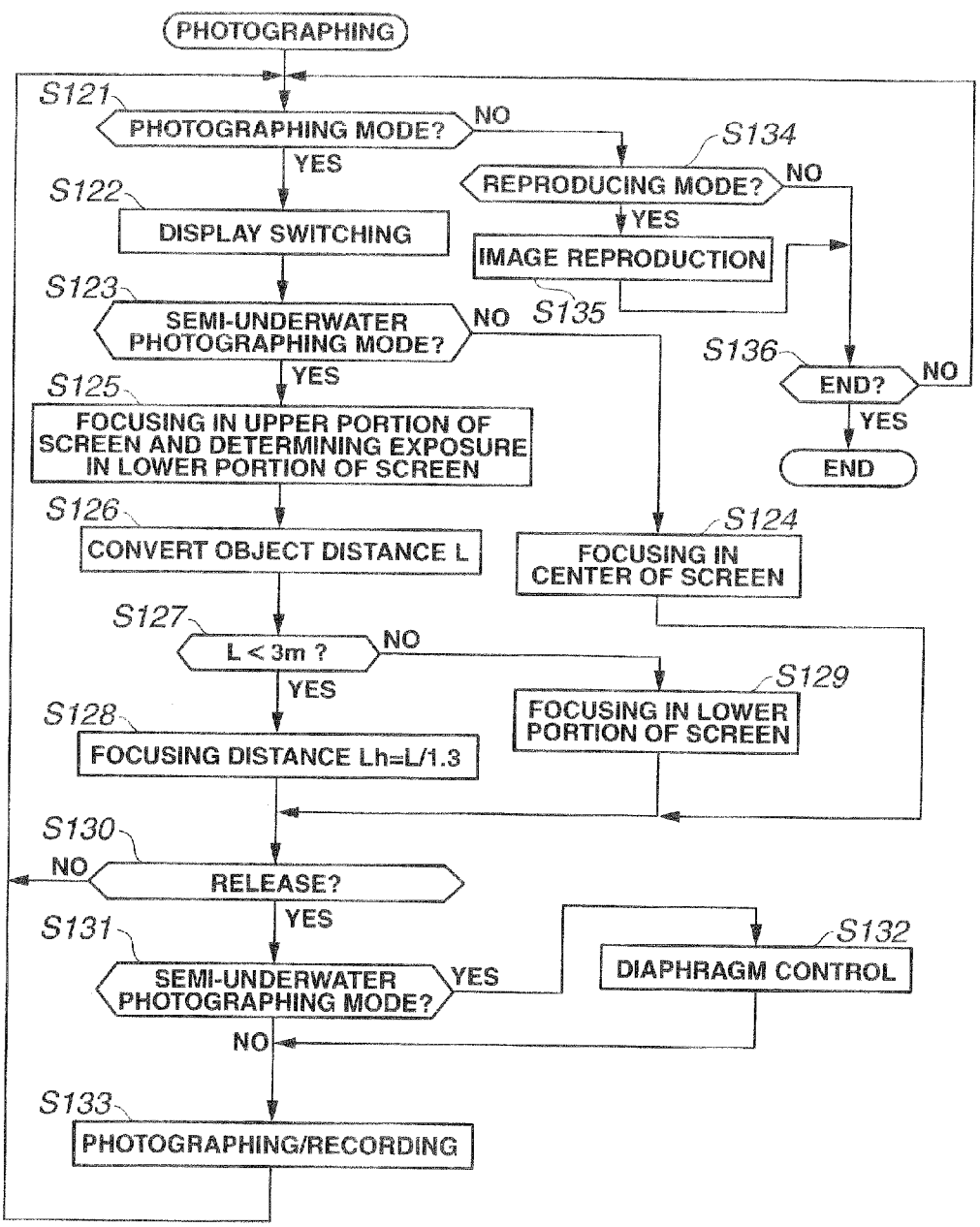
FIG. 30 is a flowchart illustrating a processing procedure for a photographing operation by an image processing & control section according to the sixth embodiment.

Since the processing in FIG. 26 is actually processing in step S122 in FIG. 30, when the processing in FIG. 26 ends, the process moves to processing in next step S123 in FIG. 30.

When the semi-underwater photographing mode is set, by reducing the size of the image and performing display control of the reduced image in this way, the image is displayed so that the user 63 can simultaneously observe the objects above water and under water as shown in FIG. 25A or FIG. 25B.

Although a case has been described above where when the picked up image is reduced in size, the image conversion section 54a reduces the size thereof to ½, the present invention is not limited to this case, but the user 63 may set the size of reduction or select a predetermined size of reduction and allow the selected size to be set. Furthermore, the user may be allowed to select a case where both sizes in longitudinal and lateral directions are reduced or a case where only the size in the longitudinal direction is reduced.

Furthermore, when the display position is changed by the display control section 54b, the display position may be enabled to be changed in conjunction with the size of reduction.

Furthermore, when the semi-underwater photographing mode is set, the present embodiment is designed to be able to pick up and photograph images of objects above water and under water more clearly.

When the user 63 performs focusing in the semi-underwater photographing mode, the operation above water is easier than that under water. To be more specific, there are various kinds of inconvenience, for example, since the user 63 cannot breathe under water, the user cannot hold his/her breath until focusing is done and photographing is performed or it is difficult to perform stable focusing or the like due to buoyancy or the focus position is not stable because fish are actively moving. By contrast, no such inconvenience exists above water and the operation is easier.

FIG. 27 shows a state in which the photographing lens 53a of the image pickup section 53 is focused, for example, on an object on the above water side when the semi-underwater photographing mode is set for the object.

The photographing lens 53a making up the image pickup section 53 illustrated in FIG. 27 is allowed to move in the optical axis direction by the drive section 53e making up the focusing section 53d. Furthermore, the focusing section 53d is provided with a position sensor 53f, which detects the position of the photographing lens 53a set by the drive section 53e and outputs the position information to the focusing control section 54c and the distance conversion section 54d of the image processing & control section 54.

As shown in FIG. 27, when focus is achieved, for example, on the figure object T as an object on the above water side, focus is achieved on a (distance) position behind the figure object T under water due to the refractive index under water.

This case (state in which focus is achieved on a position behind the figure object T under water) is inconvenient because in this direction, focus on fish or the like in front of the figure object T is less likely to be achieved. Furthermore, for reasons related to underwater transparency (transmissivity), a distant view is more likely to become obscure under water than above water. It is inconvenient to achieve focus on a distant object on the underwater side rather than the above water side for this reason, too.

Thus, in the present embodiment, the focusing control section 54c of the image processing & control section 54 performs control such that focus is achieved (focus setting) at a shorter distance than the focus position shown in FIG. 27.

FIG. 28A and FIG. 28B illustrate a control state of the (photographing lens 53a of the) image pickup section 53 in which this focusing control section 54c has achieved focus. As shown in FIG. 28A, the photographing lens 53a is set at a position ahead of the position of the photographing lens 53a shown in FIG. 27 (position shown by a dotted line in FIG. 28A).

By so setting, focus is achieved at a shorter distance than the focus position in FIG. 27. FIG. 28A and FIG. 28B illustrate an approximate amount of blur U as the amount of deviation of the image formed on the image pickup device 53b through the optical path on the above water side from the image focused on the underwater side from a position above water.

FIG. 28B further illustrates a state in which the brightness (aperture) is narrowed down by a (brightness) diaphragm 53g provided for the image pickup section 53 in the state of FIG. 28A. When the diaphragm 53g narrows down the brightness, it is possible to increase the depth of field and decrease the amount of blur U compared to the case in FIG. 28A.

Figure 29:
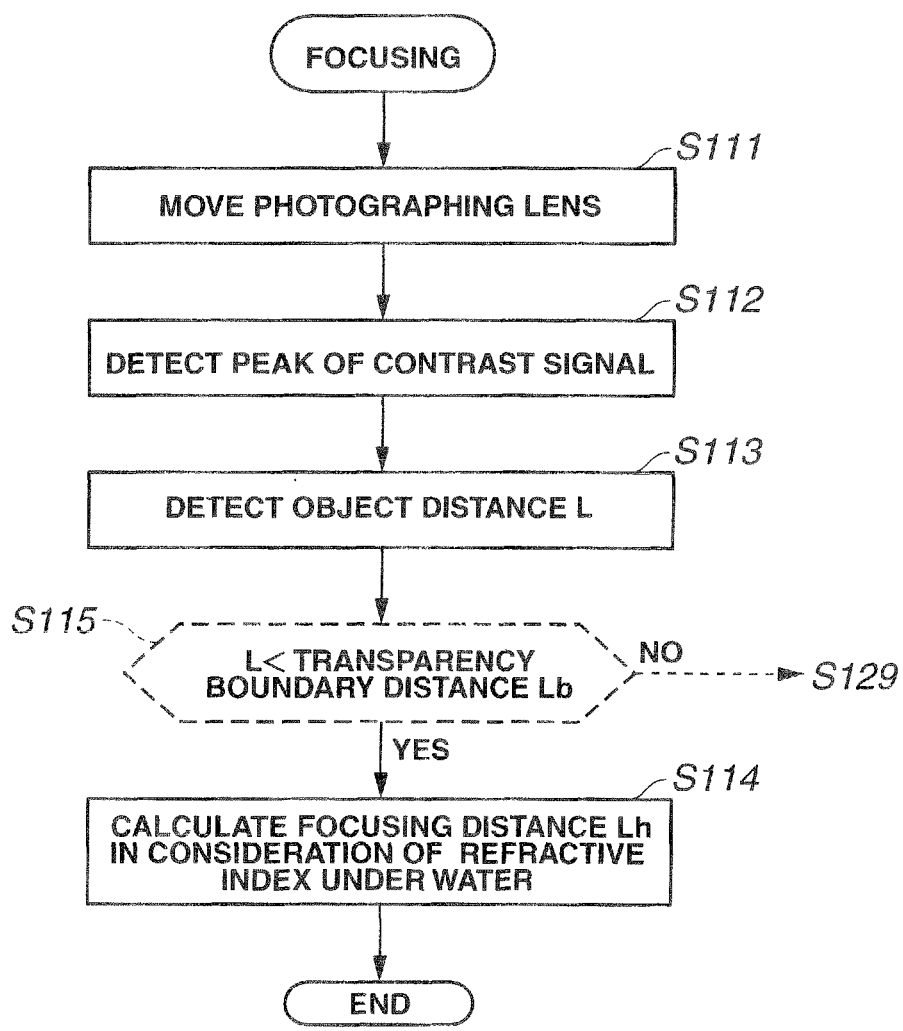
FIG. 29 is a flowchart illustrating a focusing processing procedure according to the sixth embodiment.

The focusing processing method here is as shown in FIG. 29. When the focusing in the semi-underwater photographing mode starts, the focusing control section 54c of the image processing & control section 54 drives the drive section 53*e* of the focusing section 53*d* in first step S111 and moves the photographing lens 53*a* in the optical axis direction.

During the movement, the image processing & control section 54 detects a contrast signal corresponding to a difference between the brightness signal of the brightest portion and the brightness signal of the darkest portion obtained from each frame of the image pickup signal of the image pickup device 53*b*.

In step S112, the image processing & control section 54 sets the photographing lens 53*a* at a position where the contrast signal reaches a peak. The set position is detected by the position sensor 53*f* and the position sensor 53*f* sends the position information to the distance conversion section 54*d*.

In next step S113, the distance conversion section 54*d* calculates a distance (referred to as "object distance") L to the focused object from the position information.

Furthermore, in next step S114, the distance conversion section 54*d* calculates a distance on the shorter distance side than the obtained object distance L as a focusing distance Lh corresponding to the actual focusing in consideration of the refractive index of water nw (=1.33) (step S115 will be described later).

In this case, the distance conversion section 54*d* of the image processing & control section 54 determines the focusing distance Lh from L/C using a correction coefficient C (e.g., C=1.3 as a default value as will be described in FIG. 30) provided beforehand for the object distance L.

In other words, the distance conversion section 54*d* converts the object distance L obtained on the above water side to the focusing distance Lh appropriate for (image pickup and) photographing for both objects above water and under water clearly.

The distance conversion section 54*d* then sends the focusing distance Lh to the focusing control section 54*c* and ends the processing of calculating the focusing distance Lh in FIG. 29. In FIG. 30, as will be described later, the processing in step S115 is performed which takes into consideration the transparency as shown by a dotted line between steps S113 and S114 in FIG. 29.

The processing procedure except step S115 in FIG. 29 corresponds to a case where the object on the above water side is at least not distant (e.g., the figure object T) in FIG. 28A and FIG. 28B. In the case of the object distance L which is farther than the boundary distance Lb which takes the underwater transparency into consideration, focus is achieved on the object on the underwater side.

As described above, due to underwater transparency, the object on the underwater side becomes obscure compared to the object on the above water side as the distance increases (the object becomes far) under water. Therefore, when the object distance L exceeds a predetermined boundary distance Lb (3 m according to the default value in FIG. 30), the present embodiment gives priority to focusing on the object under water in consideration of the influence of underwater transparency.

Thus, it is determined in step S115 in FIG. 29 whether or not the object distance L is smaller than the boundary distance Lb in consideration of transparency.

When the object distance L is smaller than the boundary distance Lb, the process moves to step S14. On the other hand, when the object distance L is equal to or greater than the boundary distance Lb, focusing is performed on the object portion under water, as will be described in step S129 in FIG. 30.

Therefore, when performing focusing in the semi-underwater photographing mode, the focusing control section 54*c* in the present embodiment calculates the object distance L with respect to the above water object and performs control so as to set a focus position by performing focusing in consideration of the refractive index under water and performs control, when the object distance L is equal to or greater than the boundary distance Lb of transparency, so as to perform focusing on the object under water.

In other words, the focusing control section 54*c* of the present embodiment performs control so as to set the photographing lens 53*a* under a distance condition in consideration of underwater transparency and at a focus position at a distance in consideration of the refractive index under water.

The operation according to a typical processing procedure associated with photographing under the control of the image processing & control section 54 in the camera 51 in such a configuration is as shown in FIG. 30.

When the photographing operation starts, the image processing & control section 54 determines whether or not the user 63 has set a photographing mode in first step S121. When the photographing mode is set, the user 63 performs display switching appropriate for the photographing mode in next step S122.

In next step S123, the image processing & control section 54 determines whether or not the semi-underwater photographing mode is set by the user 63. When the semi-underwater photographing mode is not set, the focusing control section 54*c* of the image processing & control section 54 performs focusing in the center of the screen as shown in step S124. After that, the process moves to processing in step S130.

On the other hand, when the semi-underwater photographing mode is set by the user 63 in step S123, the focusing control section 54*c* of the image processing & control section 54 performs focusing in the upper portion of the screen in next step S125 and determines exposure in the lower portion of the section.

The image processing & control section 54 performs processing such as focusing on the image on the image pickup plane of the image pickup device 53*b* (e.g., an image of the object is formed upside down on the image pickup plane). This will be described with reference to the state in which the object image is displayed on the screen of the display section 55 (the object is not turned upside down).

That is, the focusing control section 54*c* performs focusing on the object above water based on the image pickup signal and calculates (detects) the aforementioned object distance L. On the other hand, with regard to the exposure, the focusing control section 54*c* determines exposure so as to obtain brightness appropriate for photographing of the object on the underwater side.

Furthermore, the present embodiment performs control processing of setting the focusing distance Lh in order to be able to also take a clear photograph of the object under water as described above.

In next step S126, the distance conversion section 54*d* of the image processing & control section 54 performs (starts) conversion processing on the object distance L.

In next step S127, the distance conversion section 54*d* determines whether or not the object distance L is smaller than 3 m (as a default value of the boundary distance Lb). When the object distance L is smaller than 3 m, the distance conversion section 54*d* sets the focusing distance Lh described in FIG. 9 to, for example, L/1.3 in step S128. Here, 1.3 is a default value of the correction coefficient C.

After that, the focusing control section 54*c* sets the photographing lens 53*a* at a position corresponding to the focusing distance Lh via the drive section 53*e*. The process then moves to the processing in step S130. The photographing state of the image pickup section 53 set through the processing in step S128 corresponds to the state shown in FIG. 28A (or FIG. 28B).

In step S128 in FIG. 30, the focusing distance Lh is set to L/1.3 so that the body (human body) portion which is the portion under water of the figure object T is set to the focus position.

Such a setting is based on the consideration that the focus balance between fish in front of the body portion under water and the body portion above water becomes better (focuses on both objects are balanced preventing such focusing that would cause the image of any one of the objects to become obscure).

In the above described case, C=1.3 is set as the correction coefficient C, but when the body portion above water and the body portion below the water surface are assumed to be main photographing objects instead of assuming the fish under water as main photographing objects, the focusing distance Lh may be set to on the order of L/1.2.

Thus, for example, C=1.3 may be set as the default value of the correction coefficient C and the value of the correction coefficient C may be made changeable within a range of, for example, on the order of 1.1 to 1.3 through a selection operation by the user 63.

Furthermore, the object under water may turn darker (because of transparency compared to the above water side), may have lower contrast or may be susceptible to influences of suspended solids or the like, and therefore in step S125, focusing is performed on the object above water having higher reliability, making it possible to calculate the object distance L which has higher reliability (accuracy).

Furthermore, in photographing of such a scene, assuming that there is an object to be photographed under water, control is performed so as to determine exposure based on the brightness of the object on the underwater side. Furthermore, the region may be divided into under water and above water portions, and when the image processing & control section 54 performs image processing on images of the respective regions, the amplification factors corresponding to the brightness levels may be switched so that both regions have appropriate brightness.

On the other hand, when the object distance L is greater than 3 m in the determining processing in step S127, the process moves to the processing in step S129. The focusing control section 54c in step S129 performs focusing in the lower portion of the screen.

In this case, the object above water is considered to be a distant object such as landscape, and therefore the image of the object on the underwater side at such a distant place becomes obscure due to underwater transparency compared to the above water side or it may be difficult to pick up an image of the object.

Thus, in the case of the object distance L exceeding the boundary distance Lb, the focusing control section 54c of the present embodiment performs control so as to focus on the object on the underwater side and sets the photographing lens 53a at the focus position.

In a photographing (image pickup) situation in which the image of the object on the underwater side is likely to become obscure under the influence of underwater transparency because the object distance L exceeds the boundary distance Lb, such a situation is alleviated by focusing on underwater objects.

In step S130 after step S128 or S129, the image processing & control section 54 determines whether or not a release operation is performed. When the release operation is not performed, the process returns to the processing in step S121.

On the other hand, when the release operation is performed, the image processing & control section 54 determines in next step S131 whether or not the semi-underwater photographing mode is set. When the semi-underwater photographing mode is set, the image processing & control section 54 performs the diaphragm control described in FIG. 28B in next step S132 and then moves to the processing in step S133.

Furthermore, the image processing & control section 54 also moves to step S133 when the semi-underwater photographing mode is not set. In step S133, the image processing & control section 54 performs photographing in the focusing state in step S128 or S129 and also records the photographed image in the recording section 58. In this case, the date and time information in the clock section 59 is also recorded in association with the recorded image in the recording section 58.

On the other hand, when the photographing mode is not set in step S121, the image processing & control section 54 determines in step S134 whether or not a reproducing mode is set. When the reproducing mode is not set, the image processing & control section 54 moves to step S136.

On the other hand, when the reproducing mode is set, the image processing & control section 54 reproduces the image recorded in the recording section 58 in step S135. In next step S136, the image processing & control section 54 determines whether or not an end operation is performed. When the end operation is not performed, the image processing & control section 54 returns to the processing in step S121, and when the end operation is performed, the power of the camera 51 is turned OFF and the processing in FIG. 30 ends.

The camera 51 according to the sixth embodiment that performs such an operation can simultaneously and clearly photograph objects above water and under water in consideration of influences of the refractive index and transparency under water through a simple operation. Furthermore, the camera 51 according to the present embodiment does not need any dedicated adapter or the like and can easily photograph objects above water and underwater simultaneously and clearly.

Seventh Embodiment

Figure 31:
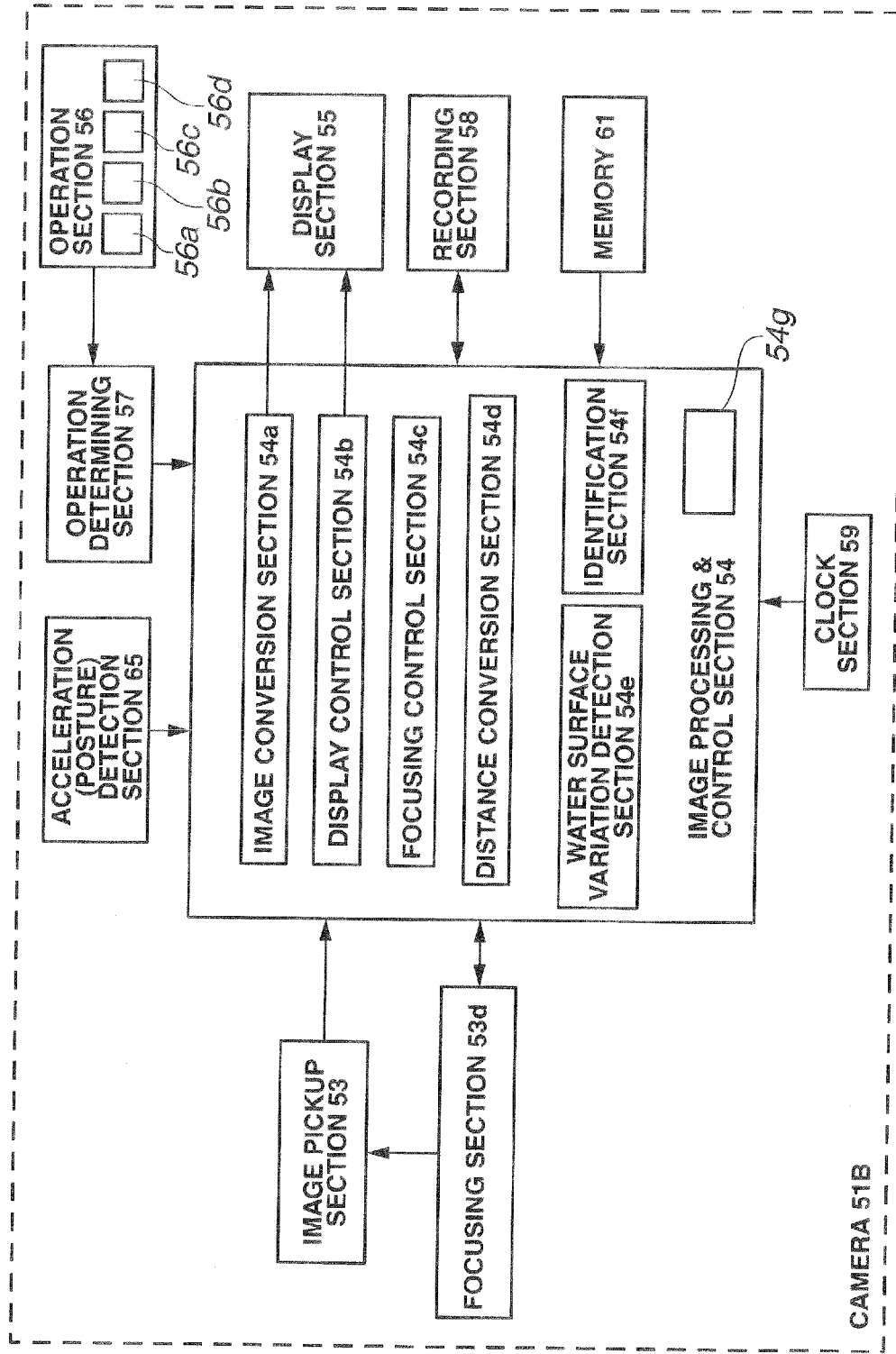
FIG. 31 is a block diagram illustrating a configuration of a camera according to a seventh embodiment of the present invention.

Next, a seventh embodiment of the present invention will be described. FIG. 31 illustrates a configuration of a camera 51B according to the seventh embodiment of the present invention.

The camera 51B of the present embodiment corresponds to the camera 51 in FIG. 21 further provided with an acceleration detection section 65 as an example of posture detection means for detecting the posture of the camera 51B. The acceleration detection section 65 is made up of three acceleration sensors for detecting acceleration in three axial directions of the case 52; vertical, horizontal and depth directions orthogonal to each other.

Signals detected by the three acceleration sensors are inputted to the image processing & control section 54. The image processing & control section 54 has the function of a posture detection section that detects the posture (the vertical direction along the perpendicular direction in which gravity acts, or the like) in a photographing state including image pickup of the camera 51B from signals of the three acceleration sensors.

Furthermore, the present embodiment can perform not only semi-underwater photographing in the semi-underwater photographing mode of the sixth embodiment when the water surface does not change so much but also semi-underwater photographing in a second semi-underwater photographing mode when the water surface drastically changes with respect to the lens diameter of the photographing lens 53a.

Thus, the image processing & control section 54 has a water surface variation detection section 54e as second semi-underwater photographing mode determining means for detecting (determining) whether or not the photographing state is in a second semi-underwater photographing mode in which the water surface fluctuates when the semi-underwater photographing mode is set.

Furthermore, as will be described later, the image processing & control section 54 of the present embodiment has the function of an identification section 54f that identifies, upon detecting the image portion of the water surface in the image of the object whose image has been picked up using a detection (determination) of the posture in the vertical direction of the camera 51B when the semi-underwater photographing mode is set, the image (region) of the object above water which is the upper side thereof and the image (region) of the object under water which is the lower side thereof.

Figure 40A:
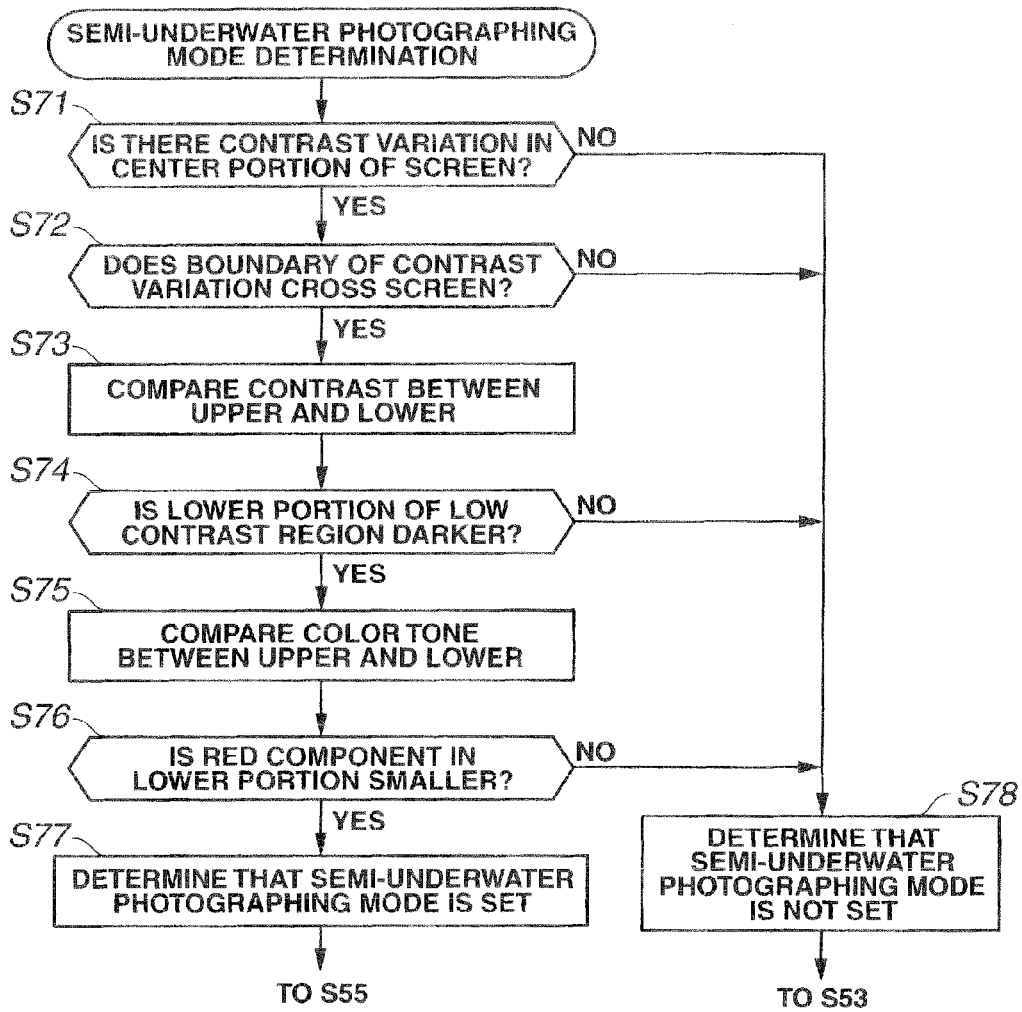
FIG. 40A is a flowchart illustrating an example of the processing procedure for the processing of determining the semi-underwater photographing mode in FIG. 39.
Figure 43:
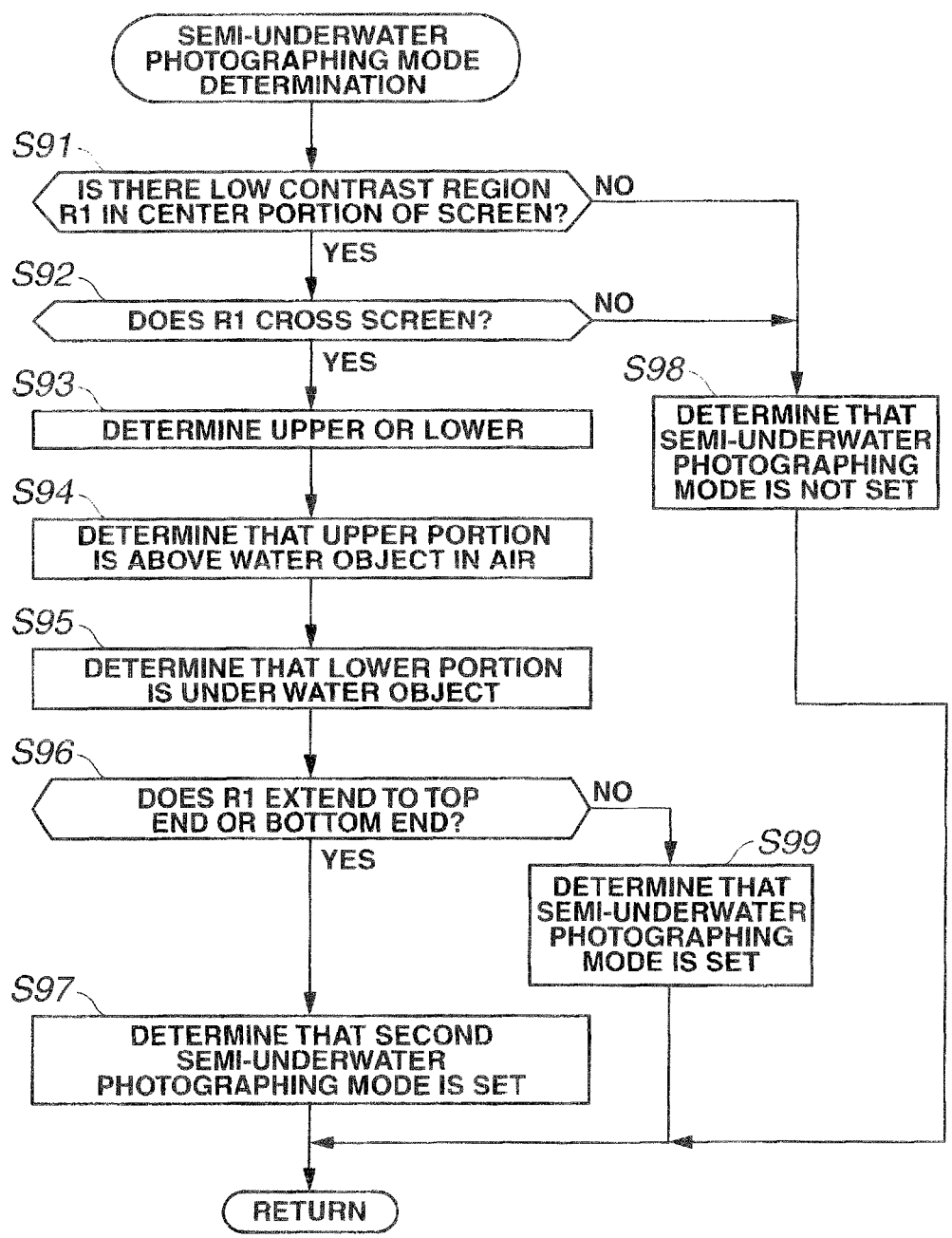
FIG. 43 is a flowchart illustrating a processing procedure for determining a semi-underwater photographing mode and a second semi-underwater photographing mode in a modification example.

Furthermore, the image processing & control section 54 of the present embodiment has the function of a semi-underwater photographing mode determining section 54g that determines whether or not the camera 51B is set in a photographing state in the semi-underwater photographing mode. The processing procedure of the semi-underwater photographing mode determining section 54g is as shown in FIG. 40A and FIG. 43.

Figure 32A:
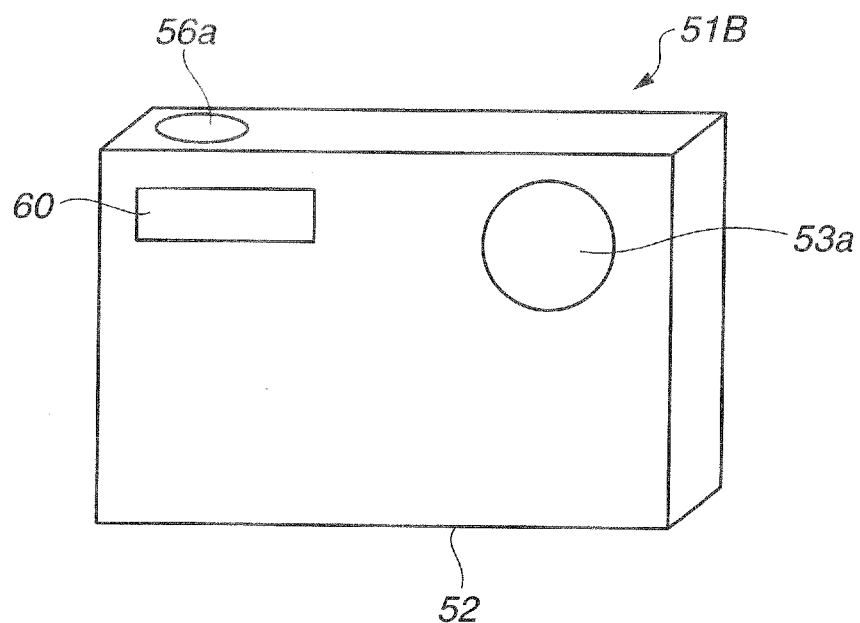
FIG. 32A is a perspective view illustrating a configuration of the front side of the camera according to the seventh embodiment.
Figure 32B:
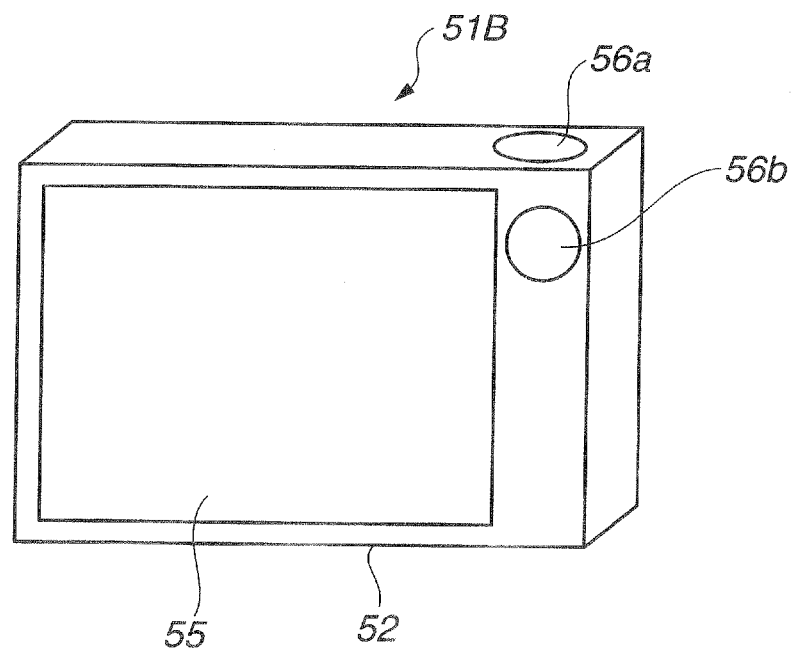
FIG. 32B is a perspective view illustrating a configuration of the back side of the camera according to the seventh embodiment.

The configuration of the front side and the back side of the camera 51B of the present embodiment are as shown in FIG. 32A and FIG. 32B. As shown in FIG. 32A, the camera 51B is provided with a photographing lens 53a at a position, for example, on the left top side rather than the center position of the front side.

That is, the camera 51B is provided with the photographing lens 53a decentered leftward in, for example, the longitudinal direction with respect to the center position of the front side. Including the fact that the case 52 is oblong and the display section 55 is also formed to be oblong, the rest of the configuration is substantially the same as that of the camera 51 of the sixth embodiment.

Figure 33:
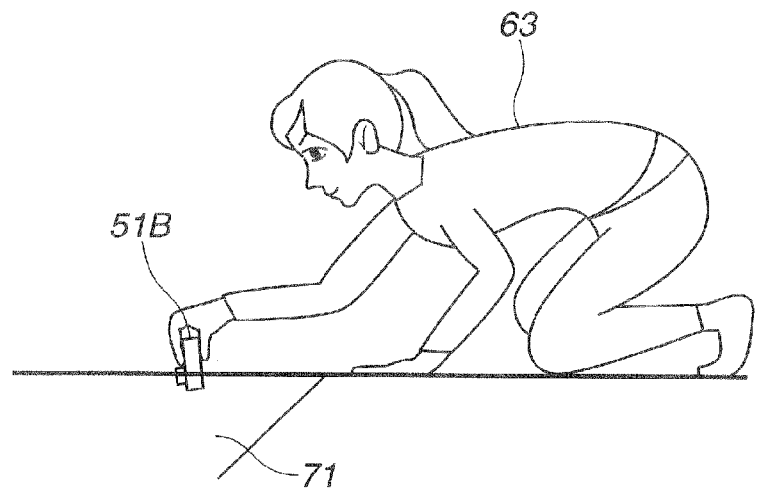
FIG. 33 is a diagram illustrating a situation in which semi-underwater photographing is performed by immersing substantially half the photographing lens of the camera according to the seventh embodiment in water.

In this case, as shown in FIG. 33, when the user 63 rotates the camera 51B from the state shown in FIG. 32A by 90° so that the decentered photographing lens 53a side becomes lower (than the center), submerges part of the camera 51B below the water surface of a pond 71 and performs semi-underwater photographing, the user can perform photographing through a simple operation while checking the image displayed on the screen of the display section 5.

Figure 34:
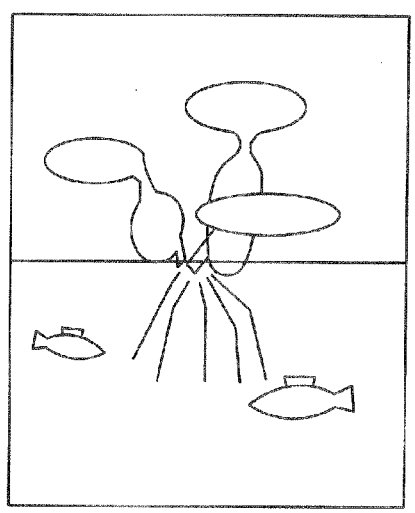
FIG. 34 is a diagram illustrating an example of photographed image obtained through the semi-underwater photographing in FIG. 33.

FIG. 34 illustrates an example of image when photographing is performed by setting the camera 51B in the semi-underwater photographing mode as shown in FIG. 33. As shown in FIG. 34, it is possible to simply photograph not only floating grass that straddles above water and under water in the pond 71 but also fish swimming under water.

Figure 35A:
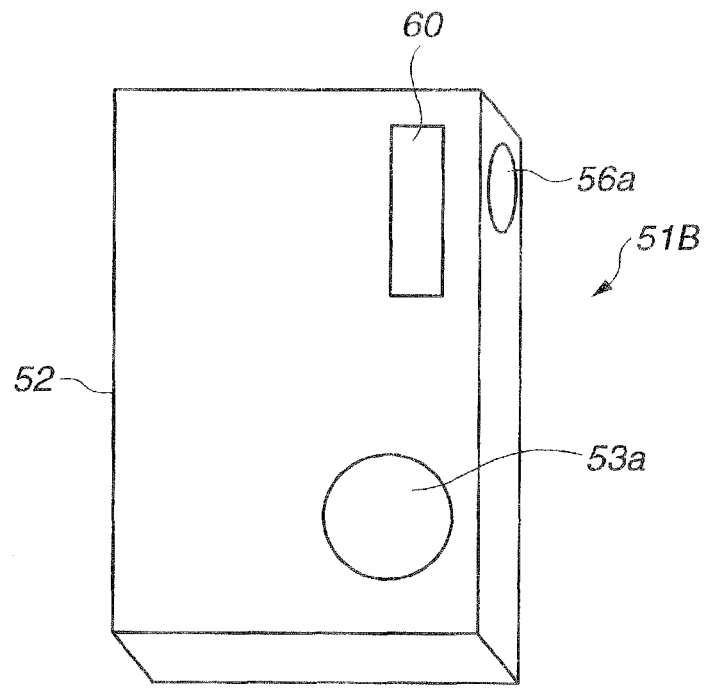
FIG. 35A is a diagram illustrating a posture of the front side of the camera set when the semi-underwater photographing in FIG. 33 is performed.
Figure 35B:
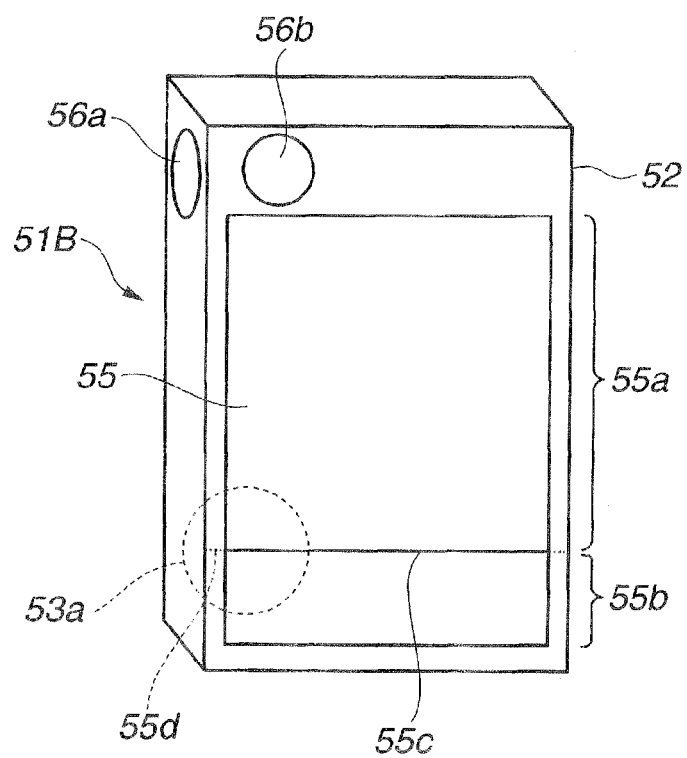
FIG. 35B is a diagram illustrating a posture or the like of the back side of the camera set when the semi-underwater photographing in FIG. 33 is performed.

FIG. 35A and FIG. 35B illustrate the posture of the camera 51B set by the user 63 in the case of FIG. 33.

When the user 63 performs semi-underwater photographing using the camera 51B with the arrangement shown in FIG. 32A and FIG. 32B checking images but without diving into the water, if the user holds the camera 51B in the vertical (vertically oblong) direction so that the photographing lens 53a side comes close to the bottom as shown in FIG. 35A and FIG. 35B, it is possible to perform photographing with only substantially half the size of the photographing lens 53a submerged in water and much of the display section 55 exposed above water.

However, only images in vertical composition can be taken in this case, but this way of photographing is preferable when the photographer wants to photograph objects in deep water. Thus, the present embodiment allows semi-underwater photographing to be simply performed.

In this case, much of the screen made up of the liquid crystal panel that constitutes the display section 55 can be used, and it is thereby possible to determine a screen usable region (abbreviated as "usable region") 55a used for image display and a non-use region 55b not used for image display (as partial screen region in the lower portion) with reference to the center position of the photographing lens 53a (see FIG. 35B).

Furthermore, the image conversion section 54a performs image processing that slightly reduces the size of a picked up image, for example, in the longitudinal direction so as to be displayed on the use region 55a.

Furthermore, a water surface guideline such as a line 55c indicating a water surface guideline is displayed when a semi-underwater photographing mode is set so that it is recognizable from the display screen of the display section 55 on the back side of the camera 51B that the camera 51B in the state shown in FIG. 35B is submerged in water from the bottom thereof and set in a state appropriate for semi-underwater photographing, that is, a reference position in which the center position of the photographing lens 53a matches the water surface.

In addition to displaying the line 55c indicating the water surface guideline on the screen of the display section 55 or the like, a mark such as a line indicating the water surface guideline may also be provided on the back side of the case next to the line 55c (reference numeral 55d shown by a dotted line in FIG. 35B).

Figure 36:
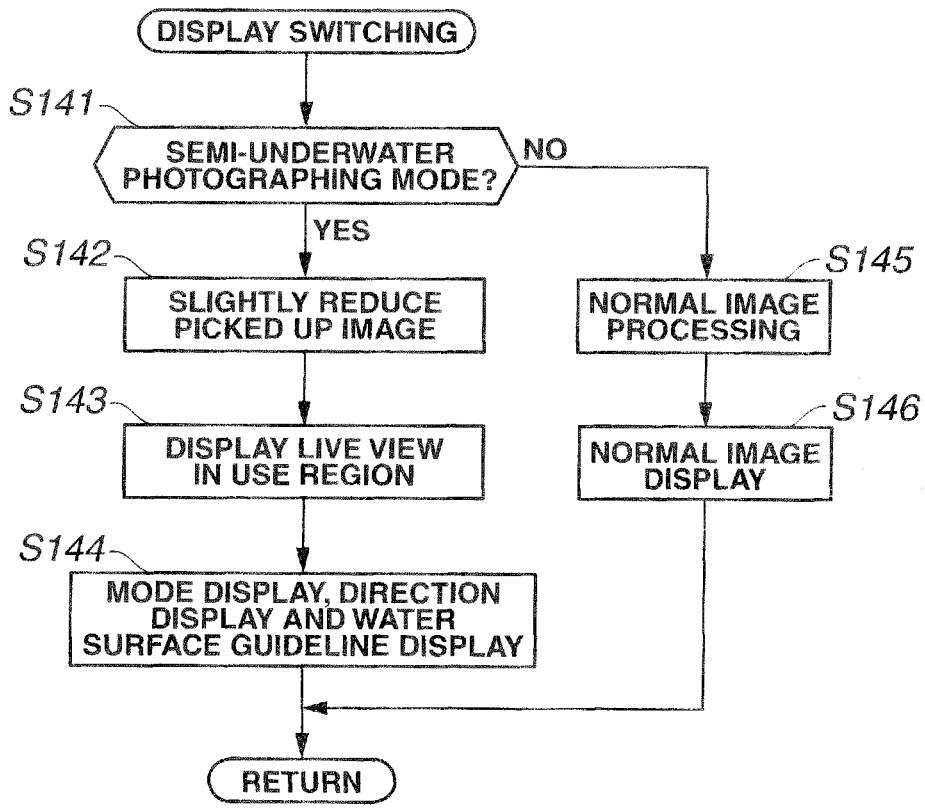
FIG. 36 is a flowchart illustrating a processing procedure for display switching.

In this case, display switching of an image is performed according to a flowchart shown, for example, in FIG. 36. When the display switching operation starts, the image processing & control section 54 determines in first step S141 whether or not the semi-underwater photographing mode is set according to a detection signal by the acceleration sensor of the acceleration detection section 65.

According to the present embodiment, when the user 63 changes the camera 51B from the photographing state in FIG. 32A to the longitudinal composition shown in FIG. 35A, the image processing & control section 54 determines that the semi-underwater photographing mode is set. A determination may also be made on the setting operation by the user 63 using the semi-underwater photographing mode button 56c as in the case of the sixth embodiment.

Furthermore, whether or not the semi-underwater photographing mode is set may also be determined through semi-underwater photographing mode determining processing in FIG. 40A, which will be described later.

When the semi-underwater photographing mode is set, as shown in step S142, the image conversion section 54a performs image processing that slightly reduces the size of a picked up image, for example, in the longitudinal direction so as to be displayed on the use region 55a.

Furthermore, in next step S143, the display control section 54b displays a live view of the image slightly reduced in the longitudinal direction in the use region 55a of the display section 55.

Furthermore, in next step S144, the image processing & control section 54 performs a mode display indicating that the under water photographing mode is set, a direction display indicating that image pickup (photographing) is performed in vertically longitudinal composition, in a portrait mode, a display of a water surface guideline position indicating a water surface guideline, and ends the processing in FIG. 36.

On the other hand, when the determination result in step S141 shows that the semi-underwater photographing mode is not set, the image processing & control section 54 performs normal image processing as shown in step S145. In this case, the image processing & control section 54 generates an image for normal display from the picked up image.

Furthermore, in next step S146, the image processing & control section 54 performs display control over the normal image. In this case, the normal image is displayed using the entire display region of the display section 55. After this processing, the processing in FIG. 36 ends.

Since the camera operates in this way, when the semi-underwater photographing mode is set, a picked up image is displayed only in the use region 55a within the screen of the display section 55, the user 63 can easily set the photographing lens 53a at a position appropriate for the semi-underwater photographing mode according to the display of the water surface guideline position and secure excellent operability (convenience). Therefore, the user 63 can readily submerge part of the camera 51B in water and enjoy semi-underwater photographing. Furthermore, in this case, the size of the use region 55a can be increased compared to the sixth embodiment.

Figure 37A:
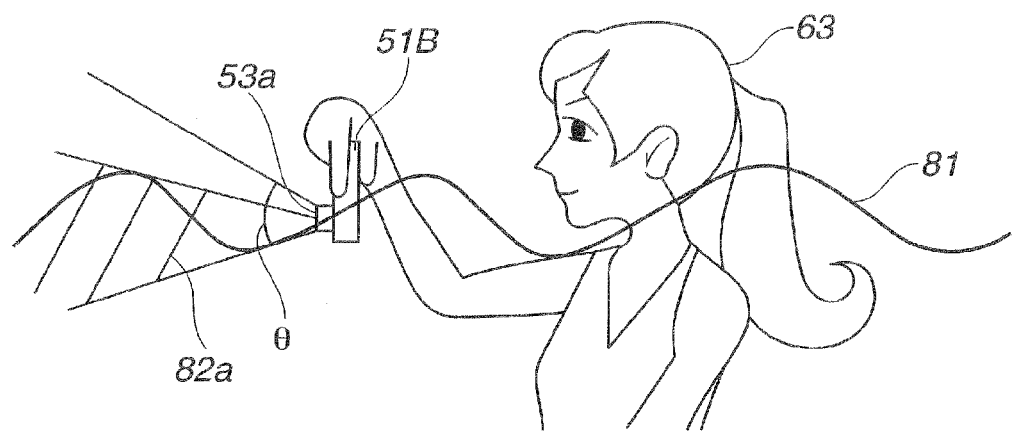
FIG. 37A is a diagram illustrating a situation in which photographing is performed by setting a semi-underwater photographing mode when there is a wave greater than the photographing lens diameter.
Figure 37B:
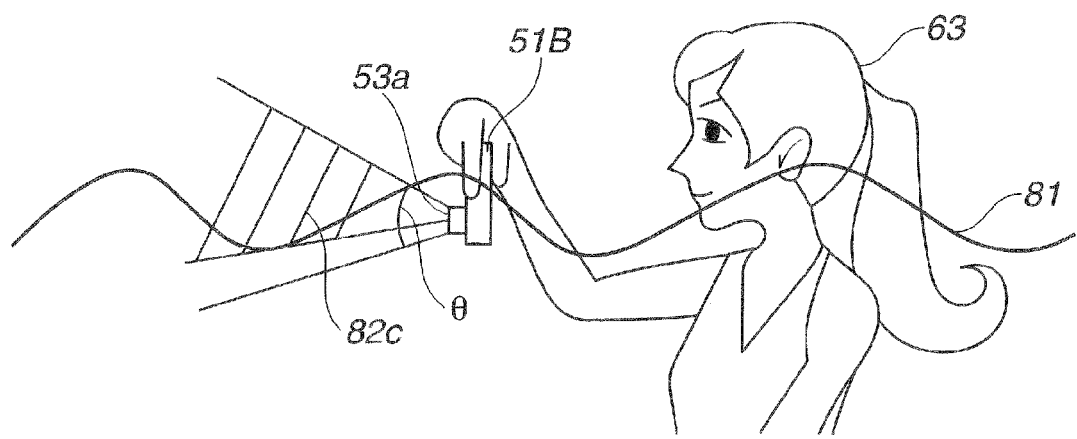
FIG. 37B is a diagram illustrating a situation in which the photographing state has changed from that in FIG. 37A due to a temporally fluctuating wave in a state similar to that in FIG. 37A.

Next, the present embodiment will be described with a case where photographing is performed in the sea where the water surface fluctuates drastically. FIG. 37A and FIG. 37B illustrate a situation in which the user 63 sets the camera 51B in a semi-underwater photographing mode and takes a photograph in the sea.

Due to a wave 81 greater than the lens diameter of the photographing lens 53a, even if the photographing lens 53a of the camera 51B is set near the water surface, the photographing lens 53a deviates from a position appropriate for semi-underwater photographing as shown in FIG. 37A and FIG. 37B.

FIG. 37A illustrates a situation in which the wave 81 forms a trough immediately before the photographing lens 53a. In this state, the photographing lens 53a is located in air above the wavefront. In this state, the portion shown by hatching from the trough to the crest of the wave 81 immediately before the photographing lens 53a constitutes a region that obstructs image pickup of an object (to be photographed) (that is, the region where the image is picked up in an out-of-focus, low contrast state, obscurely and photographing of the object is substantially impossible) 32a. θ represents a field of view of the photographing lens 53a of the camera 51B.

Figure 38A:
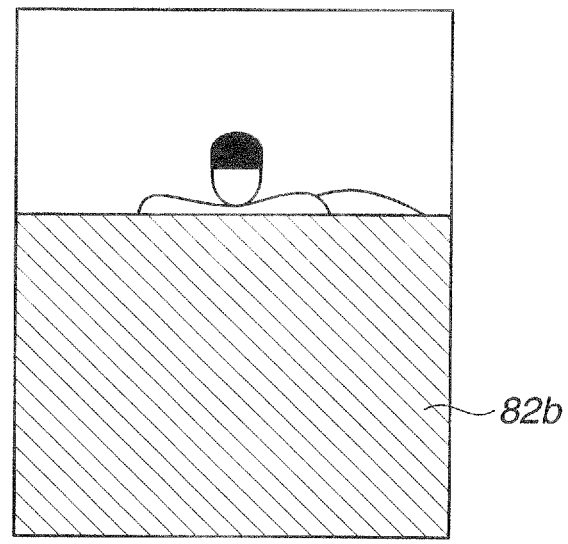
FIG. 38A is a diagram illustrating an example of image photographed in the state shown in FIG. 37A.

In this case, the image displayed on the display section 55 is as shown in FIG. 38A. Due to the region 82 in FIG. 37A, images of some objects in the upper-side part of the field of view θ of the camera 51B can be picked up and displayed, but an image region 82b exists therebelow where objects to be photographed cannot be photographed due to the region 82a.

Figure 38B:
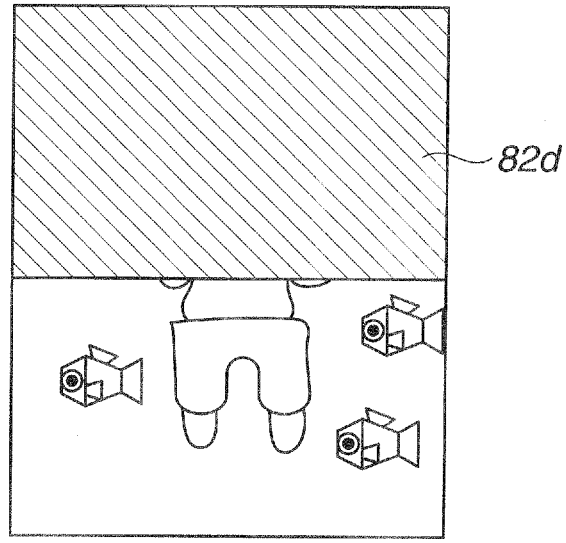
FIG. 38B is a diagram illustrating an example of image photographed in the state shown in FIG. 37B.

Furthermore, FIG. 37B illustrates a state in which the camera 51B is submerged in water into a crest of the wave 81. The area shown by hatching constitutes a region 82c which obstructs image pickup of the object to be photographed in this state, too. In this case, the image displayed on the display section 55 is as shown in FIG. 38B.

Although an image of the object corresponding to only part of the lower-side portion of the field of view θ of the camera 51B can be picked up and displayed due to the region 82c in FIG. 37B, an image region 82d is generated thereabove where the object to be photographed cannot be photographed due to the region 82c.

The state of the image displayed on the screen of the display section 55 in FIG. 37A and FIG. 37B or FIG. 38A and FIG. 38B is caused by the wave 81, and therefore the brightness of the upper and lower portions of the screen frequently varies with time due to the wave 81.

Thus, it is possible to temporally monitor the variation in brightness in the upper and lower portions of the screen on which images are displayed and thereby detect (determine) this state. In the present embodiment, the water surface variation detection section 54e of the image processing & control section 54 detects this state, for example, according to a flow shown in FIG. 40C.

The relationship between the vertical, horizontal directions of the object image formed on the image pickup plane of the image pickup device 53b and the vertical, horizontal directions of the image displayed on the (display) screen of the display section 55 is determined for each camera. The processing of monitoring a variation in the brightness in the upper and lower portions of the screen is equivalent to processing on a picked up image obtained from the object image formed on the image pickup plane of the image pickup device 53b.

The present embodiment enables semi-underwater photographing to be performed in a second semi-underwater photographing mode corresponding to a situation in which the water surface fluctuates drastically in addition to the semi-underwater photographing mode in a situation where the water surface does not fluctuate so much.

Thus, when semi-underwater photographing is performed in the presence of the temporally fluctuating wave 81 larger than the lens diameter, this can hardly be considered as a situation in which a macro region as shown in FIG. 33 or FIG. 34 is photographed in semi-underwater condition.

When the brightness fluctuates between upper and lower portions of the screen, the focus is adjusted at a distance of 1 m or more and since the water underneath the wave 81 is bubbling and the transparency (transmissivity) under water is estimated to be low, the focus need not be adjusted at a distance of 2 m or more.

By estimating the photographing situation in this way, when the second semi-underwater photographing mode is set, the focusing control section 54c of the present embodiment performs focusing control whereby a fixed focus whose default value is approximately 1.5 m is set as the focus position after the mode is determined to be the second semi-underwater photographing mode producing a photographing situation in which the water surface fluctuates. On the other hand, after the determination result shows that the second semi-underwater photographing mode is set, a focusing distance using a fixed focus (e.g., 1.5 m as a default value) is adopted.

Furthermore, since the brightness of part of the screen quickly varies, the image processing & control section 54 determines exposure based on the overall brightness.

Moreover, since it is almost impossible to perform photographing at the best moments, photographing is performed in a continuous shooting (continuous photographing and recording) mode.

Figure 39:
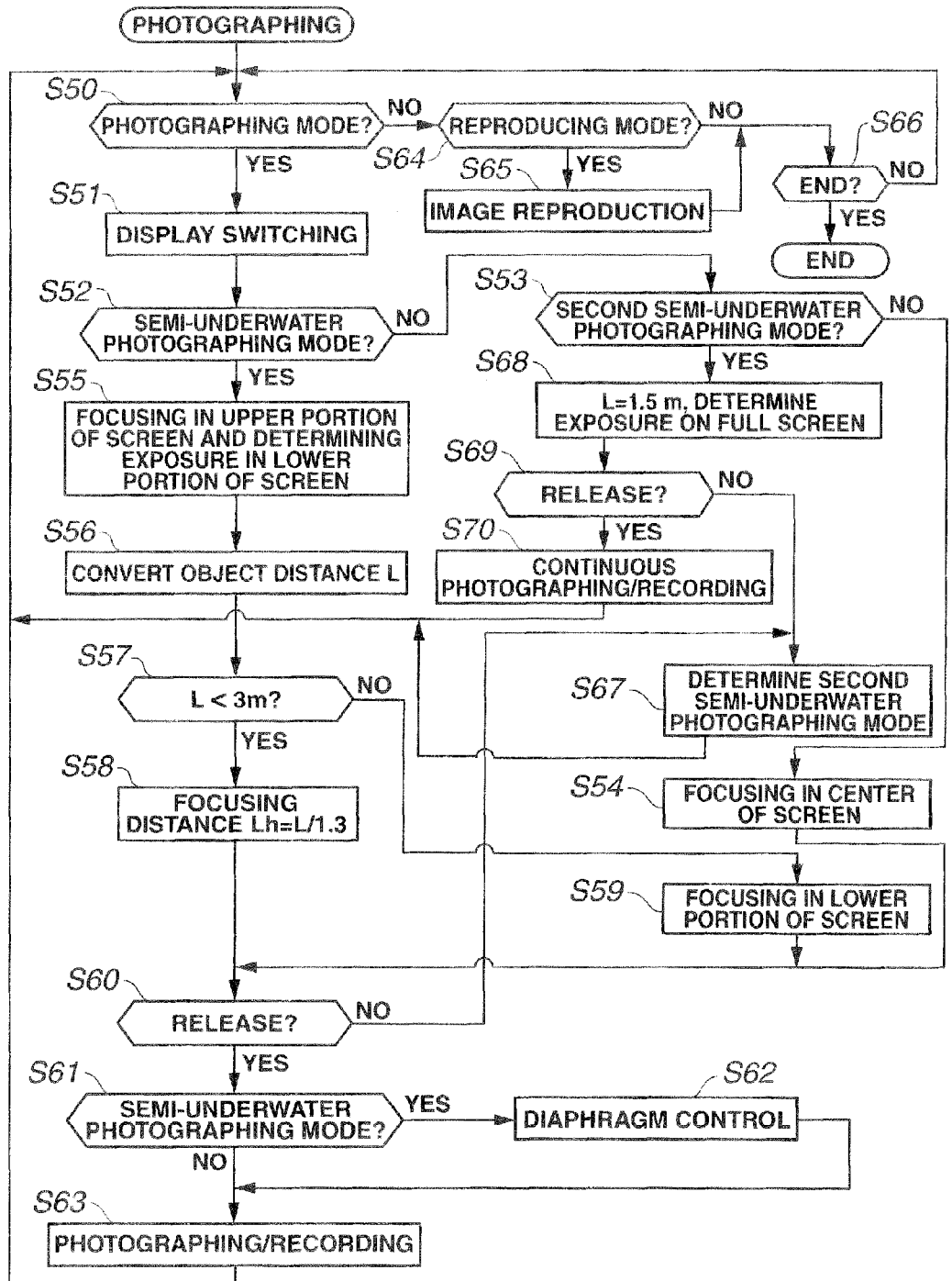
FIG. 39 is a flowchart illustrating a processing procedure for a photographing operation by the image processing & control section according to the seventh embodiment.

The processing procedure when performing photographing according to the present embodiment including the aforementioned features of the second semi-underwater photographing mode is as shown in FIG. 39.

Since the processing procedure in FIG. 39 is similar to the processing procedure in FIG. 30, only differences will be described. Step S50 to step S52 in FIG. 39 are the same procedure as that in step S121 to step S123 in FIG. 30.

When the photographing mode is not set in step S50, the process moves to step S64. Step S64 to step S66 is the same processing as that in step S134 to step S136 in FIG. 30.

In step S51, the processing of display switching shown in FIG. 36 is performed. Furthermore, whether or not the semi-underwater photographing mode is set in step S52 may be determined using the detection result by the acceleration sensor of the acceleration detection section 65 or the determination in FIG. 40A in addition to the switch operation by the user 63. Using FIG. 40A improves the operability.

When the determination result in step S52 shows that the semi-underwater photographing mode is not set, whether or not the second semi-underwater photographing is set is determined in next step S53. When it is detected that the brightness varies drastically with time between the upper and lower portions of each frame in a picked up image, the mode is determined as the second semi-underwater photographing mode. This determination is made in step S67 which will be described later.

Thus, it is determined in step S53 that the second semi-underwater photographing mode is not set in an operation state close to the beginning where the processing in FIG. 39 starts. The flow then moves to processing of focusing in the center of the screen in step S54. This processing is the same processing as that in step S124 in FIG. 30.

On the other hand, when it is determined in step S52 that the semi-underwater photographing mode is set, the process moves to processing in step S55. The processing from step S55 to step S63 is completely the same as that in step S125 to step S133 in FIG. 30 (except step S130 of release operation determining processing) if the release operation determining processing in step S60 is excluded.

When the release operation is performed in step S60, the image processing & control section 54 moves to step S61, whereas when the release operation is not performed, the water surface variation detection section 54e of the image processing & control section 54 performs processing of determining in step S67 whether or not the second semi-underwater photographing mode setting condition is met.

The determination result as to whether or not the second semi-underwater photographing mode setting condition is met is recorded in a memory (not shown) in the image processing & control section 54 together with information on the determined time.

The determination result is used later for the determining processing in step S53. In this case, the result determined to correspond to the second semi-underwater photographing mode is stored for a period, for example, on the order of several times the period of the wave 81 as effective information. After the determining processing in step S67, the process returns to the processing in step S50, and the processing shown in FIG. 39 is repeatedly performed fast.

Therefore, in a situation in which semi-underwater photographing is performed in the presence of the wave 81 as shown in FIG. 37A or FIG. 37B, after the determination corresponding to the second semi-underwater photographing mode setting condition is made according to first several times of the fluctuating wave 81, (in step S67 the time of determination corresponding to the second semi-underwater photographing mode is updated through the processing in the loop in FIG. 39), the determination result corresponding to the second semi-underwater photographing mode is continuously stored.

When it is determined in step S53 that the second semi-underwater photographing mode is set, the object distance L is set to 1.5 m, the default value of fixed focus in step S68.

Furthermore, the image processing & control section 54 sets exposure on the full screen. In step S69 after the processing in step S68, the image processing & control section 54 determines whether or not a release operation is performed.

When the release operation is performed, the image processing & control section 54 performs continuous photographing in step S70, continuously records images in the recording section 58, and then returns to the processing in step S50. By performing such continuous photographing, it is possible to record a plurality of photographed images taken through continuous shooting in a short time interval even when it is difficult to perform photographing at the best photographing timing, there is a high possibility that the user 63 may acquire photographed images of above water objects and underwater objects simultaneously taken at excellent photographing timings among the photographed images.

On the other hand, when the release operation is not performed in step S69, the process returns to the processing in step S50 after performing image processing of determining in step S67 whether or not the second semi-underwater photographing mode setting condition is met.

FIG. 40A illustrates an example of the processing procedure in step S52 in FIG. 39. The image processing & control section 54 has the function of the semi-underwater photographing mode determining section 54g shown in FIG. 31 by performing the following processing.

When the semi-underwater photographing mode determining processing starts, the image processing & control section 54 determines whether or not there is a variation in contrast in the center of the screen in first step S71. In this case, the image processing & control section 54 identifies (determines) the vertical direction of the camera 51B from the direction of gravity acceleration using the acceleration sensor. It is then determined whether or not there is a contrast variation near the center of the screen in the vertical direction.

When there is a boundary (water surface) of water in the center of the screen, there is a variation in contrast between the underwater side that absorbs light and the above water side that less absorbs light across the water surface as the boundary.

Upon determining that there is a contrast variation in the center of the screen, the image processing & control section 54 determines in next step S72 whether or not the boundary of the contrast variation crosses the screen. In the case of the water surface, the boundary of the contrast variation crosses the screen.

When the determination result shows that the boundary of the contrast variation crosses the screen, the image processing & control section 54 performs processing of comparing contrast between the upper and lower portions of the screen in next step S73. The image processing & control section 54 determines (identifies) (the posture of) the upper and lower portions of the screen from the signal of the acceleration sensor in this case, too.

Figure 40B:
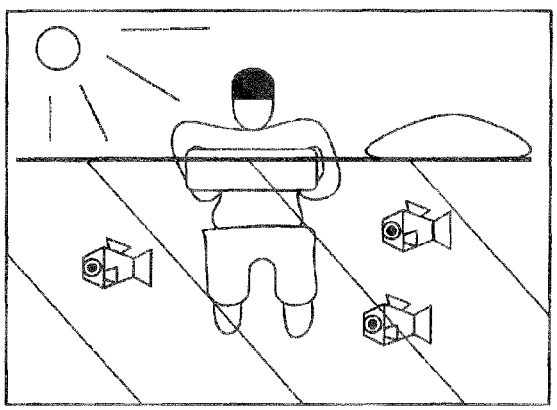
FIG. 40B is a diagram illustrating a typical example of the semi-underwater photographing mode.

In next step S74, the image processing & control section 54 determines whether or not the lower portion of the low contrast region of the water surface portion having low contrast is dark. It is also possible to simply determine whether or not the image in the lower portion is darker than the image in the upper portion. In the case of the object as shown in FIG. 40B, the underwater side in the lower portion is darker.

When the determination result shows that the lower portion is darker, the image processing & control section 54 compares the color tone between the upper and lower portions of the screen in next step S75. The image processing & control section 54 determines in next step S76 whether or not the red component in the lower portion is smaller than that in the upper portion.

When the red component in the lower portion is smaller than that in the upper portion, the image processing & control section 54 determines in step S77 that the photographing state is in the semi-underwater photographing mode. The image processing & control section 54 then moves to processing in step S55 in FIG. 39.

On the other hand, when the determination results in steps S71, S72, S74 and S76 are negative, the image processing & control section 54 determines in step S78 that the photographing state is not in the semi-underwater photographing mode and moves to processing in step S53 in FIG. 39.

A determination may also be made in step S77 or S78 based on the determination result of one of determining processing in two steps S74 and S76.

From the determination result in step S77, it is possible to assume the portion where the boundary of the contrast variation crosses the screen in the center of the screen in step S72 to be the water surface and determine (identify) that the upper portion thereof is the object above water and the lower portion thereof is the object under water.

FIG. 40B is a diagram illustrating the determination of the semi-underwater photographing mode in FIG. 40A and FIG. 40B illustrates a typical example of the object in the photographing state in the semi-underwater photographing mode.

As shown in FIG. 40B, the region under water has lower transparency, and is darker due to absorption of light, often includes suspended solids than the region above water, and thus constitutes a low contrast region having low contrast for these reasons.

Furthermore, the wavelength of red light on the long wavelength side in the visible region in particular is more easily absorbed than the short wavelength side and is more likely to have blue color tone (in other words, color tone with less red component). Therefore, the processing procedure in FIG. 40A can be used to determine the semi-underwater photographing mode.

Figure 40C:
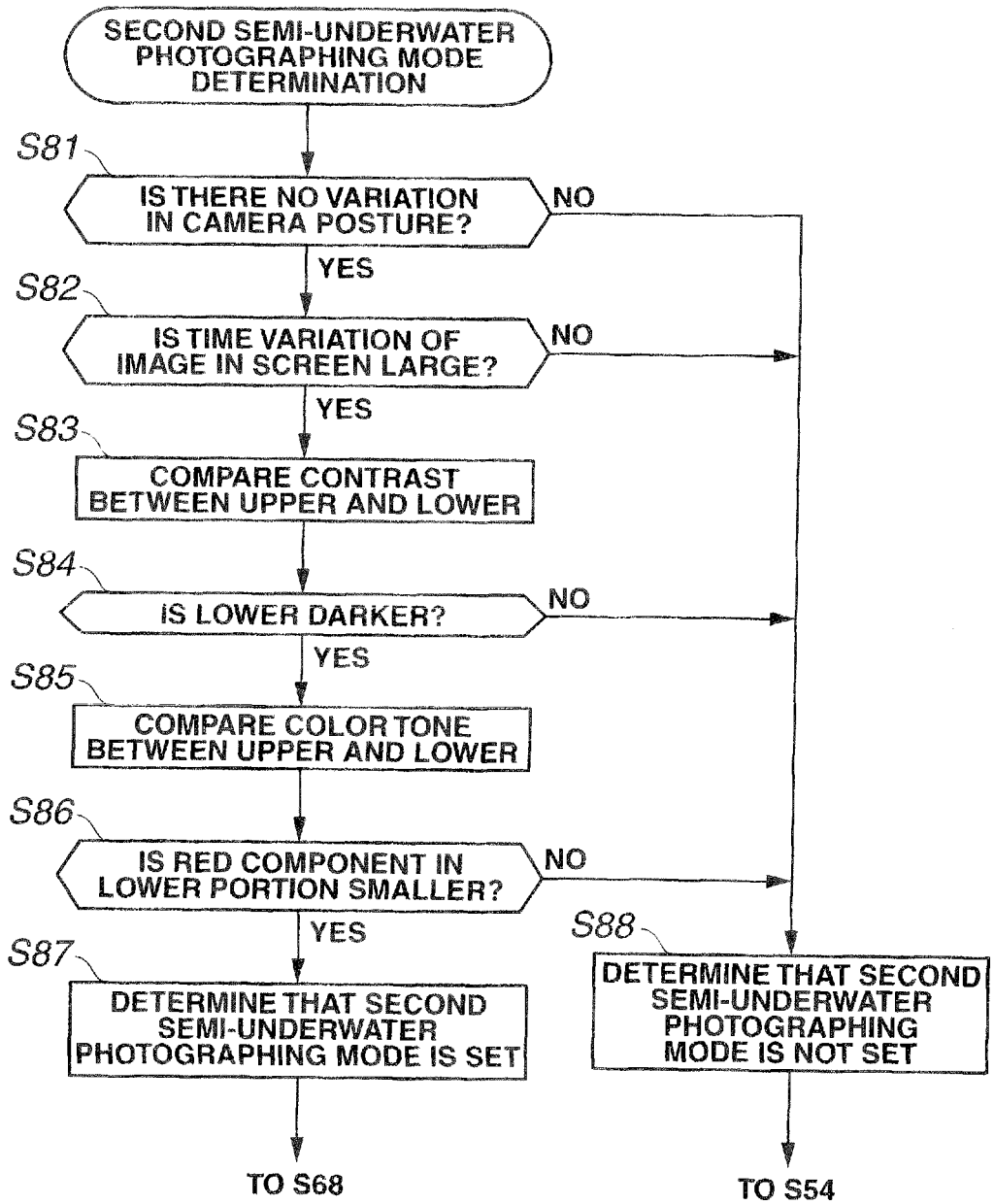
FIG. 40C is a flowchart illustrating an example of the processing procedure for the processing of determining a second semi-underwater photographing mode in FIG. 39.

Furthermore, the second semi-underwater photographing mode in step S53 in FIG. 39 is determined using the processing procedure shown in FIG. 40C.

When the second semi-underwater photographing mode determining processing starts, the image processing & control section 54 determines in first step S81 whether or not there is any posture variation of the camera 51B according to a signal from the acceleration sensor.

That is, when semi-underwater photographing is performed, the user 63 keeps the posture of the camera 51B (optical axis direction of the photographing lens) in the horizontal direction or a posture close to this as shown in FIG. 37A. The image processing & control section 54 then determines whether or not there is any acceleration variation in the optical axis direction of the photographing lens.

When the determination result shows that there is no variation in the posture of the camera 51B, the image processing & control section 54 determines in next step S82 whether or not there is a large time variation in the image in the screen. When the determination result shows that there is a large time variation in the image in the screen, the image processing & control section 54 compares contrast between the upper and lower portions of the screen in next step S83.

In next step S84, the image processing & control section 54 determines whether or not the lower portion is darker. When the determination result in step S84 shows that the lower portion is darker, the image processing & control section 54 further compares the color tone between the upper and lower portions in next step S85.

In next step S86, the image processing & control section 54 determines whether or not the red component in the lower portion is smaller (than that in the upper portion).

When the determination result shows that the red component in the lower portion is smaller than that in the upper portion, the image processing & control section 54 determines in step S87 that the photographing state is in the second semi-underwater photographing mode. The image processing & control section 54 then moves to processing in step S68 in FIG. 39.

On the other hand, when the determination results in the determining processing in steps S81, S82, S84 and S86 are negative, the image processing & control section 54 determines in step S88 that the photographing state is not in the second semi-underwater photographing mode. The image processing & control section 54 then moves to processing in step S54 in FIG. 39. The determination in step S87 or S88 may also be made based on the determination result of one of the determining processing in two steps of S84 and S86.

The present embodiment that performs such an operation not only has the effects of the sixth embodiment but also performs continuous shooting when the water surface fluctuates drastically, and can thereby acquire photographed images photographed at excellent photographing timings.

The seventh embodiment is also applicable to a cellular phone with a waterproof camera provided with a waterproof function as shown in FIG. 41 (hereinafter referred to as "cellular phone") 90. FIG. 41 illustrates an operation example in which the user 63 is observing objects above water and objects under water in a pond 92 in a semi-underwater photographing mode setting state using the cellular phone 90.

The cellular phone 90 is made up of a camera section 91 provided with an image pickup section 53 that picks up an image and a display section 95 that performs display, which are independent bodies but foldably connected together by a folding section. The camera in the modification example is formed of the camera section 91 and the display section 95. Although the present embodiment will be described taking the cellular phone 90 as an example here, the present embodiment is also applicable to a camera in a foldable configuration such as the camera section 91 (or image pickup section 53) and the display section 95.

Therefore, the user 63 sets the camera section 91 and the display section 95 in a state with an angle of, for example, on the order of 60°, submerges the vicinity of the center of the photographing lens of the camera section 91 in water up to a water surface 92a of the pond 92 as shown in FIG. 41, and can thereby realize a setting state in a semi-underwater photographing mode. The user 63 can thereby readily enjoy the image picked up in that setting state from the image displayed on the display section 95.

In the case of FIG. 41, due to fluctuations of the water surface 92a in the pond 92, which are not so big as in the case of sea, the region corresponding to fluctuations of the water surface 92a within a field of view θ of the photographing lens (region shown by hatching) 92b constitutes a region where image pickup is actually almost impossible.

In this case, the image displayed on the display section 95 is as shown in FIG. 42 and there is an image region 95a of the region 92b due to fluctuations of the water surface 92a shown by hatching in FIG. 41.

The image region 95a becomes a region (low contrast region) which is out of focus, has low contrast and extends in a band shape in the horizontal direction.

Therefore, it is possible to determine the water surface section as the water surface 92a portion accompanied by fluctuations by detecting the image region 95a from the image acquired by the camera section 91 as a low contrast region without the need to display the water surface guideline position described in FIG. 35B.

Furthermore, it is also possible to determine the water surface section, take the relationship between the camera section 91 and the display section 95 into consideration or detect gravity acceleration using an acceleration sensor, determine the longitudinal direction of the camera section 91 at the time of image pickup and determine or identify the above water side (object above water) and underwater side (object under water). The identification section 54f shown in FIG. 31 performs such identification.

It is possible to automatically perform focusing control or exposure control according to the identification result and save the user 63 time and trouble in performing an instruction operation.

By identifying objects above water and under water in this way, the present embodiment can improve operability in addition to the operations and effects of the sixth embodiment. Furthermore, by adding the acceleration detection section 65 to the sixth embodiment, it is likewise possible to improve operations and effects thereof. The identification section 54f can determine contents described, for example, as the upper portion of the screen and the lower portion of the screen in step S125 in FIG. 30 and step S55 in FIG. 39 as an object above water and an object under water respectively.

Furthermore, semi-underwater photographing with excellent operability is possible. According to the aforementioned photographing processing procedure in FIG. 39, when the determination result shows that the semi-underwater photographing mode is not set, a determination is made on whether or not the second semi-underwater photographing mode is set, but the semi-underwater photographing mode and the second semi-underwater photographing mode may be determined comprehensively as will be described in the following modification example.

FIG. 43 includes the processing procedure associated with the identification section 54f shown in FIG. 31. Furthermore, FIG. 43 also illustrates a processing procedure for automatically determining whether the photographing state is in the semi-underwater photographing mode or second semi-underwater photographing mode from the image acquired by the image pickup section 53 when the photographing mode is set.

In first step S91, the identification section 54f of the image processing & control section 54 determines whether or not a low contrast region R1 exists in the center of the screen in an image picked up by the image pickup section 53 (when displayed as the center of each frame or image).

The identification section 54f detects a pixel region whose contrast is equal to or below a predetermined threshold from a contrast signal of a picked up image and determines the pixel region equal to or below the threshold as the low contrast region R1.

When the determination result shows that the low contrast region R1 exists, the identification section 54f determines in next step S92 whether or not the low contrast region R1 crosses the screen (in the horizontal direction). In this case, the identification section 54f can determine a horizontal direction (perpendicular to the vertical direction of the screen determined through gravity acceleration from a signal of the acceleration sensor).

When the determination result shows that the low contrast region R1 crosses the screen, the identification section 54f determines the vertical direction of the screen from the signal of the acceleration sensor in next step S93.

Based on the determination result, (the image of) the upper portion of the screen is determined to be (the image region of) of the object above water in air and the lower portion of the screen is determined to be (the image region of) the object under water in step S94 and in step S95.

Using the low contrast region R1 corresponding to the presence of the water surface and information on the posture of the camera 51B from the acceleration sensor at the time of image pickup, the identification section 54f identifies the image region of an object above water and the image region of an object under water in the picked up image.

In next step S96, the identification section 54f determines whether or not the low contrast region R1 extends to the top end or the bottom end. When the determination result shows that the low contrast region R1 extends to the top end or the bottom end, the identification section 54f determines that the second semi-underwater photographing mode is set in which there is a large variation of the wavefront and ends the processing in FIG. 43.

On the other hand, when the determination result of determining processing in step S91 shows that no low contrast region R1 exists in the center of the screen, the identification section 54f determines in step S98 that the semi-underwater photographing mode is not set and ends the processing in FIG. 43.

Furthermore, when the determination result of determining processing in step S96 shows that the low contrast region R1 does not extend to the top end or the bottom end (e.g., the image as shown in FIG. 42), the identification section 54f determines that the semi-underwater photographing mode is set.

By performing such control using the identification result of the identification section 54f, the user 63 need not perform an instruction operation on the camera 51B so as to set the semi-underwater photographing mode or the second semi-underwater photographing mode.

The user 63 sets the camera 51B as shown in FIG. 33, FIG. 37A (or FIG. 37B), the camera 51B thereby automatically determines that the semi-underwater photographing mode or the second semi-underwater photographing mode is set and performs the corresponding control operation such as focusing and exposure control.

Therefore, the camera 51B of the seventh embodiment improves the operability compared to the sixth embodiment, and can readily photograph objects above water and objects under water in the semi-underwater photographing mode simultaneously and clearly. Furthermore, even in the second semi-underwater photographing mode, the present embodiment provides a higher possibility that objects above water and objects under water may be photographed simultaneously.

Figure 44:
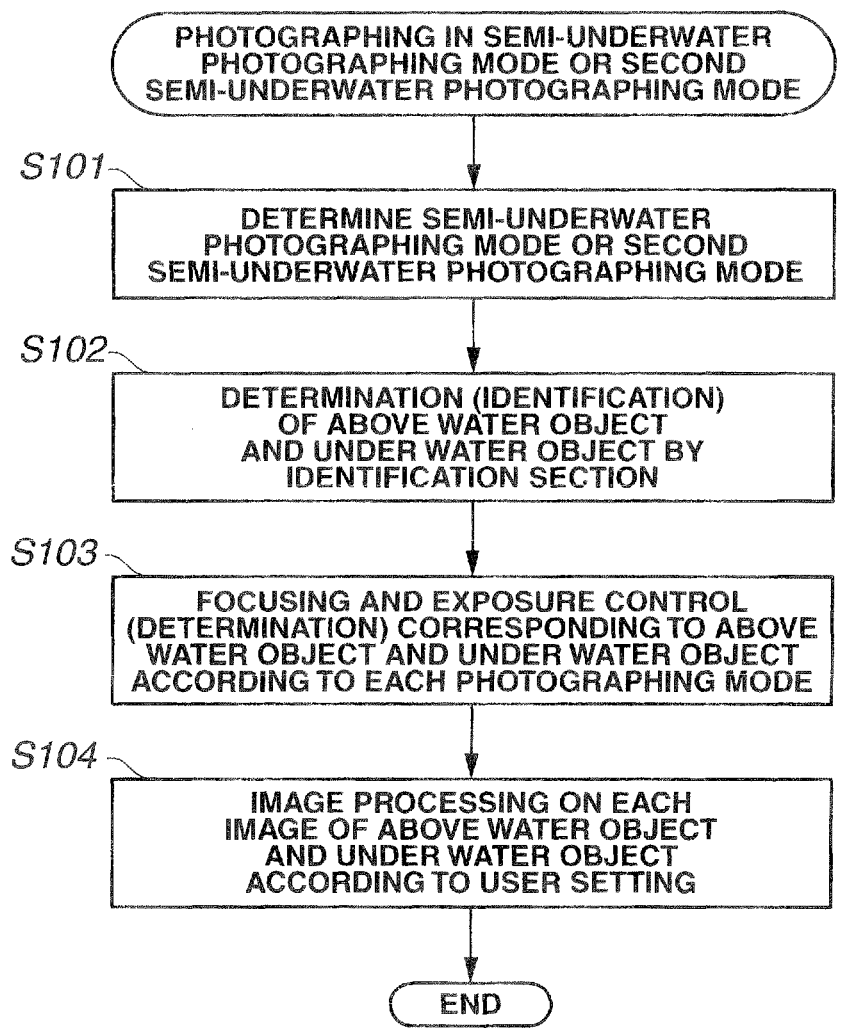
FIG. 44 is a flowchart illustrating a processing procedure when performing a control operation according to an identification result by an identification section.

Furthermore, after determining that the photographing state is in the semi-underwater photographing mode or second semi-underwater photographing mode described in FIG. 43, it is possible to perform photographing on an image of an object above water and an image of an object under water according to the identification result by the identification section 54f by a processing procedure shown in FIG. 44. The processing procedure in FIG. 44 is included in the detailed processing procedure shown in FIG. 39 or the like, but further includes partially different contents.

In step S101, the image processing & control section 54 automatically determines (e.g., in the processing procedure in step S123) that the photographing state is in the semi-underwater photographing mode or the second semi-underwater photographing mode.

In next step S102, the identification section 54f determines (identifies) (the image region of) an object above water and (the image region of) an object under water of a photographed image as described above.

Furthermore, in next step S103, the image processing & control section 54 performs a control operation of focusing and exposure control (exposure determination) corresponding to objects above water and objects under water according to the above described two photographing modes.

In this case, the user 63 may make a presetting so as to perform different image processing on each image (region) of objects above water and objects under water and the image processing & control section 54 may perform different image processing on the respective images according to the setting.

For example, in step S104, the image processing & control section 54 performs image processing on images of all or one of objects above water and objects under water according to the setting by the user 63. For example, the image processing & control section 54 can perform processing of enhancing a red color or enhancing contours on images of objects under water.

Through the processing of enhancing a red color, it is possible to generate an image with variations in color tone between the above water side and the underwater side suppressed.

The display section 55 then displays the image subjected to image processing and ends the processing in FIG. 44. Thus, the present embodiment improves operability, and can more flexibly meet preferences or the like of the user 63 and widely satisfy different needs.

Based on the identification result by the identification section 54f, the brightness may be appropriately set for images of each region of the object above water side and the object under water side for example, by changing amplification factors when the image processing & control section 54 performs image processing. That is, the object under water side tends to have a darker image than the object above water side, and therefore greater amplification factors may be set for the images of the objects under water than the images of the objects above water so that the brightness of both images may be controlled to appropriate brightness. In this case, images of both the objects above water and the objects under water can be made easier to see.

Furthermore, an embodiment configured by partially combining the aforementioned embodiments or the like also belongs to the present invention. Furthermore, the flowchart of each embodiment or the like illustrates an example of a typical processing procedure, but the flowcharts are not limited to such specific examples.

Eighth Embodiment

Figure 45:
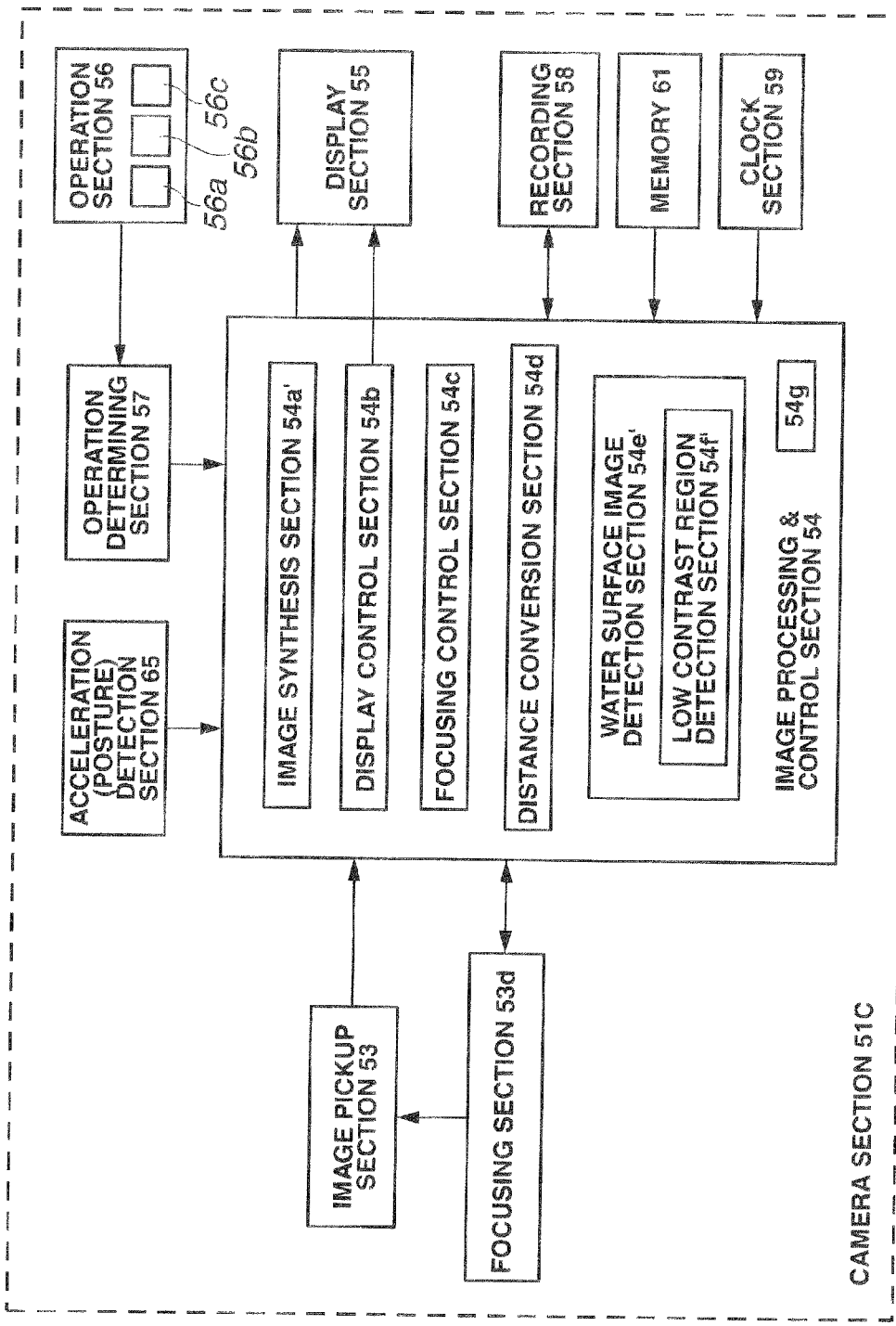
FIG. 45 is a block diagram illustrating a configuration of a camera according to an eighth embodiment of the present invention.
Figure 46A:
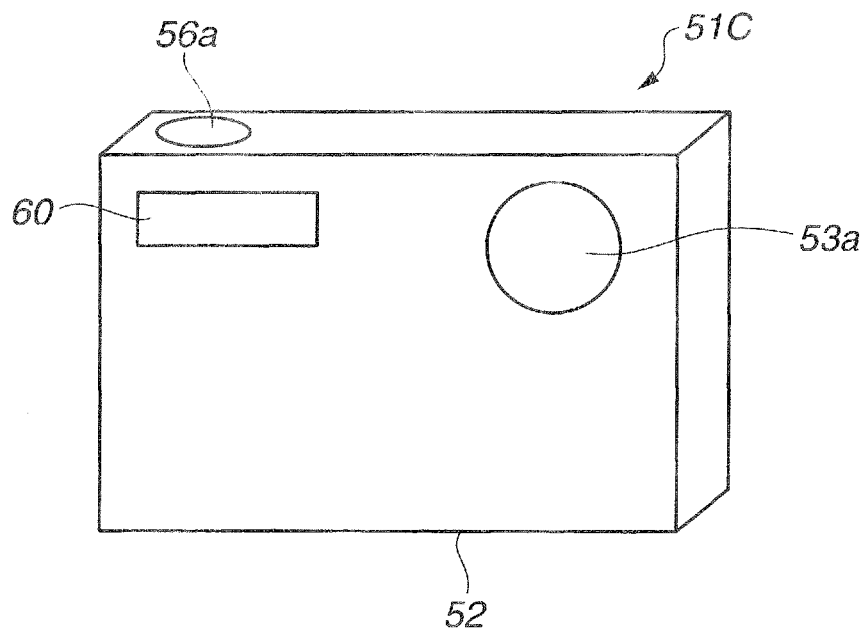
FIG. 46A and FIG. 46B are perspective views illustrating configurations of the front side and the back side of the camera.
Figure 46B:
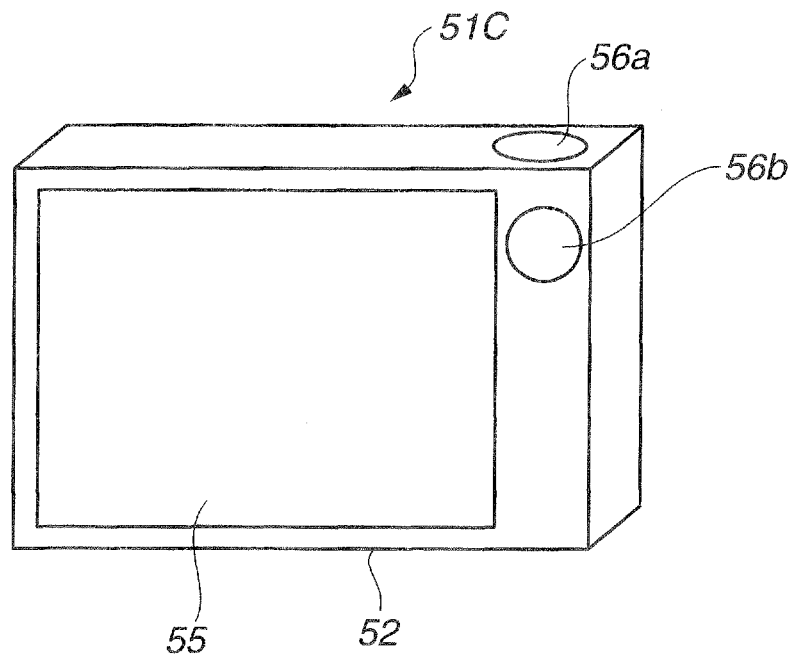

A camera 51C having a waterproof structure provided with a photographing function of an eighth embodiment of the present invention shown in FIG. 45 has a box shape as shown in FIG. 46A and FIG. 46B. A photographing lens 53a that constitutes an image pickup section 53 for picking up (photographing) an image of an object is provided at a position on the left side from the center and closer to the top of the front side of a case 52 having a waterproof structure as an enclosure of this camera 51C.

Figure 48:
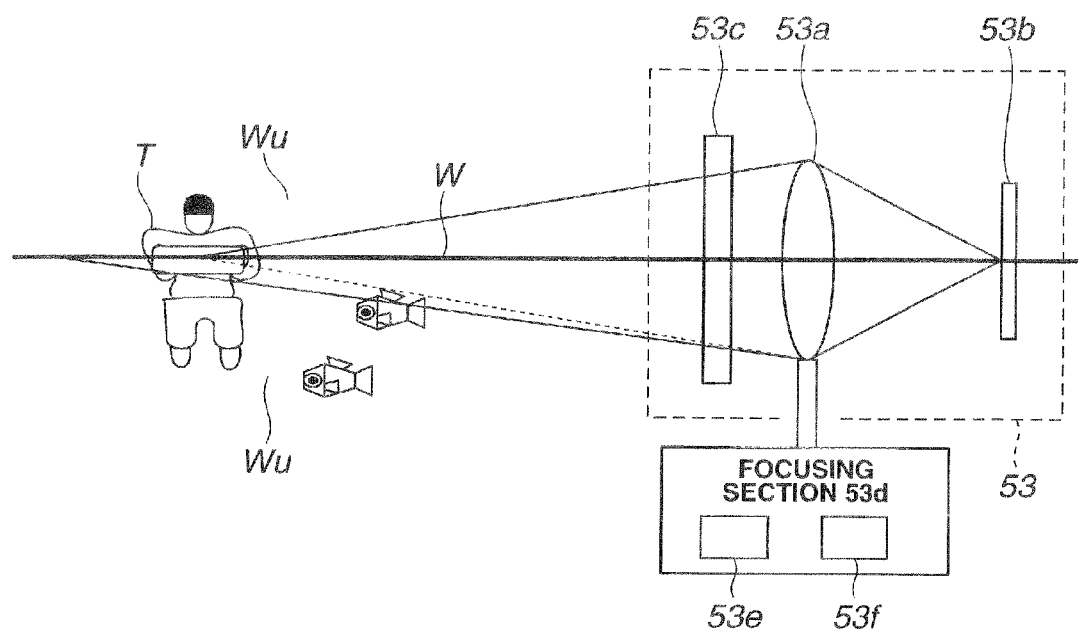
FIG. 48 is a diagram illustrating a case where focusing in a semi-underwater photographing mode is performed.
Figure 49:
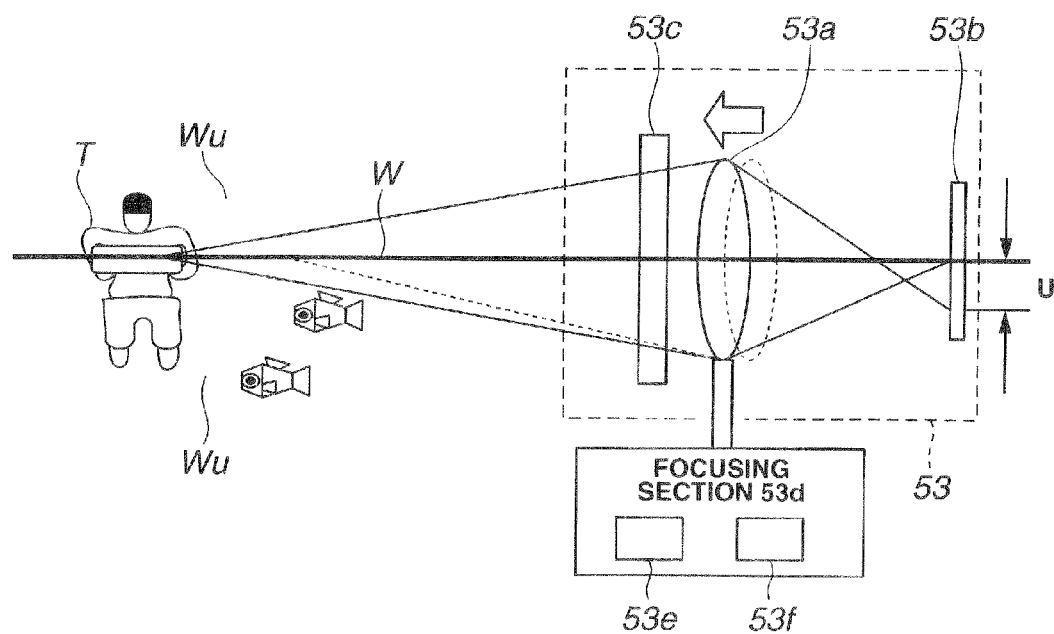
FIG. 49 is a diagram illustrating an operation when focusing is actually performed in a semi-underwater photographing mode according to the eighth embodiment.
Figure 50:
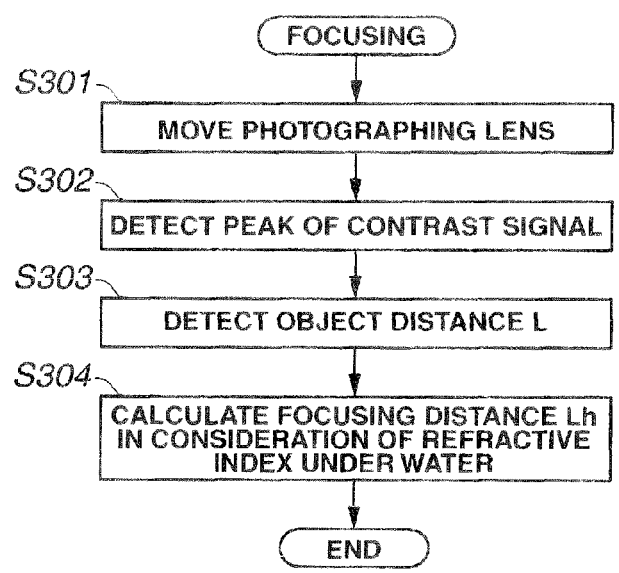
FIG. 50 is a flowchart illustrating a processing procedure when the focusing shown in FIG. 49 is performed.

Actually, as shown in FIG. 48, FIG. 49 and FIG. 50, a cover glass 53c is disposed in front of a photographing lens 53a, which makes watertight and protects the photographing lens 53a. Furthermore, the cover glass 53c and the photographing lens 53a are mounted in a lens barrel (not shown). An image pickup device 53b such as charge-coupled device (CCD) is disposed at an image forming position of the photographing lens 53a and the photographing lens 53a and the image pickup device 53b form an image pickup section 53 in FIG. 45.

Furthermore, as shown in FIG. 45, the image pickup section 53 can achieve focus of an object image formed on the image pickup plane of the image pickup device 53b through the focusing section 53d. The focusing section 53d is configured using, for example, a drive section 53e (see FIG. 48) that moves the photographing lens 53a in the optical axis direction.

Instead of moving the photographing lens 53a by the drive section 53e, the image pickup device 53b may be configured to move in the optical axis direction. Furthermore, although the image pickup section 53 and the focusing section 53d are shown in FIG. 45 or the like as independent bodies, the image pickup section 53 may be configured to include the focusing section 53d.

The image pickup device 53b of the image pickup section 53 outputs an image pickup signal (image data), which is an object image formed on the image pickup plane and then photoelectrically converted, to an image processing & control section 54 that performs image processing and control shown in FIG. 45.

The image processing & control section 54 performs image processing on the image pickup signal, generates an image signal for display and outputs the image signal to a display section 55. The display section 55 displays an image corresponding to the inputted image signal for display on a display screen (also simply referred to as a "screen").

The image displayed on the display section 55 is an image corresponding to the object image formed on the image pickup plane of the image pickup device 53b and the user observes the image and thereby checks whether or not record the image as a photographed image.

Thus, in the normal photographing mode, the image processing & control section 54 displays the object image formed on the image pickup plane of the image pickup device 53b on the screen of the display section 55 as a normal image.

The display section 55 is formed on the back side of the case 52 as shown in FIG. 46B using, for example, a liquid crystal panel in a rectangular size which is slightly smaller than the whole back side plane.

Furthermore, as shown in FIG. 46A and FIG. 46B, a release button 56a that performs a photographing operation is provided on, for example, the right side of the top surface of the case 52. When the photographer (user) operates an operation section 56 including the release button 56a as shown in FIG. 45, the operation result is determined by an operation determining section 57.

The information on the determination result of the operation determining section 57 is inputted to the image processing & control section 54. The image processing & control section 54 performs control corresponding to the determination result.

When the operation determining section 57 determines a release operation (photographing instruction operation), the image processing & control section 54 records the image picked up by the image pickup section 53 in a recording section 58 as a photographed image.

Furthermore, a mode setting switch 56b as shown in FIG. 46B is provided as the operation section 56 shown in FIG. 45.

Operating the mode setting switch 56b, the user can set a photographing mode or a reproducing mode, set a semi-underwater photographing mode which will be described later, perform setting for focusing or the like from a switch menu.

The mode setting switch 56b has the function of a semi-underwater photographing mode setting section for setting a semi-underwater photographing mode.

In addition to the mode setting switch 56b that has a plurality of setting functions, operation buttons or the like may be provided whereby the user directly performs various instruction operations. Furthermore, operation buttons may be provided which independently perform a plurality of functions that can be selected from the mode setting switch 56b.

For example, FIG. 45 shows an example where a semi-underwater photographing mode button 56c is provided as an independent body in the operation section 56 as the semi-underwater photographing mode setting section for setting the semi-underwater photographing mode. According to the present embodiment, the image processing & control section 54 is provided with the function of a semi-underwater photographing mode determining section 54g that automatically recognizes a photographing state in a semi-underwater photographing mode as will be described later. Thus, the user need not manually operate the semi-underwater photographing mode button 56c in a state in which automatic recognition is set to be performed.

Furthermore, the present embodiment performs focusing (focus balance) control over the image of the object on the above water side (object above water) when the semi-underwater photographing mode is set, but when the distance to the object on the above water side is large (for example, when the distance exceeds a boundary distance Lb set according to transparency), the present embodiment provides a condition which gives priority to focusing on the image of the object on the underwater side (object under water) in consideration of underwater transparency.

The boundary distance Lb is set to, for example, Lb=3 m as a default setting. The user can change/set the boundary distance Lb to a value corresponding to the actual underwater transparency by operating a boundary distance setting button (not shown).

A clock section 59 that outputs information on a clock is connected to the image processing & control section 54 and when a photographing operation or the like is performed, the image processing & control section 54 adds information on a photographing date and time to the image recorded in the recording section 58 and records the information. Furthermore, a strobe apparatus 60 is provided on the front of the case 52 as shown in FIG. 46A.

An acceleration detection section 65 as a posture detection section that detects the posture of the camera 51C at the time of photographing in particular is connected to the image processing & control section 54. The acceleration detection section 65 is made up of three acceleration sensors accommodated in the case 52 for detecting acceleration acting in vertical, horizontal and depth directions of the case 52 respectively.

Figures 57A, 57B, 57C, 57D:
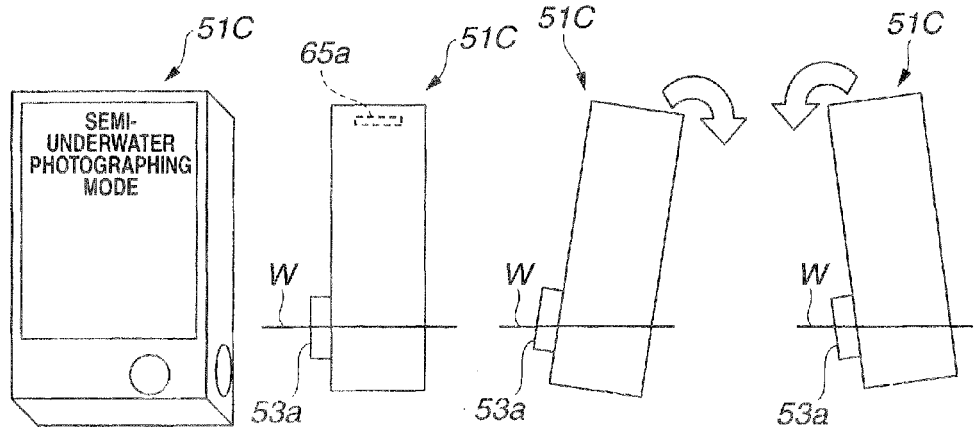
FIG. 57A to FIG. 57D are diagrams illustrating the processing procedure in FIG. 56.

FIG. 57B illustrates a state in which the long sides of the case 52 are vertically oriented and parallel to the vertical direction in which gravity acts so that the image pickup section 53 of the camera 51C is located closer to the bottom, which is appropriate for semi-underwater photographing. In this case, an acceleration sensor 65a shown by a dotted line that detects gravity (acceleration) that acts in the longitudinal direction detects that the longitudinal direction is the posture corresponds to the vertical direction of the image.

Figure 47A:
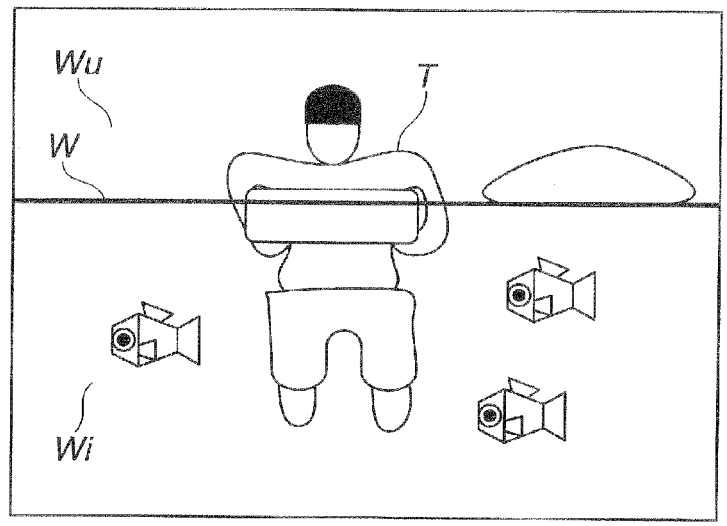
FIG. 47A is a diagram illustrating an object straddling above water and under water.

The camera 51C of the present embodiment has as one of its objects to be able to photograph objects above water such as the face of a figure on the above water (above the water surface) side, ship and landscape and objects under water such as part of the figure on the underwater (below the water surface) side, fish, turtle, water plant as shown in FIG. 47A simultaneously (that is, put in the same screen). Photographing objects above water and objects under water simultaneously is referred to as "semi-underwater photographing."

When the user 63 sets the camera 51C in a photographing state (posture state) in a semi-underwater photographing mode as shown in FIG. 47A and performs an instruction/operation of turning ON the semi-underwater photographing mode button 56c, the image processing & control section 54 sets the camera 51C in an operation state in the semi-underwater photographing mode.

Figure 47B:
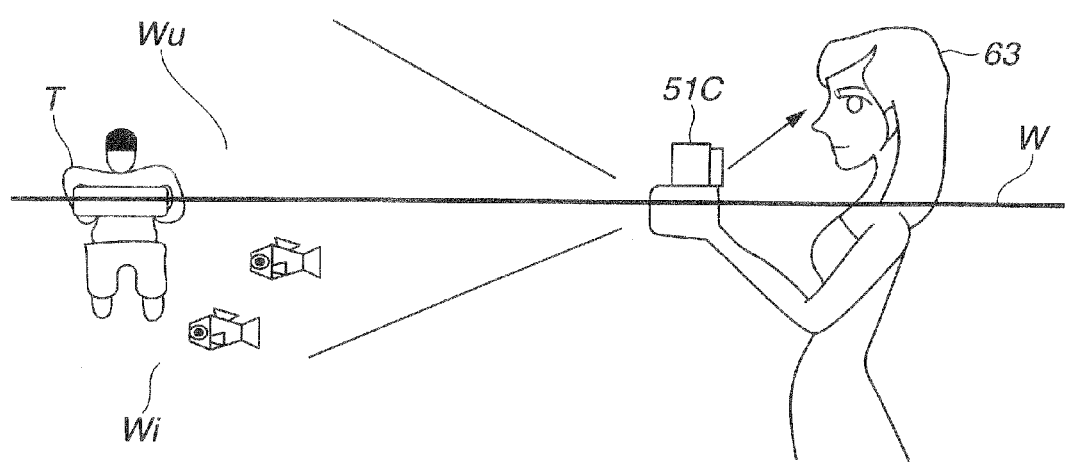
FIG. 47B is a diagram illustrating a situation in a semi-underwater photographing mode in which the user photographs both parts of the object straddling above water and under water shown in FIG. 47A simultaneously using the camera.

In FIG. 47A and FIG. 47B, reference character W denotes the water surface, Wu denotes a portion on the above water side (that is, the air side) and Wi denotes a portion on the underwater side. Furthermore, reference character T denotes an object of a figure straddling above water and under water to be photographed in the semi-underwater photographing mode (for simplicity).

In the present embodiment, the image processing & control section 54 in FIG. 45 is configured to have each of the functions of an image synthesis section 54a', a display control section 54b, a focusing control section 54c, a distance conversion section 54d and a low contrast region detection section 54f as will be described below.

Furthermore, the image processing & control section 54 is configured using, for example, a CPU and a memory 61 that stores a program to execute the respective functions above and is connected to the image processing & control section 54. The memory 61 is made up of a non-volatile memory such as flash memory. Furthermore, the image processing & control section 54 is internally provided with a memory (not shown) such as RAM to temporarily store data and image data or the like. The memory 61 may also function as such a memory.

When performing semi-underwater photographing as described above, the user 63 sets a photographing state in a semi-underwater photographing mode in which most of the lower half portion of the photographing lens 53a (of the image pickup section 53) of the camera 51C is submerged in water as shown in FIG. 47B.

The camera 51C shown in FIG. 47B is set in a state as shown in FIG. 48. In the state in the semi-underwater photographing mode set as shown in FIG. 48, substantially the lower half portion of the photographing lens 53a of the image pickup section 53 on the front side of the camera 51C is submerged in water below the water surface.

Furthermore, FIG. 48 illustrates a situation in which the photographing lens 53a of the image pickup section 53 achieves focus on, for example, an object on the above water side set in the semi-underwater photographing mode.

The photographing lens 53a making up the image pickup section 53 illustrated in FIG. 48 is allowed to move in the optical axis direction by the drive section 53e making up the focusing section 53d. Furthermore, the focusing section 53d is provided with a position sensor 53f, which detects the position of the photographing lens 53a set by the drive section 53e and outputs the position information to the focusing control section 54c and the distance conversion section 54d of the image processing & control section 54.

As shown in FIG. 48, when focus is achieved, for example, on the figure object T as an object on the above water side, focus under water is achieved on a (distance) position behind the figure object T due to a refractive index nw under water.

This case (state in which focus is achieved on a position behind the figure object T under water) is inconvenient because this is the direction in which focus on fish or the like in front of the figure object T is less likely to be achieved. Furthermore, for reasons related to underwater transparency (transmissivity), a distant view is more likely to become obscure under water than above water. For this reason, it is inconvenient to achieve focus on a distant object underwater side rather than the above water side.

Thus, in the present embodiment, the focusing control section 54c of the image processing & control section 54 performs control such that focus is achieved (focus setting) at a shorter distance than the focus position shown in FIG. 48.

FIG. 49 shows a state of the (photographing lens 53a of the) image pickup section 53 in which the focusing control section 54c has achieved focus. As shown in FIG. 49, the photographing lens 53a is set at a position ahead of the position of the photographing lens 53a shown in FIG. 48 (position indicated by the dotted line in FIG. 49).

By so setting, focus is achieved at a shorter distance than the focus position in FIG. 48. FIG. 49 illustrates an approximate amount of blur U as the amount of deviation of the image formed on the image pickup device 53b through the optical path on the above water side from the image focused on the underwater side from a position above water.

The focusing processing method here is as shown in FIG. 50. When the focusing in the semi-underwater photographing mode starts, the focusing control section 54c of the image processing & control section 54 drives the drive section 53e of the focusing section 53d in first step S301 and moves the photographing lens 53a in the optical axis direction.

During the movement, the image processing & control section 54 detects a contrast signal corresponding to a difference between a brightness signal of the brightest portion and a brightness signal of the darkest portion obtained from each frame of the image pickup signal of the image pickup device 53b.

In step S302, the image processing & control section 54 sets the photographing lens 53a at a position where the contrast signal reaches a peak. The set position is detected by the position sensor 53f and the position sensor 53f sends the position information to the distance conversion section 54d.

In next step S303, the distance conversion section 54d calculates a distance (referred to as "object distance") L to the focused object from the position information.

Furthermore, in next step S304, the distance conversion section 54d calculates a distance on the shorter distance side than the obtained object distance L as a focusing distance Lh which is actually focused in consideration of the refractive index of water nw (=1.33).

In this case, the distance conversion section 54d of the image processing & control section 54 determines the focusing distance Lh from L/C using a correction coefficient C (e.g., C=1.3 as a default value, as will be described in FIG. 54) provided beforehand for the object distance L.

In other words, the distance conversion section 54d converts the object distance L obtained on the above water side to the focusing distance Lh appropriate for clearly (picking up images of) photographing both objects above water and under water.

The distance conversion section 54d then sends the focusing distance Lh to the focusing control section 54c and ends the processing of calculating the focusing distance Lh in FIG. 50.

Therefore, when performing focusing while the semi-underwater photographing mode is set, the focusing control section 54c in the present embodiment calculates the object distance L to the object above water and performs control of setting the focus position for performing focusing in consideration of the refractive index under water.

Figure 51:
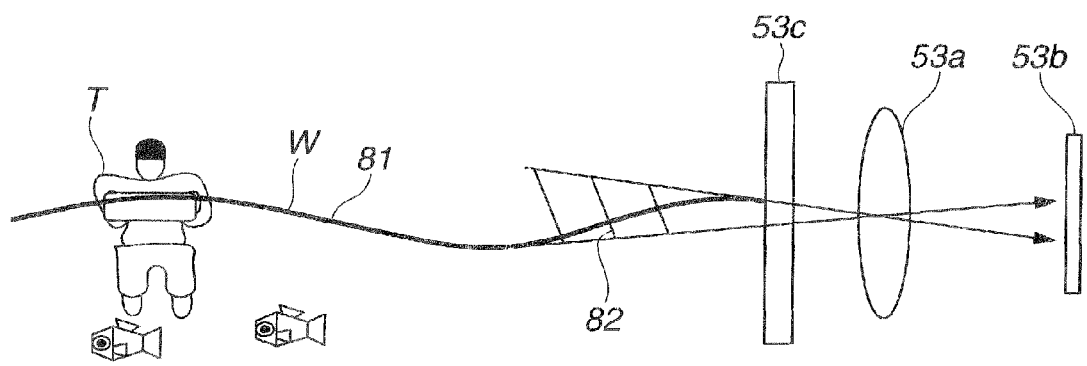
FIG. 51 is a diagram illustrating a situation in which an original object image to be photographed is not formed due to a disturbed water surface portion when there is a wave whose water surface locally fluctuates.

Though aforementioned FIG. 49 or the like illustrates a case where the height of the water surface W is not fluctuating, the height of the water surface W may actually locally fluctuate due to wind or the like and a wave 81 may be generated. FIG. 51 illustrates a situation in which the generation of the wave 81 affects the object image to be photographed formed on the image pickup plane of the image pickup device 53b.

As shown in FIG. 51, the light impinging on the photographing lens 53a from the object side is substantially obstructed by a portion where the water surface W turns from a crest to a trough of the wave 81, that is, the water surface section of a region 82 shown by hatching in FIG. 51 and is prevented from forming an image on the image pickup device 53b.

Figure 52A:
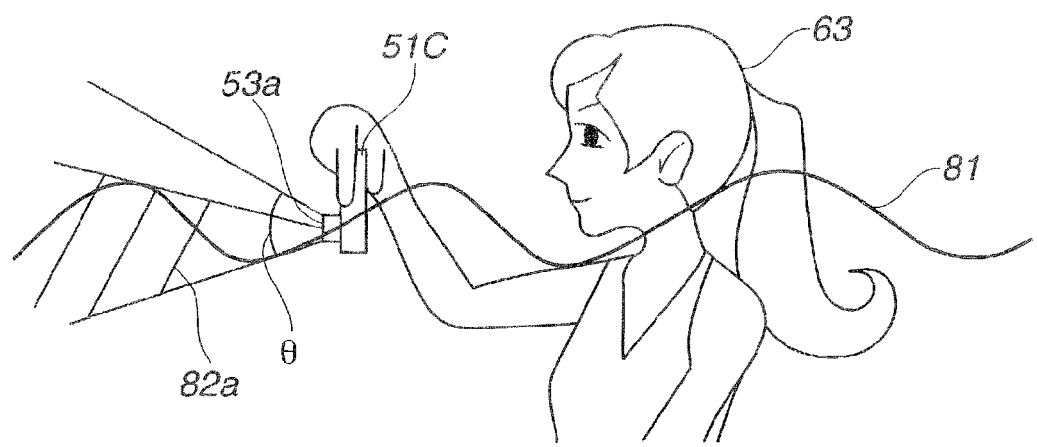
FIG. 52A is a diagram illustrating a situation in which photographing is performed in a semi-underwater photographing mode when there is a wave greater than the diameter of the photographing lens.
Figure 52B:
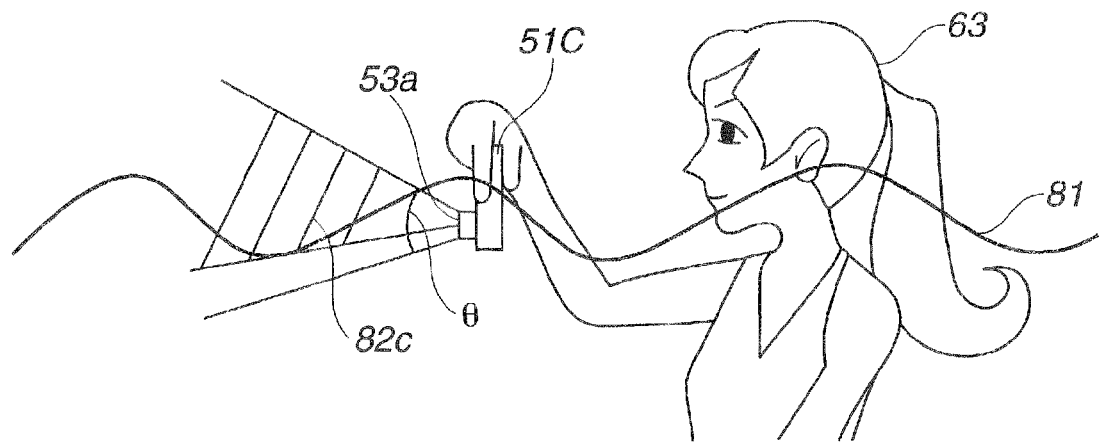
FIG. 52B is a diagram illustrating a photographing state which has been changed from that in FIG. 52A due to a temporally fluctuating wave in a state similar to that in FIG. 52A.

FIG. 51 shows the state in which fluctuations of the water surface W affect some region of the image pickup plane of the image pickup device 53b, and in cases as shown in FIG. 52A and FIG. 52B where there is a wave 81 larger than the lens diameter of the photographing lens 53a (of the image pickup section 53), the region receives greater influences.

FIG. 52A illustrates a state in which the wave 81 approaches its trough immediately before the photographing lens 53a. This is a state in which the photographing lens 53a faces the air above the water surface W. In this state, the portion shown by hatching immediately before the photographing lens 53a where the wave 81 goes from its trough to its crest corresponds to a region that obstructs image pickup of the object (to be photographed) (that is, a region where the image is out of focus, and picked up obscurely in a low contrast state, and therefore the object to be photographed is photographed obscurely or image pickup is impossible or the image is lost) 82a. θ denotes the field of view of the image pickup section 53 of the camera 51C.

Figure 53A:
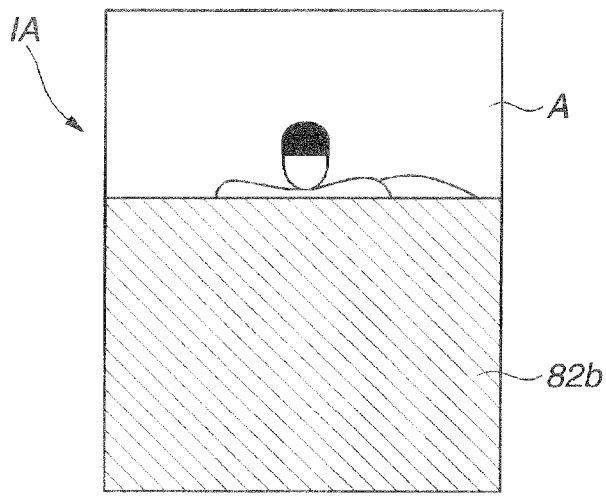
FIG. 53A is a diagram illustrating an example of image photographed in the state in FIG. 52A.

In this case, an image acquired from the object image formed on the image pickup plane of the image pickup device 53b (of the image pickup section 53) or an image IA which is the image displayed on the display section 55 is as shown in FIG. 53A.

As shown in FIG. 53A, part of the object above water of the upper portion of the field of view θ of the camera 51C due to the region 82a (water surface section where the height of the water surface W fluctuates) shown in FIG. 52A can be acquired as an image A through image pickup, whereas due to the region 82a, an image region 82b is generated in the lower portion thereof as a water surface pattern (water surface section image) which is an image of the object to be photographed picked up obscurely with low contrast.

In other words, in an image picked up of the original object to be photographed, the image region 82b is generated whose image is picked up with low contrast due to the water surface section where the height of the water surface W locally fluctuates. As will be described later, the image region 82b is detected as a water surface pattern (image of the water surface section) with low contrast.

Furthermore, FIG. 52B illustrates a state in which the camera 51C is submerged under a crest of the wave 81. In this state, the portion shown by hatching becomes a region 82c that obstructs image pickup of the object to be photographed. In this case, an image IB that can be acquired is as shown in FIG. 53B.

Figure 53B:
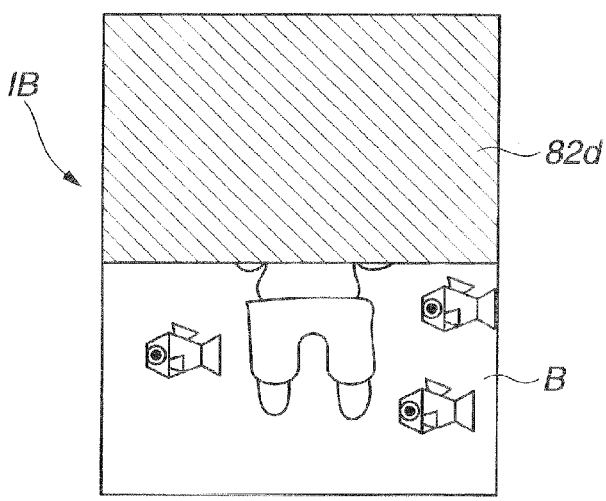
FIG. 53B is a diagram illustrating an example of image photographed in the state in FIG. 52B.

As shown in FIG. 53B, part of the object under water of the lower portion of the field of view θ of the camera 51C due to the region 82c shown in FIG. 52B can be acquired as an image B through image pickup, whereas due to the region 82c, an image region 82d is generated in the upper portion thereof as a water surface pattern which is an image of the object to be photographed picked up obscurely with low contrast.

The image synthesis section 54a' of the image processing & control section 54 of the present embodiment then generates a synthesized image that interpolates at least one of the image of the object above water and the image of the object under water whose photographing is obstructed by the water surface section. To be more specific, the image synthesis section 54a' performs image synthesis processing of generating a synthesized image IC shown in FIG. 53C by synthesizing the image IA in FIG. 53A with the image IB in FIG. 53B. The display control section 54b outputs the synthesized image IC generated by the image synthesis section 54a' to the display section 55 and the display section 55 displays the synthesized image IC shown in FIG. 53C.

Figure 53C:
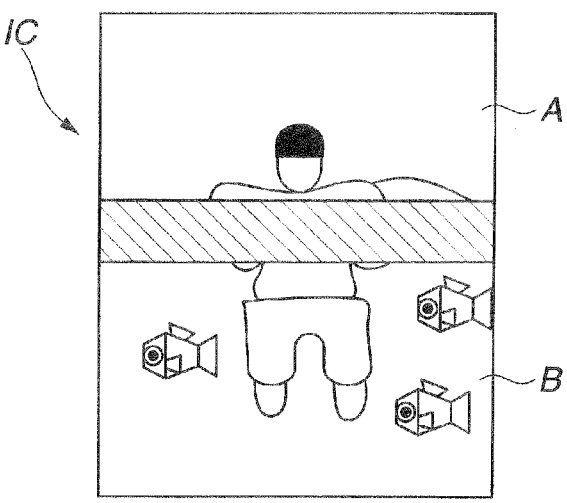
FIG. 53C is a diagram illustrating an example of synthesized image generated by the image synthesis section according to the eighth embodiment.

The synthesized image IC shown in FIG. 53C is synthesized by placing the region other than the low contrast region on the upper portion of the image IB (that is, image B) in the image region 82b which is the low contrast region in the lower portion of the image IA. In this case, although the water surface pattern corresponding to the vicinity of the water surface alone remains in the center region, the synthesized image IC is obtained above and below the center region, that simultaneously accommodates the (above water object) image A corresponding to the object above water and the (under water object) image B corresponding to the object under water.

Since the time difference between photographing timings at which the image IA and the image IB are acquired respectively can be normally estimated to be small, the variation in the field of view by the image pickup section 53 is ignored and both images can be considered to be in the same photographing state. The present embodiment then performs image synthesis of generating the synthesized image IC shown in FIG. 53C by substituting or interpolating the image region 82b of the low contrast region corresponding to the lower portion of the image IA in FIG. 53A with the image B in the image IB in FIG. 53B.

In other words, the present embodiment includes the image synthesis section 54a' that performs interpolation (including a case of substitution), when an object above water and an object under water are photographed in the photographing state in a semi-underwater photographing mode, if an image of one of the object above water and the object under water cannot be acquired due to influences of the water surface section whose water surface fluctuates, on the one image with the other image that could be acquired or other images and generates a synthesized image.

In order to generate the synthesized image IC shown in FIG. 53C, the image processing & control section 54 has the function of the water surface section image detection section 54e' shown in FIG. 45 for detecting the image region 82b or 82d in each image in FIG. 53A and FIG. 53B obscurely picked up as an image of the water surface section which is an image of the water surface section whose water surface fluctuates.

The water surface section image detection section 54e' includes the function of the low contrast region detection section 54f that detects a low contrast region as a region having low contrast as a characteristic of the water surface section. In the present embodiment, the water surface section is mainly applied to the case of a water surface that fluctuates, but there can also be a case where the water surface does not fluctuate.

The low contrast region detection section 54f determines by comparison whether the brightness value of each pixel of an image picked up by the image pickup device 53b is equal to or less than a predetermined threshold and detects a pixel region whose brightness value is equal to or less than the threshold as a low contrast region which has a high probability of being the image of the water surface section corresponding to the water surface section.

When the determination result shows that the detected low contrast region satisfies a predetermined condition which will be described later in FIG. 55, the water surface section image detection section 54e' determines that the low contrast region is the image of the water surface section (water surface pattern).

Furthermore, the image states in FIG. 53A and FIG. 53B corresponding to FIG. 52A and FIG. 52B vary with time. Thus, the present embodiment temporally monitors a variation in brightness (contrast) in the upper and lower portions of the image acquired through image pickup.

The camera 51C has the feature of including the image pickup section 53 for simultaneously photographing an object above water in the upper portion of the water surface and an object under water in the lower portion of the water surface, the water surface section image detection section 54e' that detects an image of the water surface section corresponding to the water surface section on the boundary between an (object above water) image of an object above water and an (under water object) image of an object under water and the image synthesis section 54a' that generates a synthesized image for interpolating at least one of the (above water object) image and (under water object) image whose photographing is obstructed by the presence of the water surface section within the field of view of the image pickup section 53 based on the detection result of the image of the water surface section.

Furthermore, the camera 51C has the semi-underwater photographing mode determining section 54g that automatically detects that the image pickup section 53 is set to a photographing state in a semi-underwater photographing mode as the photographing mode for simultaneously photographing an object above water and an object under water and the image synthesis section 54a' has the function of detecting an image of the water surface section generated from the water surface section whose water surface fluctuates from a plurality of images photographed by the image pickup section 53 at a plurality of photographing timings after the determination of the photographing state in the semi-underwater photographing mode by the semi-underwater photographing mode determining section 54g, synthesizing an (above water object) image of the object above water or an (under water object) image of the object under water with at least part of the image of the water surface section and generating a synthesized image with the reduced region of the image of the water surface section.

Next, with reference to FIG. 54, the processing procedure for photographing and recording, and generating and displaying a synthesized image mainly by the image processing & control section 54 of the camera 51C of the present embodiment will be described.

When the photographing operation starts, the image processing & control section 54 determines in first step S211 whether or not the user 63 sets a photographing mode. When the photographing mode is set, the image processing & control section 54 performs image processing for displaying the image picked up by the image pickup section 53 on the display section 55 in next step S212, outputs the image to the display section 55 and the display section 55 displays the image as a through image (as the image of the object picked up by the image pickup device 3b).

In next step S213, the image processing & control section 54 determines whether or not the camera 51C is set to the photographing state in the semi-underwater photographing mode. If this determination is set to be performed by an automatic determination, such an automatic determination on the photographing state in the semi-underwater photographing mode is made according to a processing procedure in FIG. 56 which will be described later.

When the photographing state in the semi-underwater photographing mode is not set, as shown in step S214, the focusing control section 54c of the image processing & control section 54 performs focusing in the center of the screen. After that, in next step S215, the image processing & control section 54 performs processing of normal photographing and then moves to processing in step S211.

On the other hand, when it is determined in step S213 that the photographing state in the semi-underwater photographing mode is set, the focusing control section 54c of the image processing & control section 54 performs focusing in the upper portion of the screen in step S216 and determines exposure in the lower portion of the screen.

The image processing & control section 54 performs processing such as focusing on the object image formed on the image pickup plane of the image pickup device 53b (e.g., the image of the object is formed upside down on the image pickup plane), but a case where the object image is displayed on the screen of the display section 55 while keeping the actual longitudinal position of the object will be described as a reference.

That is, the focusing control section 54c performs focusing based on an image pickup signal (image signal) obtained by picking up an image of the object on the above water side and calculates (detects) the aforementioned object distance L. On the other hand, regarding exposure, the focusing control section 54c determines exposure so that brightness appropriate for photographing of the object on the underwater side is obtained.

Furthermore, the present embodiment performs control processing of setting the focusing distance Lh so as to be able to clearly photograph also the object under water as described above.

In next step S217, the distance conversion section 54d of the image processing & control section 54 performs a conversion that converts the object distance L to the focusing distance Lh for actual focusing. To be more specific, the distance conversion section 54d calculates the focusing distance Lh by dividing the object distance L by 1.3 as a correction coefficient C. That is, the distance conversion section 54d sets Lh=L/1.3. The focusing control section 54c then sets the photographing lens 53a at the focus position of this focusing distance Lh.

The process then moves to processing in step S218. The photographing state of the image pickup section 53 set through the processing in step S217 corresponds to the state shown in FIG. 49.

Such a setting is based on the consideration that a balance in focus between fish in front of the body portion under water of the figure object T and the body portion above water improves (focuses on both objects are balanced, thus preventing such focusing that one of those images becomes obscure).

Though C=1.3 is assumed as the correction coefficient C in the above case, if the body portion above water and the body portion below the water surface are assumed to be the main photographing targets instead of assuming fish under water as the main photographing targets, the focusing distance Lh may be set to on the order of L/1.2.

Thus, the correction coefficient C may be set, for example, to C=1.3 as the default value and the user 63 may be allowed to change the value of the correction coefficient C within a range of on the order of 1.1 to 1.3 through a selection operation.

Furthermore, the object under water may turn darker (due to transparency compared to the above water side), may have lower contrast or may be susceptible to influences of suspended solids or the like, and therefore in step S216, focusing is performed on the object above water which has higher reliability so as to be able to calculate the object distance L which has higher reliability (accuracy).

Furthermore, in photographing such a scene, assuming that there is an object to be photographed under water, control is performed so as to determine exposure based on the brightness of the object on the underwater side. Furthermore, the region may be divided into under water and above water portions, and the image processing & control section 54 may change the amplification factors (gains) when performing image processing so as to obtain appropriate brightness for both regions.

In step S218, the image processing & control section 54 determines whether or not a release operation is performed. When the release operation is not performed, the process returns to the processing in step S211.

On the other hand, when the release operation is performed, in next step S219, the water surface section image detection section 54e' of the image processing & control section 54 detects whether or not there is any generation of an image region that is lost due to the water surface section as shown in FIG. 53A or FIG. 53B, that is, detects whether or not a water surface pattern (image of the water surface section) has been generated.

In next step S220, the water surface section image detection section (water surface pattern detection section) 54e' determines whether or not a water surface pattern exists in the center part and the lower portion of the screen is a low contrast region using the function of the low contrast region detection section 54f.

When the determination result is affirmative, in next step S221, the image processing & control section 54 designates the determined image as an image IA, adds date and time information from the clock section 59 thereto, performs photographing and records the image in the recording section 58. The process then returns to the processing in step S220.

On the other hand, when the determination result in step S220 is negative, the process also moves to processing in step S222.

In step S222, the water surface section image detection section 54e' determines whether or not the water surface pattern exists in the center part and the upper portion of the screen is a low contrast region using the function of the low contrast region detection section 54f.

When this determination result is affirmative, in next step S223, the image processing & control section 54 designates the determined image as an image IB, adds date and time information from the clock section 59 thereto, performs photographing and records the image in the recording section 58. The process then returns to the processing in next step S222.

On the other hand, when the determination result in step S222 is negative, the process moves to processing in step S224.

When the image IA is recorded in the recording section 58, in step S224, the image synthesis section 54a of the image processing & control section 54 generates a synthesized image IC by synthesizing an image in a region other than the low contrast region of the image IB with the low contrast region of the image IA. The display control section 54b performs control over the display of the synthesized image IC on the display section 55 and the display section 55 displays the synthesized image IC as shown in FIG. 53C.

Therefore, as shown in FIG. 53A or FIG. 53B, even when photographing is performed at timing at which only part of the intended object to be photographed can be photographed, the present embodiment displays a synthesized image IC expressing substantially the whole picture of the object obtained by synthesizing images photographed at a plurality of timings on the display section 55 as shown in FIG. 53C, and therefore the user 63 can observe the synthesized image IC.

After the processing in step S224, the process returns to the processing in first step S211. The image processing & control section 54 may record the synthesized image IC in the recording section 58 according to a setting by the user 63.

On the other hand, when the photographing mode is not set in step S211, the image processing & control section 54 determines in step S225 whether or not the reproducing mode is set. When the reproducing mode is not set, the process moves to step S227.

When the determination result in step S211 shows that the reproducing mode is set, the image processing & control section 54 reproduces the image recorded in the recording section 58 in step S226. In next step S227, the image processing & control section 54 determines whether or not an end operation is performed. When the end operation is not performed, the process returns to the processing in step S211, whereas when the end operation is performed, the power of the camera 51C is turned OFF and the processing in FIG. 54 ends.

Figure 54:
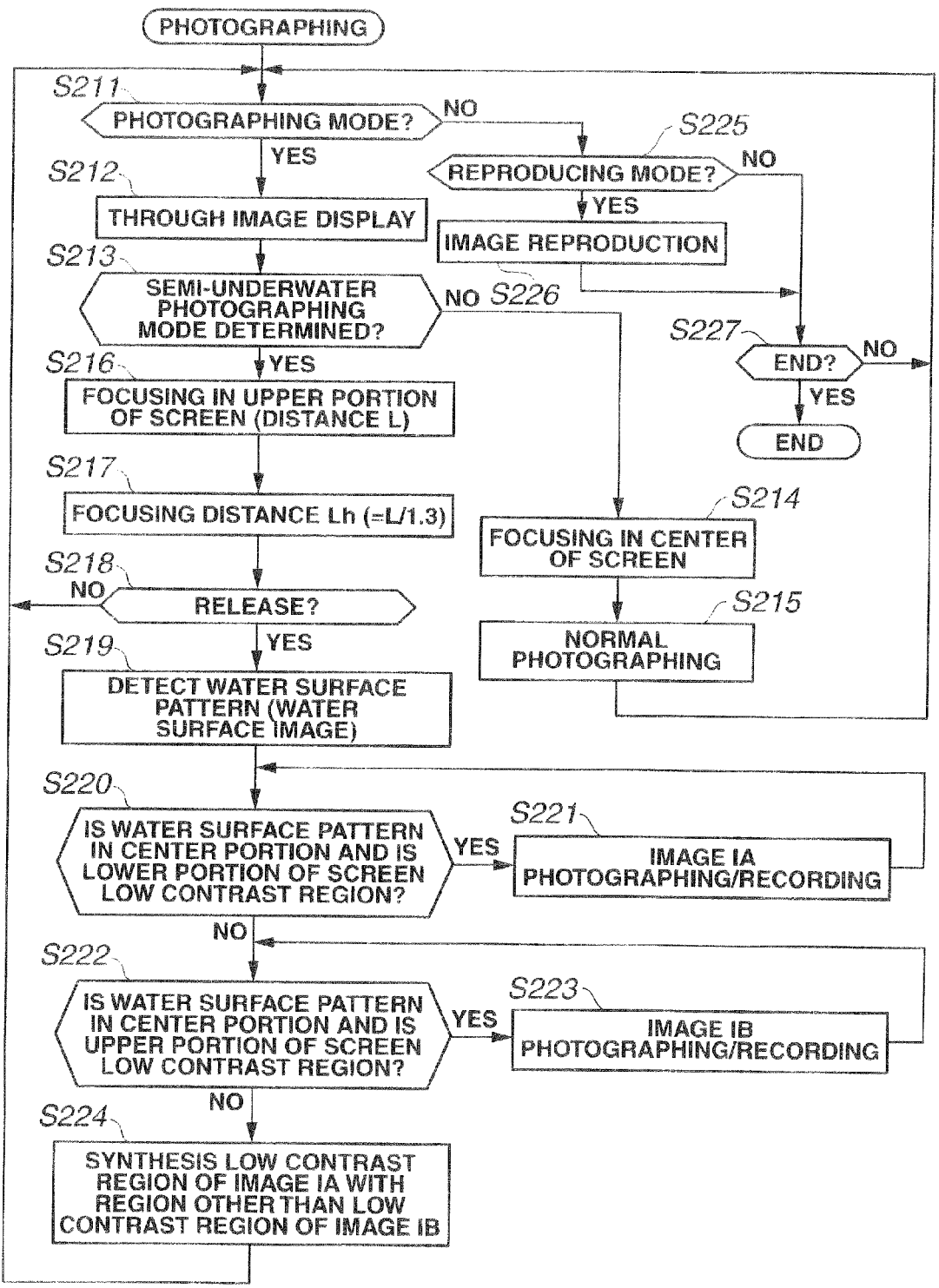
FIG. 54 is a flowchart illustrating an example of processing procedure when performing photographing by the image processing & control section according to the eighth embodiment.
Figure 55:
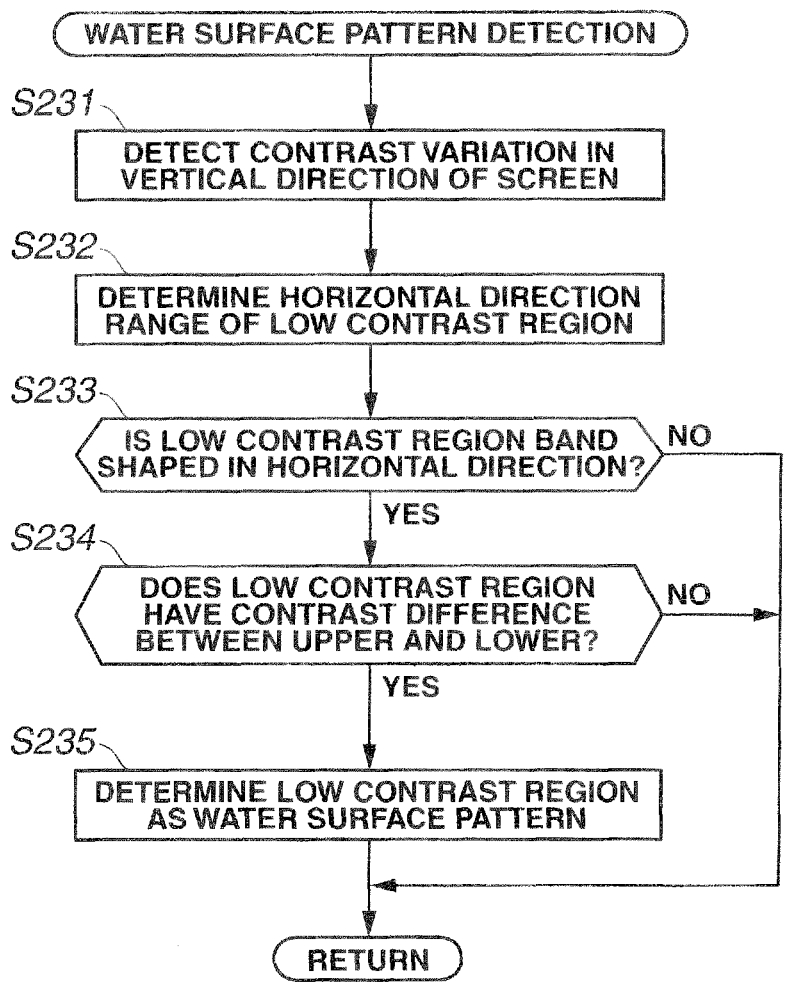
FIG. 55 is a flowchart illustrating a processing procedure for detecting a water surface pattern in FIG. 54.

FIG. 55 illustrates an example of the water surface pattern detection processing procedure in step S219 in FIG. 54. When the water surface pattern detection processing starts, the water surface section image detection section 54e' of the image processing & control section 54 determines in first step S231 whether or not a contrast variation equal to or above a predetermined value exists in the center of the screen.

In this case, the water surface section image detection section 54e' of the image processing & control section 54 identifies (determines) the longitudinal direction of the camera 51C according to the direction of gravity acceleration detected by the acceleration sensor. The water surface section image detection section 54e' then determines whether or not there is a contrast variation equal to or above the predetermined value near the center part in the vertical direction of the screen.

When a water surface which becomes a water boundary (water surface section) exists in the center of the screen, there is a variation in contrast between the underwater side that absorbs light and the above water side that less absorbs light across the water surface as the boundary. The water surface section image detection section 54e' then determines the contrast variation.

In next step S232, the water surface section image detection section 54e' determines the boundary of the contrast variation or a range in the horizontal direction of the contrast region (as a low contrast region) of the portion where the contrast variation exists.

In next step S233, the water surface section image detection section 54e' determines whether or not the low contrast region exists in a band shape in the horizontal direction (like the water surface).

When the determination result shows that the low contrast region exists in a band shape in the horizontal direction, the water surface section image detection section 54e' determines in next step S234 whether or not there is a contrast difference between the upper and lower portions of the screen.

When the determination result shows that there is a contrast difference between the upper and lower portions of the screen, the water surface section image detection section 54e' determines the low contrast region that meets the conditions in step S233 and S234 as a water surface pattern (water surface section image) in step S235 and ends the processing in FIG. 55.

Figure 56:
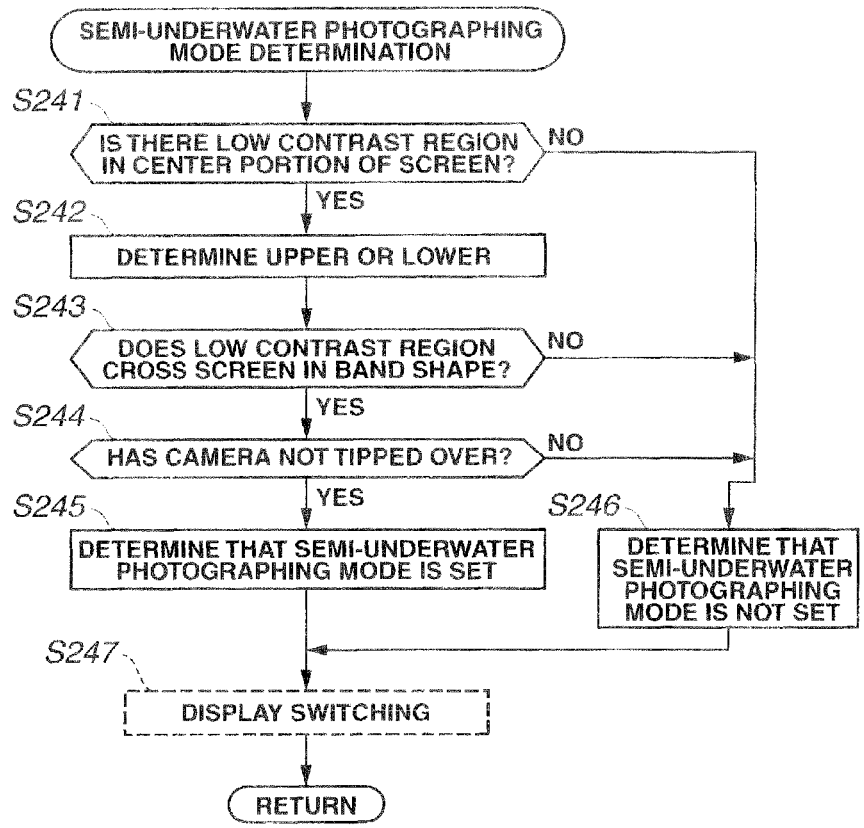
FIG. 56 is a flowchart illustrating a processing procedure for determining whether or not the photographing state is in the semi-underwater photographing mode in FIG. 54.

On the other hand, when the determination result in step S233 is negative and the determination result in step S234 is negative, the water surface section image detection section 54e' determines that the low contrast region does not correspond to the water surface pattern and ends the processing in FIG. 55. When the processing in FIG. 55 ends, the process moves to processing in step S220 in FIG. 54. Furthermore, the processing procedure in step S213 in FIG. 54 for automatically determining whether or not the photographing state is in the semi-underwater photographing mode is as shown in FIG. 56.

When the processing of determining whether or not the photographing state is in the semi-underwater photographing mode starts, the image processing & control section 54 determines in first step S241 whether or not the low contrast region exists in the center of the screen. When the determination result shows that the low contrast region exists, the image processing & control section 54 determines the upper and lower portions of the screen in next step S242.

In this case, the image processing & control section 54 determines the upper and lower portions using the detection result by the acceleration sensor.

After that, the image processing & control section 54 determines in step S243 whether or not the low contrast region crosses the screen in the horizontal direction in a band shape. When the determination result is affirmative, the image processing & control section 54 determines in next step S244 whether or not the camera 51C has tipped over using the detection result of the acceleration sensor.

When performing semi-underwater photographing using the camera 51C shown in FIG. 45A and FIG. 45B, the user 63 holds the camera 51C in a posture in which the photographing lens 53a comes to a lower position than the center of the camera 51C as shown in FIG. 52A or FIG. 52B.

Furthermore, in the case of the camera 51C, the user 63 sets the longitudinal direction of the camera 51C to the vertical direction in which gravity acts. FIG. 57B illustrates the posture of the camera 51C corresponding to FIG. 52A.

In this case, the image processing & control section 54 determines whether or not the camera 51C has tipped over using an acceleration sensor 65a shown by a dotted line and a detection result by an acceleration sensor (not shown) that detects acceleration in the lateral direction of the plane of the sheet which is perpendicular to the vertical direction detected by the acceleration sensor 65a.

FIG. 57B illustrates a state in which the longitudinal direction of the camera 51C has no tipping (inclination) parallel to the vertical direction, and on the other hand, FIG. 57C and FIG. 57D illustrate a state in which there is tipping (inclination) in a clockwise direction and a counterclockwise direction.

When the determination result shows that there is no tipping as in the case of FIG. 57B, the image processing & control section 54 determines in step S245 that the camera 51C in this state is in the photographing state in the semi-underwater photographing mode and ends the processing in FIG. 56.

On the other hand, when the determination result in step S241 is negative, the determination result in step S243 is negative and the determination result in step S244 is negative, the image processing & control section 54 determines in step S246 that the camera 51C in this state is not in the photographing state in the semi-underwater photographing mode and ends the processing in FIG. 56.

After determinations in step S245 and step S246 in FIG. 56, display switching (by the display section 55) according to the determination result may also be performed as shown in step S247. Information may be displayed on the display section 55.

Figure 58:
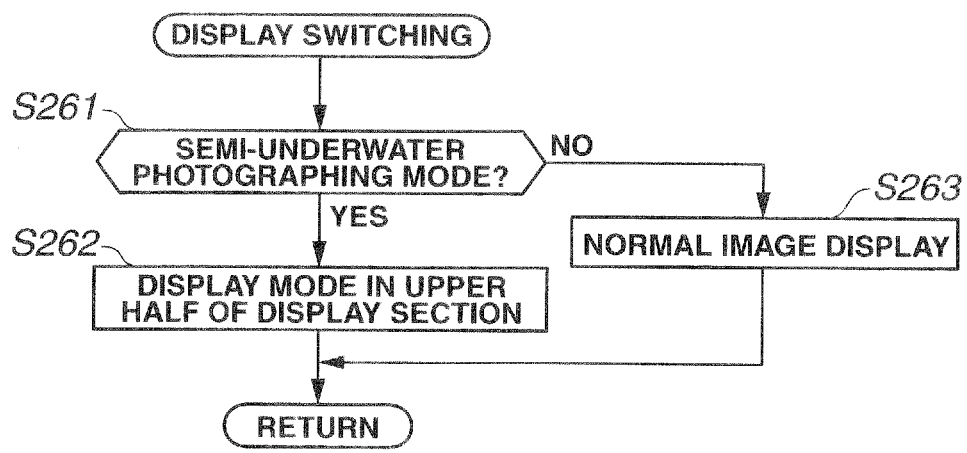
FIG. 58 is a flowchart illustrating a processing procedure when display switching corresponding to the determination result in FIG. 56 is performed.

FIG. 58 illustrates the processing procedure in this case. When the display switching processing starts, the image processing & control section 54 determines in first step S261 whether or not the photographing state is in the semi-underwater photographing mode.

When the determination result shows that the photographing state is in the semi-underwater photographing mode, the image processing & control section 54 displays the mode of the determination result, for example, a display indicating "semi-underwater photographing mode" in, for example, the upper half portion of the display section 55 as shown in FIG. 57A in next step S262. The image processing & control section 54 then ends the display switching processing.

On the other hand, when the determination result in step S261 shows that the photographing state is not in the semi-underwater photographing mode, in next step S263, the image processing & control section 54 performs a normal image display (that is, a normal image is displayed in full screen on the display plane of the display section 55) and ends the display switching processing.

With such a display, the user 63 can confirm that the photographing state is set in the semi-underwater photographing mode. Such a display can improve operability for the user 63.

Figure 59B:
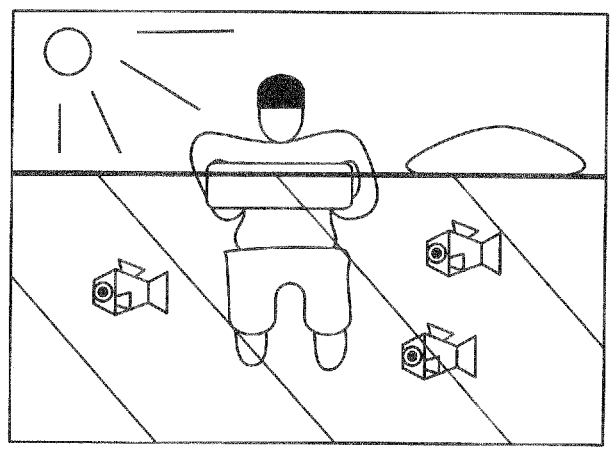
FIG. 59B is a diagram illustrating a typical object corresponding to a semi-underwater photographing mode.
Figure 59A:
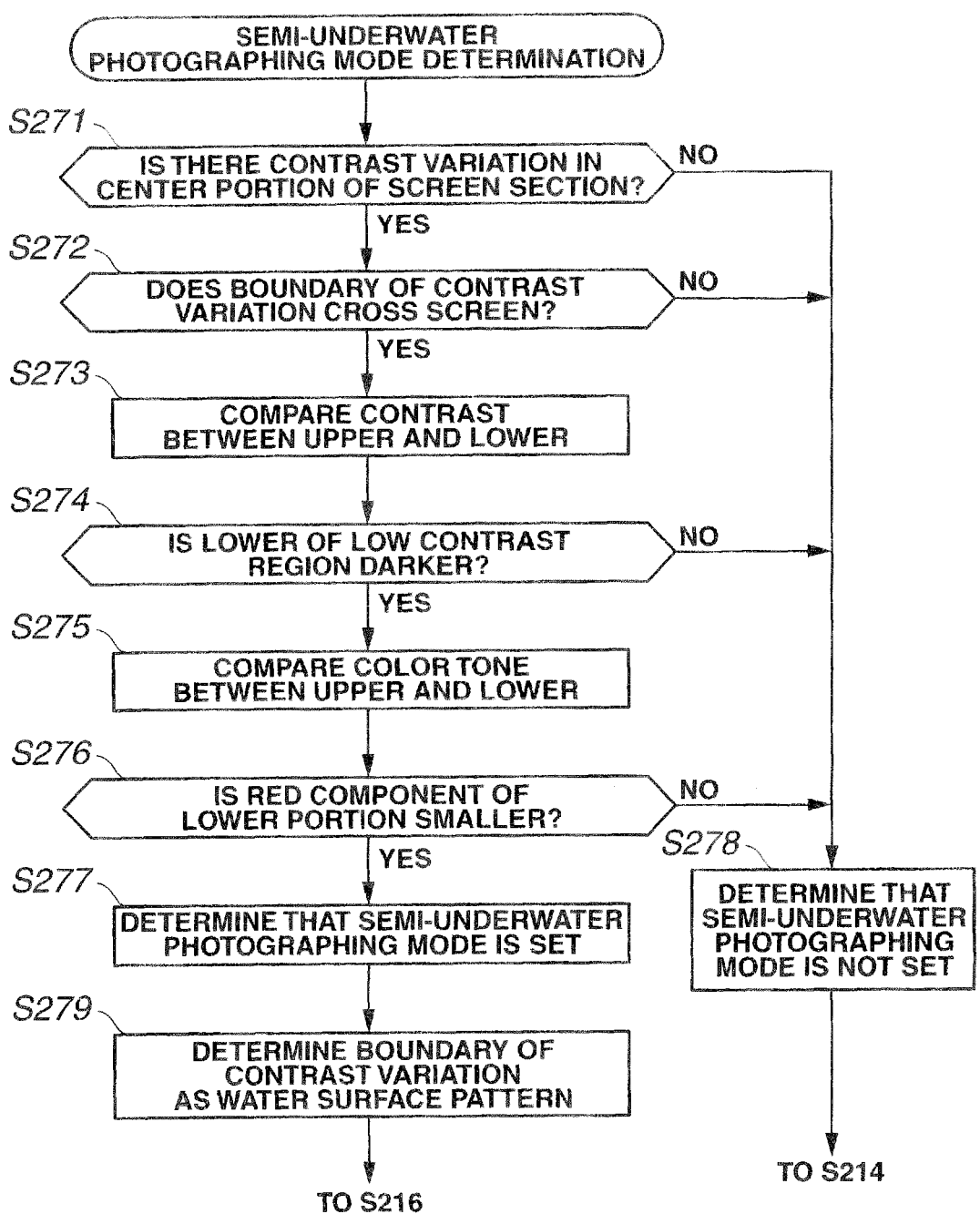
FIG. 59A is a flowchart illustrating a processing procedure for determining whether or not the photographing state is in the semi-underwater photographing mode in FIG. 56 in a modification example.

As a modification example of the processing procedure for determining the photographing state in the semi-underwater photographing mode shown in FIG. 56, a processing procedure shown in FIG. 59A may be adopted. The processing procedure in this modification example determines the photographing state in the semi-underwater photographing mode and determines a water surface pattern in the determining processing procedure as well. For this reason, when the processing procedure is applied to FIG. 54, it is possible to move to processing in next step S220 using the above described determination result when performing the water surface pattern detection processing next to step S218.

When the determining processing on the photographing state in the semi-underwater photographing mode shown in FIG. 59A starts, the image processing & control section 54 determines in first step S271 whether or not there is any contrast variation in the center of the screen. In this case, the image processing & control section 54 identifies (determines) the vertical direction of the camera 51C according to the direction of gravity acceleration by the acceleration sensor. The image processing & control section 54 then determines whether or not there is any contrast variation near the center in the vertical direction of the screen.

When there is a water surface which becomes a boundary of water in the center of the screen, a contrast variation occurs between the underwater side that absorbs light and the above water side that less absorbs light across the water surface as the boundary.

When it is determined that there is a contrast variation in the center of the screen, the image processing & control section 54 determines in next step S272 whether or not the boundary of the contrast variation crosses the screen in the horizontal direction (lateral direction). In the case of the water surface, the boundary of the contrast variation crosses the screen.

When the determination result shows that the boundary of the contrast variation crosses the screen, the image processing & control section 54 performs processing of comparing contrast between the upper and lower portions of the screen in next step S273. The image processing & control section 54 determines (identifies) (the posture of) the upper and lower portions of the screen from the signal of the acceleration sensor in this case, too.

In next step S274, the image processing & control section 54 determines whether or not there is a dark low contrast region with low contrast in the lower portion (that is, whether or not the lower portion constitutes a low contrast region). In this case, instead of determining the low contrast region, it may be possible to simply determine whether or not the lower image is darker than the upper image. In the case of the object as shown in FIG. 59B, the underwater side in the lower portion is darker.

When the determination result shows that the lower portion is darker, the image processing & control section 54 compares color tones between the upper and lower portions of the screen in next step S275. In next step S276, the image processing & control section 54 determines whether the red component in the lower portion is smaller than that in the upper portion.

When the red component in the lower portion is smaller than that in the upper portion, the image processing & control section 54 determines in step S277 that the photographing state is set in the semi-underwater photographing mode. Furthermore, as shown in step S279, the image processing & control section 54 determines the boundary of the contrast variation as a water surface pattern.

The image processing & control section 54 then moves to processing in step S216 in FIG. 54.

On the other hand, when determinations in steps S271, S272, S274 and S276 are negative, the image processing & control section 54 determines in step S278 that the photographing state is not in the semi-underwater photographing mode and moves to processing in step S214 in FIG. 54.

The determination in step S277 or S278 may also be made from the determination result of one of two determining processes in step S274 and S276.

According to the processing in FIG. 59A, it is possible to determine from the determination result in step S277 that the portion where the boundary of the contrast variation in the center of the screen in step S272 crosses the screen is a water surface pattern, and determine (identify) that the upper portion thereof is an object above water and the lower portion thereof is an object under water.

FIG. 59B is a diagram illustrating the determination of the semi-underwater photographing mode in FIG. 59A and FIG. 59B illustrates a typical example of object in the photographing state in the semi-underwater photographing mode.

As shown in FIG. 59B, the under water region has lower transparency than that above water region, is darker due to absorption of light and often includes suspended solids, thus constituting a low contrast region with low contrast.

Furthermore, the wavelength of red light on the long wavelength side in the visible region in particular is more easily absorbed than the short wavelength side and is more likely to have blue color tone (in other words, color tone with less red component). Therefore, the processing procedure in FIG. 59A can be used to determine the semi-underwater photographing mode.

The camera 51C according to the eighth embodiment that performs such an operation synthesizes a plurality of images photographed at photographing timings at which objects above water or objects under water are lost or photographing is not possible due to the water surface section whose water surface W fluctuates, and can thereby generate a synthesized image simultaneously including objects above water and objects under water.

Therefore, the user 63 can acquire a synthesized image as an image of excellent image quality simultaneously including objects above water and objects under water with reduced influences of variations of the water surface W and observe (appreciate) the image of excellent image quality.

Ninth Embodiment

Figure 60:
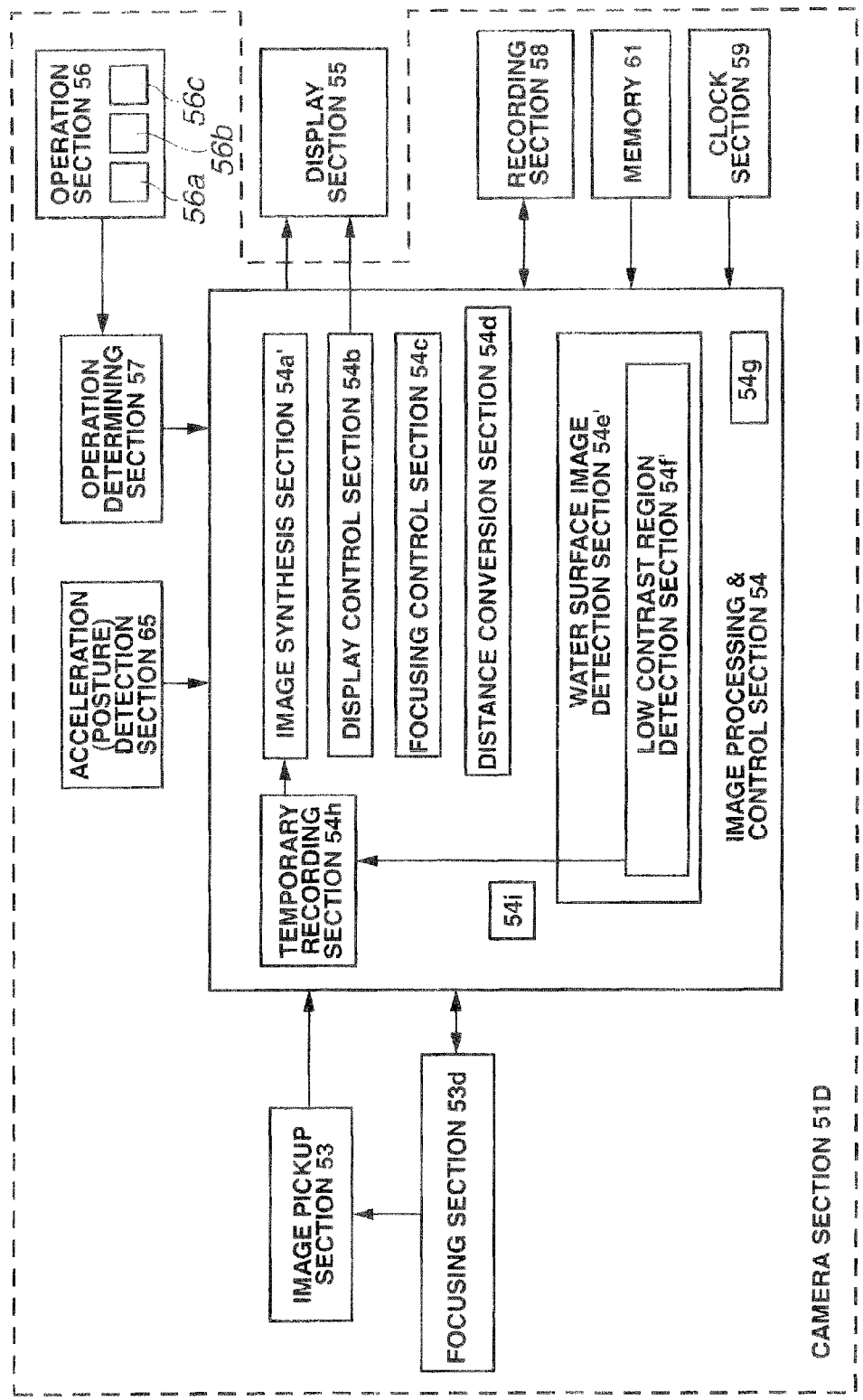
FIG. 60 is a block diagram illustrating a configuration of a portable camera section of a cellular phone according to a ninth embodiment of the present invention.
Figure 61:
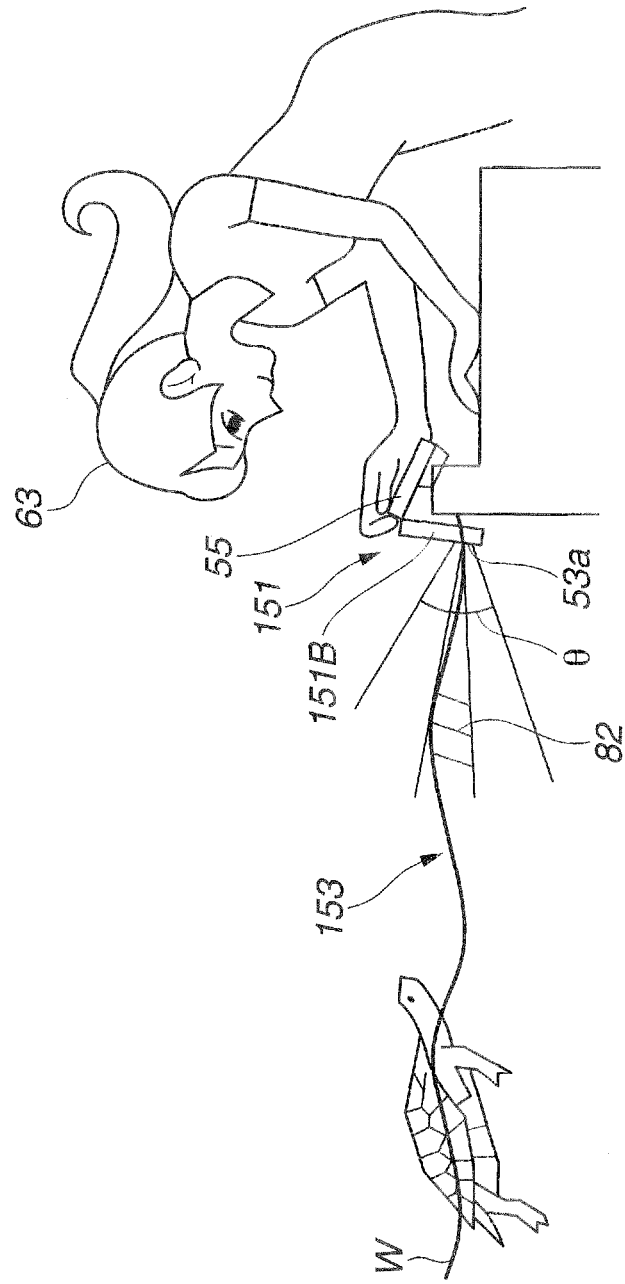
FIG. 61 is a diagram illustrating a situation in which the user is picking up and appreciating an image of a turtle in a pond using a cellular phone.

FIG. 60 illustrates a configuration of a portable camera section (simply referred to as "camera section" in the FIG. 51D according to a ninth embodiment of the present invention. The portable camera section 51D of the present embodiment is mounted on a cellular phone 151 having a waterproof function as shown in FIG. 61. The cellular phone 151 is made up of a portable camera section 151B and a display section 55, which are independent bodies, and the portable camera section 151B and the display section 55 are foldably connected together by a folding section.

The portable camera section 51D shown in FIG. 60 corresponds to the camera 51C shown in FIG. 45 further provided with a temporary recording section 54h in the image processing & control section 54 that has a recording capacity for recording at least a plurality of images for temporarily recording (storing) images picked up for a predetermined period. Temporarily recording images also refers to "temporary recording." Furthermore, when an image is temporarily recorded in the temporary recording section 54h, timing at which the image is temporarily recorded is recorded simultaneously.

Furthermore, an image processing & control section 54 of the present embodiment has the function of a photographing timing determining section 54i that determines photographing timing at which images considered substantially excellent in a semi-underwater photographing mode are recorded (photographed and recorded) in a recording section 58 as photographed images.

Upon detecting a low contrast region in images picked up, a low contrast region detection section 54f temporarily records the images in the temporary recording section 54h. The temporarily recorded images are passed through an image synthesis section 54a' and a display control section 54b, and images determined to be excellent are displayed on a display section 55.

FIG. 61 illustrates a situation in which a user 63 is picking up an image of a turtle swimming near the water surface of a pond 153 as an object of appreciation using the cellular phone 151 provided with the portable camera section 51D in the configuration shown in FIG. 60.

As shown in FIG. 61, the user 63 can set the center position of a photographing lens 53a (of an image pickup section 53) of the portable camera section 51D in the vicinity of the water surface and set a photographing state in a semi-underwater photographing mode in which objects above water and objects under water of the pond 153 are photographed.

As described in aforementioned FIG. 51, the region 82 shown by hatching where the water surface W fluctuates substantially interferes with image formation of the object images within the field of view θ. Thus, when the image picked up in the photographing state in FIG. 61 and acquired at certain image pickup timing is displayed on the display section 55, an image IC' as shown in FIG. 62A is obtained.

In this case, a water surface pattern (image of the water surface section) of a low contrast region is generated in the vicinity of the center, and the upper and lower portions thereof become an (above water object) image of the object above water and an (under water object) image of the object under water.

Figure 62A:
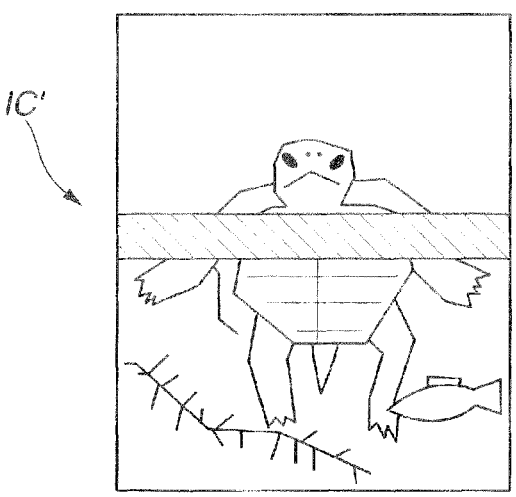
FIG. 62A to FIG. 62C are diagrams illustrating an example of image acquired at different timings in FIG. 61.
Figure 62B:
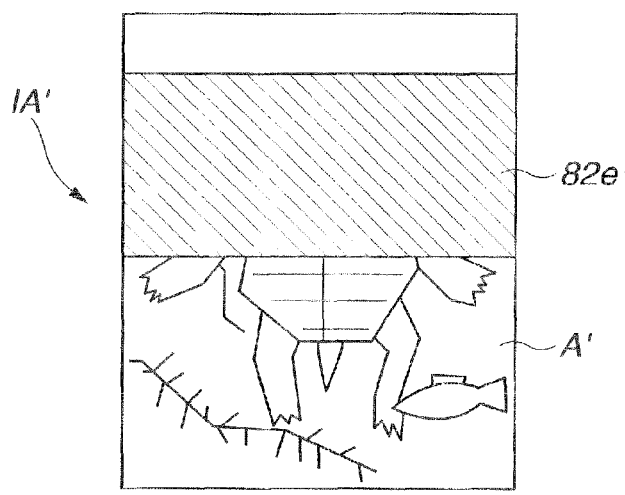
Figure 62C:
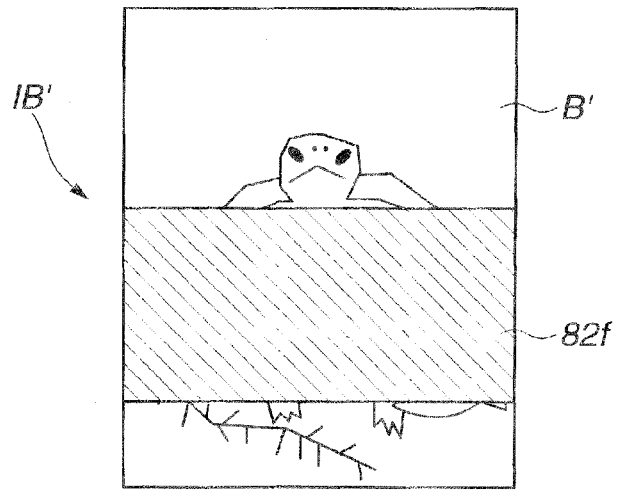

When there is a situation in which the water surface W temporally fluctuates due to wind or the like, depending on image pickup timings, the image becomes an image of poor quality such as images IA' and IB' shown in FIG. 62B and FIG. 62C compared to an image IC' in FIG. 62A. Thus, the present embodiment is designed to display nothing in the cases of the images in FIG. 62B and FIG. 62C and to be able to display a better image or better synthesized image as the image in FIG. 62A.

Actually, processing is necessary to determine whether these images are excellent images or not excellent images considerably affected by a water surface pattern. Thus, in the meantime until the determination result is confirmed, the images such as those in FIG. 62B and FIG. 62C may also be temporarily displayed.

Upon detecting a low contrast region, the image processing & control section 54 temporarily records the image in the temporary recording section 54h. The image processing & control section 54 then performs control of displaying the image on the display section 55 according to a display control processing procedure shown in FIG. 63.

Figure 63:
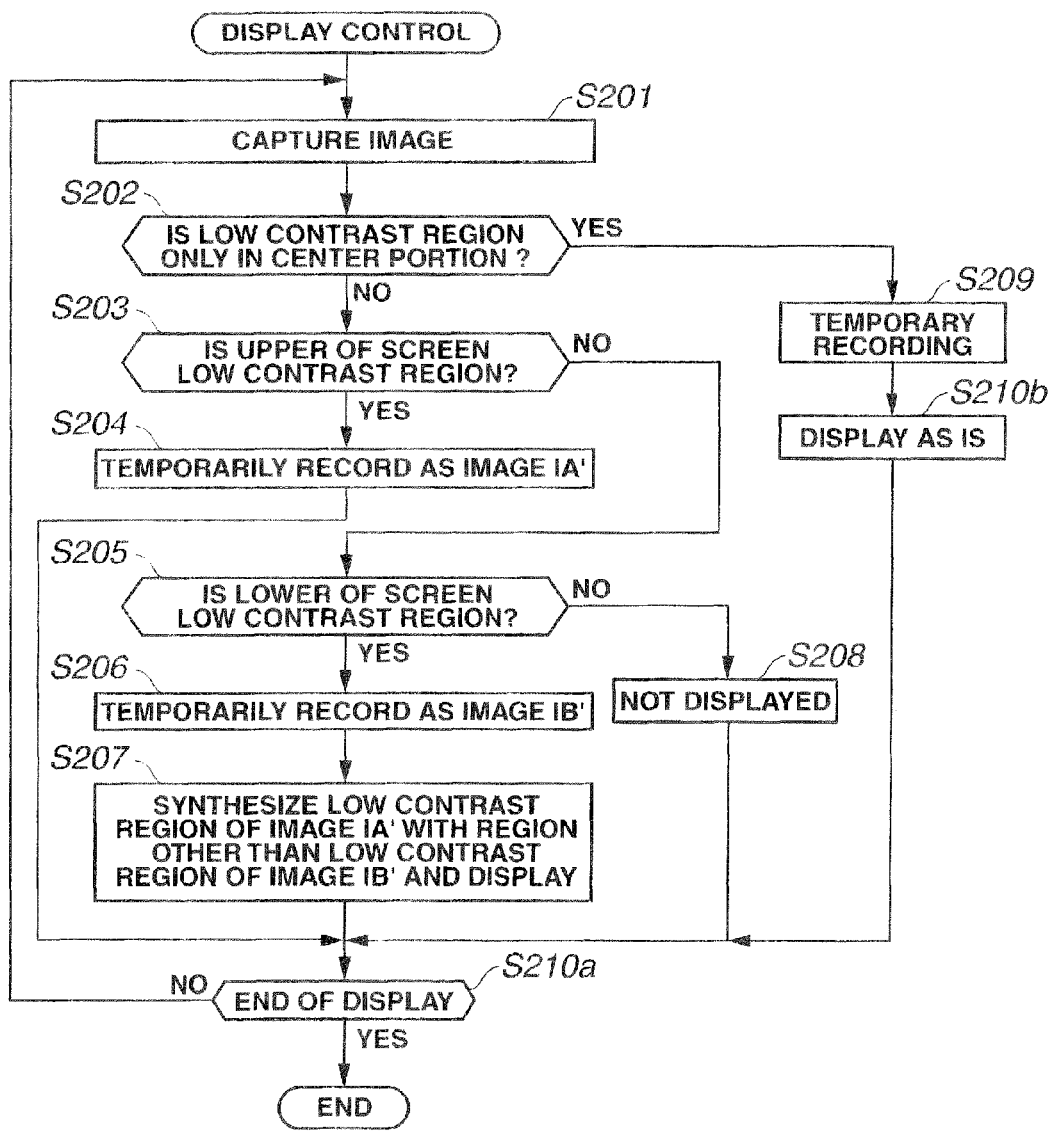
FIG. 63 is a flowchart illustrating an example of processing procedure when making an appreciation through the image processing & control section according to the ninth embodiment.

When the display control processing in FIG. 63 starts, in first step S201, the image processing & control section 54 captures an image of an object picked up by the image pickup section 53. In next step S202, the low contrast region detection section 54f of the image processing & control section 54 detects a low contrast region in the picked up image.

The low contrast region detection section 54f then determines whether or not the detected low contrast region is only the center part of the screen (in the vertical direction) as shown in FIG. 62A. When making such a determination, the image processing & control section 54 recognizes the vertical direction of the screen using the detection result by an acceleration sensor. Whether or not the detected low contrast region is only the center part is determined depending on whether or not the width in the vertical direction of the low contrast region having low contrast, that is, the width of the band pattern in the horizontal direction formed by the low contrast region is equal to or below a predetermined value (or a threshold). When the width is equal to or below the predetermined value, the image is determined to be an excellent image.

When the determination result shows that the low contrast region is not only the center part, the image processing & control section 54 determines in next step S203 whether or not the upper portion of the screen is the low contrast region, that is, whether or not the low contrast region extends upward as shown in FIG. 62B.

When the determination result shows that the upper portion of the screen is the low contrast region, in next step S204, the image processing & control section 54 temporarily records the image in the temporary recording section 54h as the image IA' and moves to processing in step S210a.

FIG. 62B illustrates an example of the image IA'. In this case, together with the image A' of the object under water of the lower portion, the upper portion becomes the image IA' where an image region 82e which is a low contrast region is generated as an image of the water surface section (water surface pattern) by the water surface section.

On the other hand, when the determination result in step S203 shows that the upper portion of the screen is not the low contrast region, the image processing & control section 54 determines in step S205 whether or not the lower portion of the screen is the low contrast region, that is, determines whether or not the low contrast region extends downward as shown in FIG. 62C.

When the determination result shows that the lower portion of the screen is the low contrast region, the image processing & control section 54 temporarily records the image in the temporary recording section 54h as an image IB' in next step S206. FIG. 62C illustrates an example of the image IB'. In this case, together with an image B' of the object under water in the upper portion, the lower portion becomes the image IB' where an image region 82f which is a low contrast region is generated as an image of the water surface section (water surface pattern) by the water surface section.

In next step S207, the image processing & control section 54 generates a synthesized image by synthesizing the low contrast region of the image IA' temporarily recorded in the temporary recording section 54h with the image portion in a region other than the low contrast region of the image IB' and displays the synthesized image on the display section 55.

When the image IB' in FIG. 62C is synthesized with the image IA' in FIG. 62B, the resulting image is a synthesized image similar to that shown in the image IC' shown in FIG. 62A.

Thus, when the image is determined not to be an excellent image, an excellent image is generated and displayed by synthesizing a plurality of temporarily recorded images. To be more specific, an excellent image is generated and displayed by performing interpolation whereby from the image IA' in which the low contrast region extends upward and the image IB' in which the low contrast region extends downward, one low contrast region is substituted by an image in the region other than the low contrast region in the other image.

Therefore, even in a situation in which no excellent images can be picked up, the user 63 can observe (appreciate) an excellent image.

After the processing in step S207, the image processing & control section 54 moves to processing in step S210a.

When the determination result in step S205 shows that the upper portion of the screen is not the low contrast region, in step S208, the image processing & control section 54 moves to processing in step S210a without displaying the image.

Furthermore, the determination result in step S202 shows that the low contrast region exists only in the center part, the image processing & control section 54 temporarily records the image in the temporary recording section 54h in step S209. The image IC' in FIG. 62A is an example of image corresponding to this case.

In next step S110b, the image processing & control section 54 displays the image temporarily recorded in the temporary recording section 54h on the display section 55 as is (because it is an excellent image). The image processing & control section 54 then moves to processing in step S210a.

In step S210a, the image processing & control section 54 determines whether or not a display end operation is performed. When the display end operation is not performed, the image processing & control section 54 returns to step S201, captures the next image and performs similar processing. On the other hand, when the display end operation is performed, the processing in FIG. 63 ends.

According to the flowchart shown in FIG. 63, a processing procedure for processing of generating and displaying the synthesized image in step S207 after temporary recording of the image IB' in step S206 is adopted, but the present invention is not limited to this processing procedure.

For example, when the image IA' or imageIB' is temporarily recorded in the temporary recording section 54h, if the imageIB' or image IA' to be synthesized has already been temporarily recorded, a synthesized image may be generated and displayed.

To be more specific, after the processing in step S205 in FIG. 63, the process may move to step S207. However, in step S207, it is determined whether or not the image IB' or image IA' to be synthesized has already been temporarily recorded, and in the case where the image IB' or image IA' has not already been temporarily recorded, the synthesized image is not generated, and the process moves to step S111, and in the case where the image IB' or image IA' has already been temporarily recorded, the synthesized image is generated and displayed.

Furthermore, the present invention is not limited to the case described in step S207 shown in FIG. 63, but an image in a region other than the low contrast region of the image IA' may be synthesized with the low contrast region of the image IB' and displayed.

Figure 64:
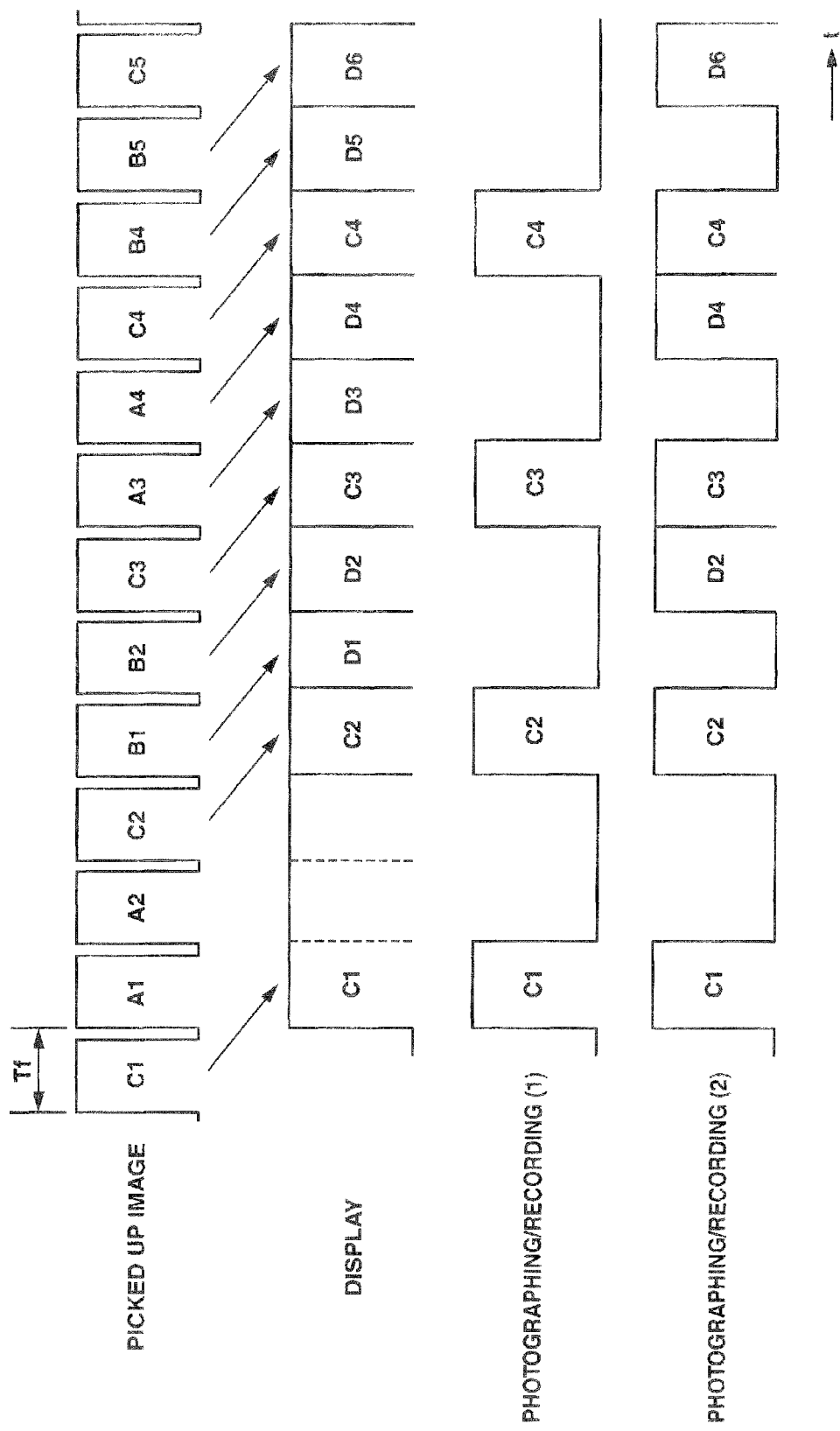
FIG. 64 is a timing chart for illustrating an operation corresponding to FIG. 63.

FIG. 64 illustrates a timing chart of display control corresponding to such a processing procedure (which is the processing procedure in FIG. 63 slightly modified) and the horizontal direction shows time t. Furthermore, reference character Tf denotes an image pickup cycle when the object image corresponding to one screen (frame) is picked up by the image pickup section 53, which is set to be equal to the display cycle.

The top row (first row) illustrates (picked up images) images Cj, Aj and Bj in order of times elapsed in the images IC', IA' and IB' picked up by the image pickup section 53 and incorporated in the image processing & control section 54, respectively. Parameters showing a time sequence of picked up images are j=1, 2, 3, . . . .

The second row illustrates images Cj and Dj actually displayed on the display section 55. The image Cj corresponding to the image IC' means an image considered excellent when the low contrast region is limited only to the center part.

On the contrary, since the images Aj and Bj are not so excellent as the image Cj, the images Aj and Bj are not displayed as they are. The image Dj is a synthesized image obtained by synthesizing the images Aj and Bj (j may be different) and is an image displayed. Without being limited to the example in FIG. 64, the display control section 54b may control the images Aj and Bj so as to be displayed on the display section 55 for a short period of time. The third and fourth rows in FIG. 64 will be described later.

When an image C1 is picked up as shown in FIG. 64, the image C1 is displayed from the next frame on the display section 55. The display of the image C1 continues until the next image C2 is displayed or until a synthesized image D1 is displayed.

In the example in FIG. 64, images A1 and A2 are picked up after the image C2, but since an image B1 is not picked up yet (nor temporarily recorded), the images A1 and A2 are not displayed. When the image B1 is picked up, the synthesized image D1 (resulting from a synthesis of the image B1 and the image A2) is displayed.

In this display example, when a synthesized image is displayed, if a plurality of the images Aj (to be more specific, the images A1 and A2) are temporarily recorded before the image Bj (B1, to be more specific), the image Aj is synthesized with the latest image (A2). When the image B2 is picked up next to the image B1, the synthesized image D2 of the image B2 and image A2 is displayed.

After that, an image C3 is picked up and the image C3 is displayed. After that, when an image A3 is picked up, a synthesized image D3 of the image A3 and the latest image B2 before that time is displayed. Subsequent images will be displayed according to a similar rule.

With such display control, even in a situation in which an image of only an object above water or an image of only an object under water can be picked up due to the presence of the water surface section, it is possible to display a synthesized image simultaneously including the object above water and object under water (the images D1 and D2 or the like in FIG. 64) and an image assumed to simultaneously include the object above water and object under water whose only center part becomes a low contrast region (the images C1 and C2 or the like in FIG. 64) can be displayed on the display section 55.

Therefore, the user 63 can appreciate an image corresponding to a state in which an object image to be appreciated is picked up satisfactorily.

As a modification example of the display shown in FIG. 64, when a synthesized image is displayed, images with a small low contrast region in the vertical direction, that is, images with small extension of a low contrast region in the vertical direction may be selected to generate and display a synthesized image.

Furthermore, a case has been described above where a picked up image is displayed. In the present embodiment, it is further possible to select a photographing mode in which control over display and photographing/recording are interlocked with each other. Photographing/recording in this case means not temporary recording but recording an image in the recording section 58, and when such a meaning is obvious, photographing/recording is also simply referred to as photographing or recording.

When control over display and photographing are interlocked with each other in the present embodiment, it is possible to select a mode in which only an excellent image such as the aforementioned image C1 is photographed/recorded or a mode in which a synthesized image is also photographed/recorded. Moreover, the present embodiment provides the temporary recording section 54$h$ so as to be able to photograph/record an excellent image such as the image C1 in the recording section 58 without missing photographing timing.

In this case, such a portable camera section 51D is provided with the image pickup section 53 for simultaneously photographing an object above water of the upper portion above the water surface and an object under water of the lower portion below the water surface, the photographing timing determining section 54$i$ that detects an image of the water surface section generated by the water surface section whose water surface fluctuates from the object image picked up by the image pickup section 53 and determines photographing timing appropriate for simultaneously photographing an (object above water) image of the object above water and an (object under water) image of the object under water, and the image synthesis section 54$a'$ that generates a synthesized image from a plurality of images of objects picked up at a plurality of timings close to the photographing timing determined by the photographing timing determining section 54$i$.

To be more specific, the photographing timing determining section 54$i$ of the image processing & control section 54 temporarily records a plurality of images picked up by the image pickup section 53 during a predetermined period (during which the images can be recorded in the temporary recording section 54$h$) in the temporary recording section 54$h$ together with the timings.

Furthermore, the photographing timing determining section 54$i$ determines (judges) whether or not the image temporarily recorded in the temporary recording section 54$h$ is a photographed image with a small influence of the water surface section on the image of the water surface section or a photographed image to be photographed corresponding to simultaneous photographing of the (object above water) image and the (object under water) image. The photographing timing determining section 54$i$ then determines (designates as photographing timing) the timing of photographing/recording the determined photographed image from the temporary recording section 54$h$ into the recording section 58 as photographing timing for photographing a photographed image to be photographed.

The image in which a low contrast region exists only in the center part of the screen as shown in FIG. 62A corresponds to the photographed image in this case.

Figure 65A:
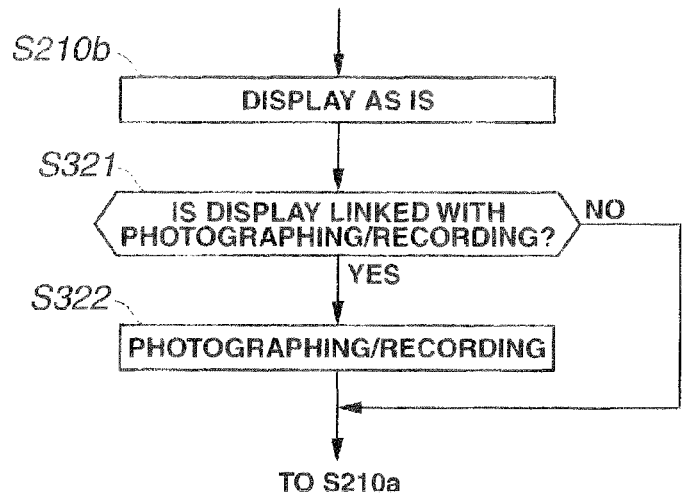
FIG. 65A is a flowchart illustrating part of a processing procedure when display and photographing/recording are performed in conjunction with each other.

FIG. 65A illustrates a flowchart of part of a processing procedure when displaying and photographing are interlocked with each other.

FIG. 65A corresponds to a processing procedure for performing processing in step S321 and step S322 between step S210$b$ and step S210$a$, for example in the flowchart in FIG. 63. In step S210$b$, after displaying the images C1 and C2 or the like in FIG. 64 on the display section 55 as they are, the image processing & control section 54 determines in step S321 whether or not there is a setting (selection) that control over display and control over photographing/recording are interlocked with each other.

When control over display and control over photographing/recording are interlocked with each other, the user 63 needs only to select "interlock" from a menu screen by operating, for example, the mode setting switch 56$b$. The image processing & control section 54 determines whether or not an interlock mode is set with reference to the selection result.

When the determination result shows that the interlock is not used, the image processing & control section 54 moves to step S210$a$ after the processing in step S321. In this case, processing similar to that in FIG. 63 is performed.

On the other hand, when the determination result shows that the interlock is used, in step S322 after the processing in step S321, the image processing & control section 54 photographs an image when displayed on the display section 55, performs processing of recording the image in the recording section 58 and then moves to step S210$a$. The rest is the same as FIG. 63 or the processing procedure with parts associated with the generation and display of a synthesized image as described above.

The photographing/recording following the processing procedure shown in FIG. 65A is shown on the third row in FIG. 64. The third row in FIG. 64 shows photographing/recording (1). To be more specific, when the image C1 considered to have excellent image quality whose low contrast region is located only in the center part is displayed (as shown on the second row), as shown on the third row, the image C1 is photographed/recorded from the temporary recording section 54$h$ into the recording section 58 as the photographed image to be photographed interlocked with the display thereof.

In this case, together with the photographed image, the timing at which the image is temporarily recorded in the temporary recording section 54$h$ or the timing at which the image is recorded in the recording section 58 is recorded as the photographing timing. When the image C1 is consecutively displayed, only the first image C1 is photographed/recorded. For the following image C2 or the like, photographing/recording is performed interlocked with the display.

Therefore, in this case, the image processing & control section 54 has the function of the photographing timing determining section 54*i* that determines the photographing timing of photographing and recording interlocked with the image displayed on the display section 55 and considered to have excellent image quality. Furthermore, as described above, at timing close to this photographing timing (this timing may also defined so as to be included in the photographing timing), the image synthesis section 54*a'* generates a synthesized image, and the synthesized image generated is displayed on the display section 55.

Furthermore, in addition to photographing/recording of the images C1 and C2 or the like, synthesized images may be photographed/recorded. As an example of this case, synthesized images D1, D2, . . . are photographed/recorded interlocked with the display on the second row in FIG. 64. In addition, photographing/recording may also be performed as shown as photographing/recording (2) on the fourth row in FIG. 64. In the example shown on the fourth row, when a plurality of synthesized images are displayed consecutively, only a synthesized image generated using images with a low contrast region of the least extension in the vertical direction among those images is photographed/recorded.

In the specific example, when the image B1 is picked up, the synthesized image D1 of the image B1 and the latest image A2 which is temporarily recorded and not displayed is displayed, and in the next frame, the synthesized image D2 of the image B2 and the image A2 is displayed consecutively. In this case, the synthesized image D2 is photographed/recorded assuming that this is a case where the extension of the low contrast region in the vertical direction of the image B2 is smaller than that of the image B1. The timing at which the synthesized image D2 is actually recorded in the recording section 58 is after the display of the synthesized image D2.

Figure 65B:
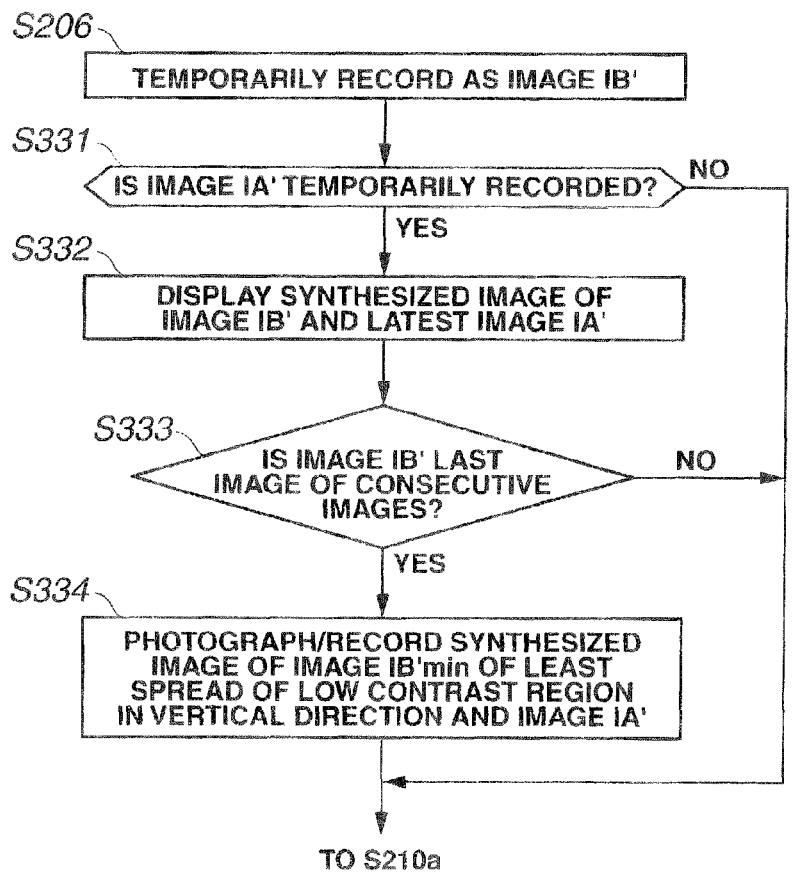
FIG. 65B is a flowchart illustrating part of the processing procedure when a synthesized image is also photographed/recorded.

FIG. 65B illustrates a processing procedure for performing such processing. The processing procedure in FIG. 65B corresponds to modified contents of the processing procedure moving from step S206 to step S210*a* in FIG. 63.

After temporarily recording the image IB' (the image B1 in FIG. 64) in step S206, the image processing & control section 54 determines in step S331 whether or not the image IA' is temporarily recorded in the temporary recording section 54*h*.

When the image IA' is not temporarily recorded in the temporary recording section 54*h*, the process moves to step S210*a*, and on the contrary, when the image IA' is temporarily recorded in the temporary recording section 54*h*, the process moves to step S332.

In step S332, the image processing & control section 54 generates a synthesized image from the image IB' and the latest image IA' which is temporarily recorded in the temporary recording section 54*h* and not displayed, and displays the synthesized image. In this case, the image processing & control section 54 synthesizes an image in a region other than the low contrast region of the latest image IA' with the low contrast region of the image IB', for example, and displays the image on the display section 55. That is, the low contrast region of the image IB' is corrected through a substitution with the image (in a region other than the low contrast region) of the image IA', an excellent image of the image IB' with the reduced low contrast region is generated and displayed on the display section 55.

Furthermore, the image processing & control section 54 determines in next step S333 whether or not a plurality of images IB' appear consecutively and whether or not the image is the last image among the consecutive images. When the determination result is negative, the process moves to step S210*a*.

On the other hand, when the determination result in S333 is affirmative, the image processing & control section 54 detects IB'min, which is an image with the least expansion of the low contrast region in the vertical direction (to be more exact, downward direction from the center part) in next step S334. The image processing & control section 54 then photographs/records the synthesized image from the image IB'min and the image IA' and moves to step S210*a*.

Since the last image of the consecutive images IB' needs to be detected (determined) in order to detect the image IB'min, the above described timing of actually photographing/recording a synthesized image in the recording section 58 is slightly later than the image pickup timing or temporary recording timing. However, when temporary recording is performed, temporary recording timing (time) is simultaneously recorded temporarily, and if those timings are recorded as photographing timings (times) at which the image is actually recorded in the recording section 58, the slight delay of the actual recording operation constitutes no problem. Furthermore, when the difference between the timing of temporary recording and the timing of recording in the recording section 58 is small, whichever timing may be used.

On the fourth row in FIG. 64, when the next images A3 and A4 are picked up in sequence next to the image C3, processing (processing whereby IA' and IB' are interchanged) similar to the processing shown in FIG. 65B is performed.

Regarding the synthesized images D3 and D4, the synthesized image D4 is likewise photographed/recorded corresponding to the case using an image having the least extension of the low contrast region in the vertical direction. Here, the expansion of the low contrast region in the vertical direction for the image A4 is assumed to be smaller than that of the image A3.

Thus, the ninth embodiment that controls display and photographing can display an image corresponding to such an excellent image pickup state that simultaneously includes objects above water and objects under water, and photograph/record such an image in the recording section 58 in addition to the effects of the eighth embodiment.

The eighth embodiment may also determine whether or not, for example, the low contrast region in a synthesized image is smaller than a threshold in the vertical direction and record, when the determination result shows that the low contrast region is smaller than the threshold, the synthesized image as an excellent image in the recording section 58. Furthermore, a synthesized image determined to have little influence of the water surface section may be recorded in the recording section 58 as a photographed image.

Furthermore, embodiments configured by partially combining or modifying the aforementioned embodiments without departing from the spirit and scope of the invention also belong to the present invention.

What is claimed is:

1. A waterproof camera comprising:
   an image pickup section that converts an object image to image data and outputs the image data;
   a display section that displays the object image based on the image data;
   a setting section that sets a semi-underwater mode that simultaneously photographs an object under water and an object above water in a photographing screen of the object image;
   a display control section that limits a display range in the display section when the semi-underwater mode is set; and
   an image conversion section that reduces an entirety of the object image based on the image data, wherein the display control section controls such that the image reduced by the image conversion section is displayed in the limited display range.

2. A waterproof camera comprising:
an image pickup section that converts an object image to image data and outputs the image data;
a display section that displays the object image based on the image data;
a setting section that sets a semi-underwater mode that simultaneously photographs an object under water and an object above water in a photographing screen of the object image;
a display control section that limits a display range in the display section when the semi-underwater mode is set; and
an image conversion section that divides the object image based on the image data,
wherein the display control section controls such that the image divided by the image conversion section is displayed in the limited display range.

3. A waterproof camera comprising:
an image pickup section that converts an object image to image data and outputs the image data;
a display section that displays the object image based on the image data;
a setting section that sets a semi-underwater mode that simultaneously photographs an object under water and an object above water in a photographing screen of the object image;
a display control section that limits a display range in the display section when the semi-underwater mode is set; and
an image conversion section that extracts only an image of the object under water based on the image data,
wherein the display control section controls such that only the image of the object under water is displayed in the limited display range.

4. A waterproof camera comprising:
an image pickup section that converts an object image to image data and outputs the image data;
a display section that displays the object image based on the image data;
a setting section that sets a semi-underwater mode that simultaneously photographs an object under water and an object above water in a photographing screen of the object image; and
a display control section that limits a display range in the display section when the semi-underwater mode is set,
wherein the display control section controls to display, outside the limited display range, at least one of a moving direction of the waterproof camera, a photographing mode, and a guideline of a water surface position.

5. A waterproof camera comprising:
an image pickup section that converts an object image to image data and outputs the image data;
a display section that displays the object image based on the image data;
a setting section that sets a semi-underwater mode that simultaneously photographs an object under water and an object above water in a photographing screen of the object image;
a display control section that limits a display range in the display section when the semi-underwater mode is set; and
a posture detection section that detects a posture of the waterproof camera,
wherein, when it is detected by the posture detection section that the waterproof camera is in an upside down position, the setting section automatically sets the semi-underwater mode.

6. The waterproof camera according to claim 1, further comprising an automatic focus adjustment section that performs focusing of a photographing lens of the waterproof camera,
wherein, when the semi-underwater mode is set by the setting section, the automatic focus adjustment section corrects a focus position to a shorter distance side than a focus position of the object above water.

7. The waterproof camera according to claim 1, wherein, when limiting the display range of the display section, the display control section sets the display range to a range corresponding to a position of the photographing lens.

8. A waterproof camera according to claim 1, comprising:
an image pickup section that converts an object image to image data and outputs the image data;
a display section that displays the object image based on the image data;
a setting section that sets a semi-underwater mode that simultaneously photographs an object under water and an object above water in a photographing screen of the object image; and
a display control section that limits a display range in the display section when the semi-underwater mode is set,
wherein the setting section automatically detects that the waterproof camera is semi underwater and sets the semi-underwater mode.

9. The waterproof camera according to claim 8, wherein the setting section sets the semi-underwater mode when the setting section detects that the waterproof camera is in a state of being semi-underwater based on the image data.

10. A waterproof camera comprising:
an image pickup section that converts an object image to image data and outputs the image data;
a display section that displays the object image based on the image data;
a determining section that determines whether or not to set a semi-underwater mode that simultaneously photographs an object under water and an object above water in a photographing screen of the object image; and
an indicator section that displays a result of the determination in the display section when the semi-underwater mode is set.

11. A display method comprising:
converting an object image to image data and outputting the image data;
determining whether or not a semi-underwater mode that simultaneously photographs an object under water and an object above water is set in a photographing screen of the object image; and
limiting a display range in a display section when the semi-underwater mode is set.

* * * * *